United States Patent
Oota et al.

(10) Patent No.: US 6,707,523 B2
(45) Date of Patent: Mar. 16, 2004

(54) LIQUID CRYSTAL DISPLAY DEVICE WHEREIN PIXELS HAVING PARTICULAR METAL LAYER BETWEEN ALIGNMENT FILM AND PROTECTIVE FILM

(75) Inventors: Masuyuki Oota, Kariya (JP); Masahiro Ishii, Mobara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/813,983

(22) Filed: Mar. 22, 2001

(65) Prior Publication Data
US 2001/0026331 A1 Oct. 4, 2001

(30) Foreign Application Priority Data
Mar. 23, 2000 (JP) ........................................ 2000-087109

(51) Int. Cl.[7] ............................................ G02F 1/1343
(52) U.S. Cl. ........................ 349/141; 349/146; 349/143; 349/139
(58) Field of Search ................. 349/141, 146, 349/147, 148, 144, 143, 139

(56) References Cited

U.S. PATENT DOCUMENTS 5,302,987 A * 4/1994 Kanemori et al. ............ 359/58
5,831,707 A * 11/1998 Ota et al. .................... 349/141
5,852,485 A   12/1998 Shimada et al.
6,341,003 B1 * 1/2002 Ashizawa et al. .......... 349/141
2001/0012076 A1 * 8/2001 Ohkawara et al. ............ 349/38
2002/0008799 A1 * 1/2002 Ota et al. ..................... 349/43

FOREIGN PATENT DOCUMENTS

JP    11-142886    5/1999

* cited by examiner

*Primary Examiner*—Robert H. Kim
*Assistant Examiner*—Mike Qi
(74) *Attorney, Agent, or Firm*—Antonelli, Terry, Stout & Kraus, LLP

(57) ABSTRACT

In an IPS mode liquid crystal display device having a wide viewing angle, if a display is continued by supply of electricity, black spotted irregularities (contamination spots) occur in some cases. To prevent such phenomena, there is provided a liquid crystal display device having a liquid crystal layer and plural pixels in matrix form, which device includes a first electrode group and line group for displaying a picture, the first electrode group and line group being formed over the substrate over which the plural pixels are formed, a protective film formed between the liquid crystal layer and the first electrode group and line group, and at least one second electrode or line having either or both of a positive pole and a negative pole and formed over the protective film in the plural pixels.

14 Claims, 66 Drawing Sheets

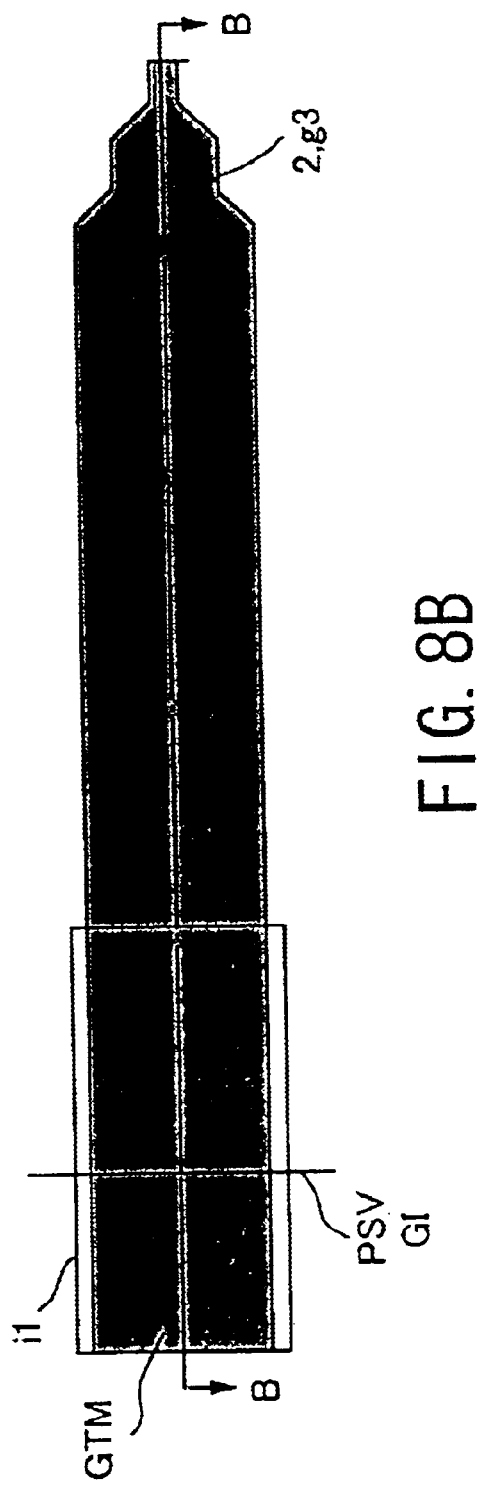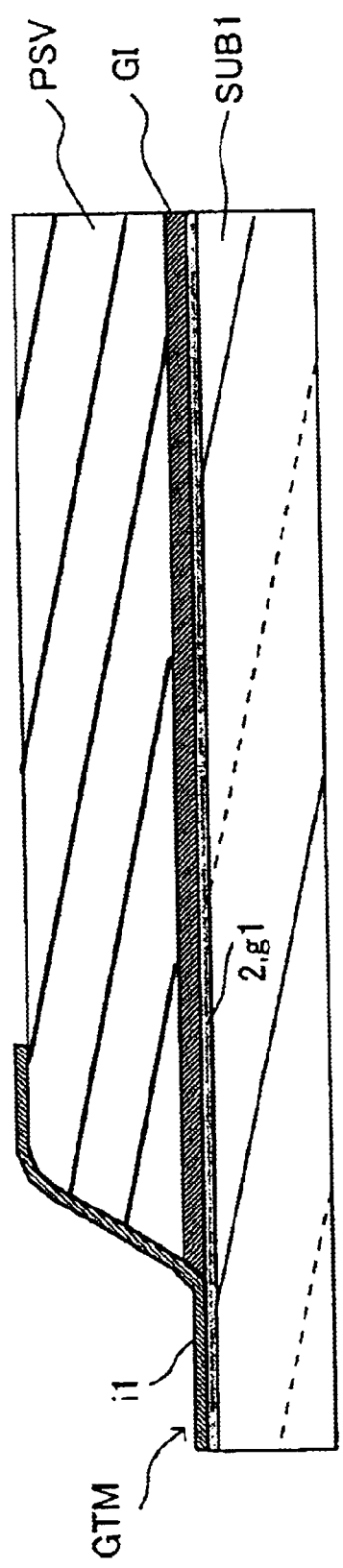
FIG. 8A
FIG. 8B

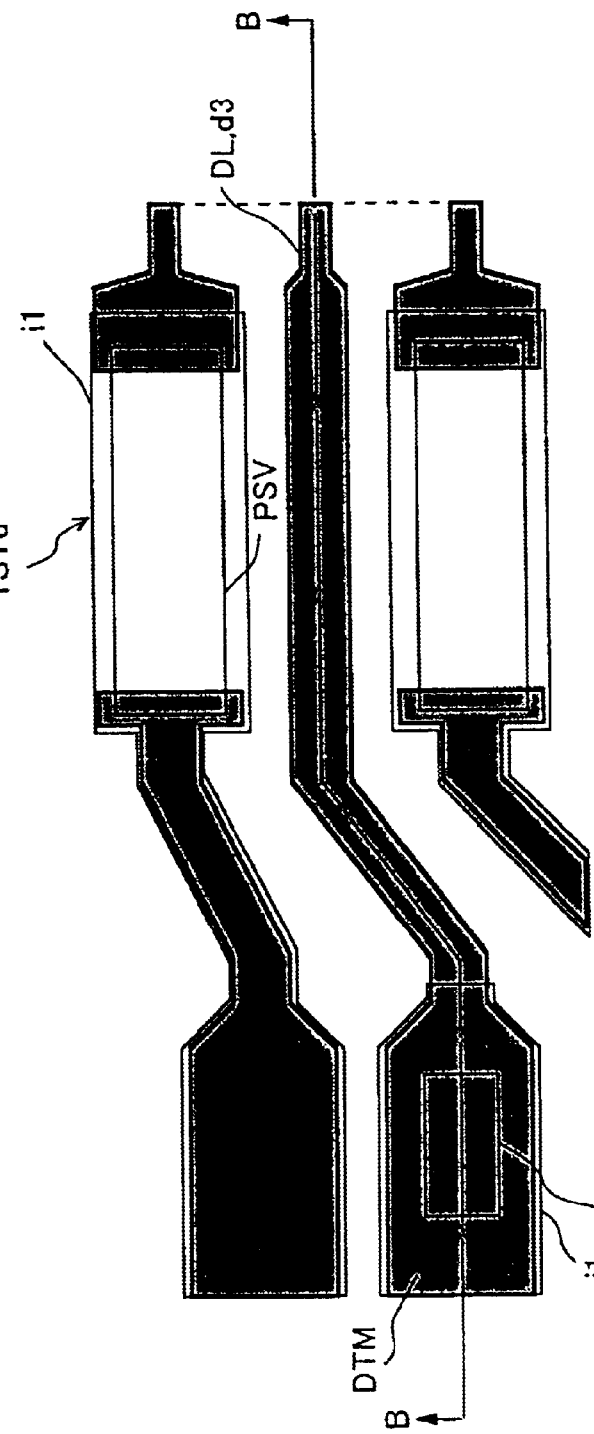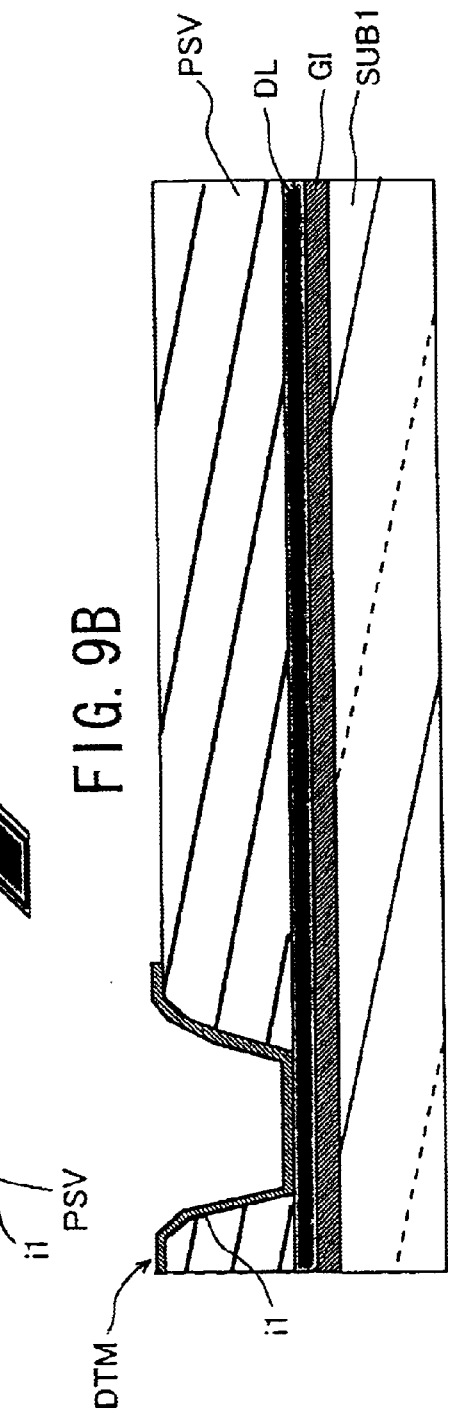

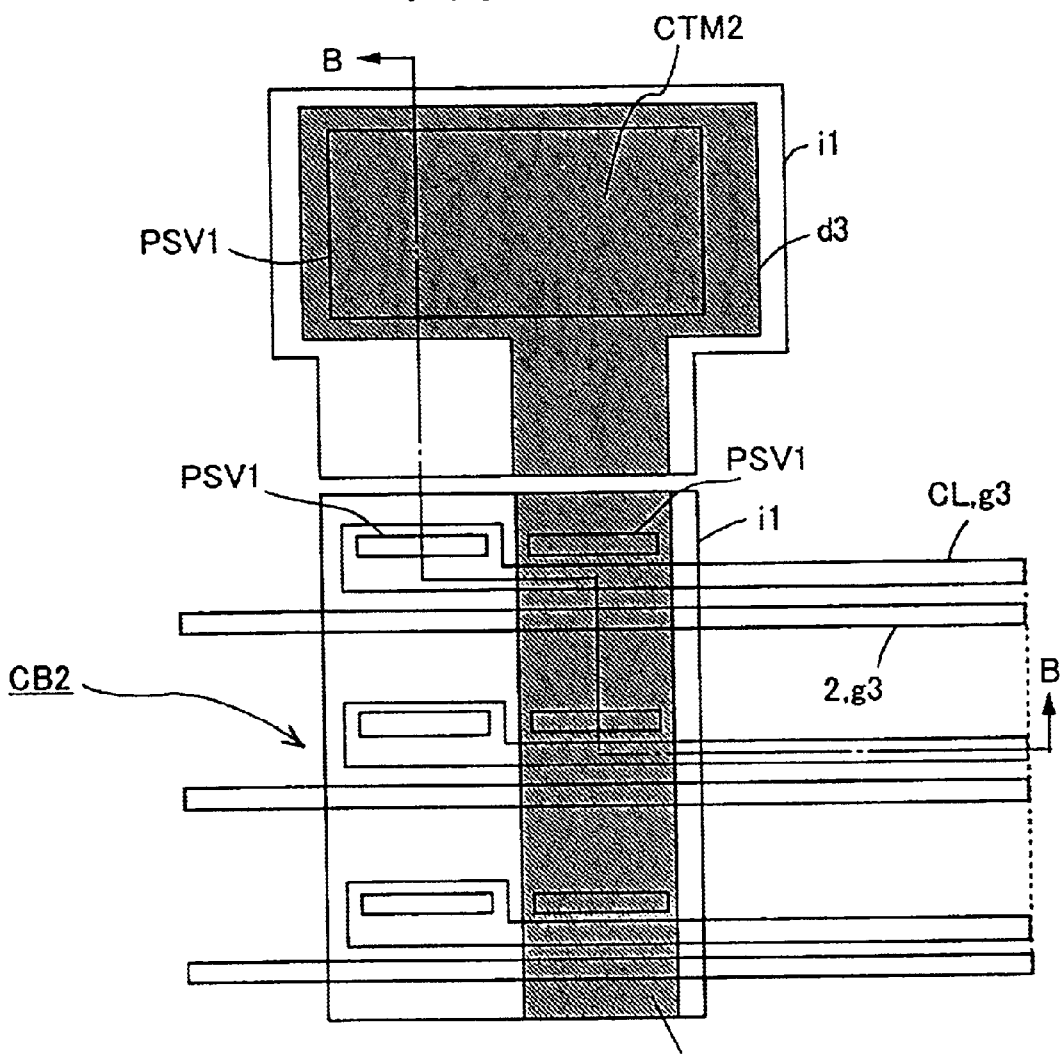
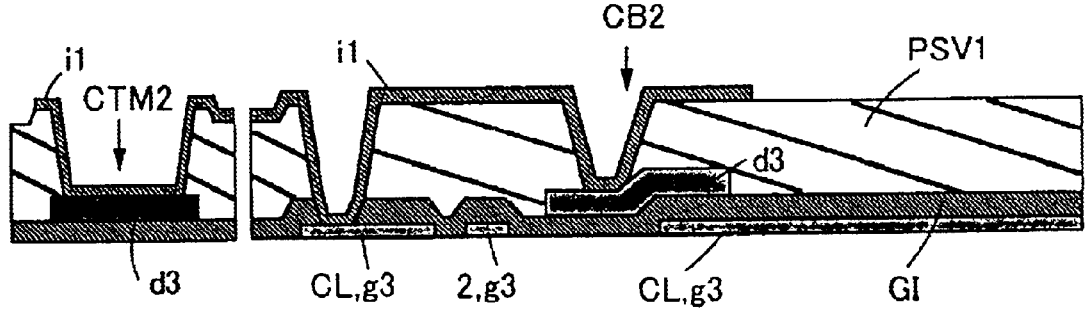

FIG.65
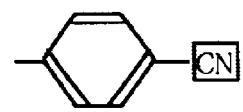
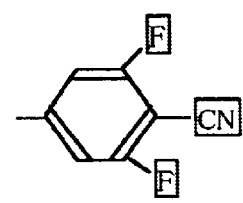
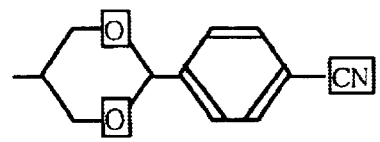
FIG.66

LIQUID CRYSTAL DISPLAY DEVICE WHEREIN PIXELS HAVING PARTICULAR METAL LAYER BETWEEN ALIGNMENT FILM AND PROTECTIVE FILM

BACKGROUND OF THE INVENTION

1. Field of the Invention

The present invention relates to a liquid crystal display device and, more particularly, to an active matrix liquid crystal display device.

2. Description of the Related Art

Active matrix liquid crystal display devices using active elements represented by thin-film transistors (TFTs) are becoming widely used as display terminals for OA equipment or the like because of their features of thin size and light weight as well as their high picture quality which compares with Braun tubes.

Display methods for such liquid crystal display devices are generally classified into the following two methods. In one of the methods, a liquid crystal is interposed between two substrates each having a transparent electrode, and a voltage is applied across transparent electrodes to drive the liquid crystal, whereby light which has entered the liquid crystal is modulated to display a picture. This method is currently adopted by almost all popular products. In the other method, two electrodes are arranged over one substrate and a liquid crystal is driven by an electric field generated between two electrodes nearly in parallel with substrate surfaces, whereby light which has entered the liquid crystal is modulated to display a picture. This method has the feature of remarkably wide viewing angles, and is mainly adopted by part of liquid crystal monitor products.

The feature of the latter method is disclosed in, for example, Japanese Patent Application Laid-Open No. 505247/1993, Japanese Patent Publication No. 21907/1988, Japanese Patent Laid-Open Nos. 160878/1994, 15650/1997, 225388/1995, 306417/1995, and U.S. Pat. Nos. 5,754,266, 2,701,698, and 5,910,271.

The former method which uses electrodes formed over a protective film is disclosed in Japanese Patent Laid-Open Nos. 165059/1993 and 323373/1993 and U.S. Pat. No. 5,334,859.

SUMMARY OF THE INVENTION

However, it has been discovered that if the latter type of liquid crystal display device having the above-described construction continuously displays a picture by supply of electricity, black spotted irregularities (hereinafter referred to as contamination spots) are generated in places in the display device. In addition, it has been discovered that such contamination spots easily occur in display devices using liquid crystals having cyano groups, as described in Japanese Patent Laid-Open Nos. 225388/1995 and 306417/1995.

It has been found out that the latter method has another problem. As described in Japanese Patent Laid-Open No. 306417/1995, the latter method can use a liquid crystal of low resistivity, but such a liquid crystal tends to easily absorb impurities, so that impurities in the liquid crystal flow into the display and form indefinite black irregularities, or are stored in an edge portion of a display pattern and form image retention (image persistence). The invention has been made in view of the above-described problems, and provides a liquid crystal display device which can realize a wide viewing angle, a high picture quality and a high reliability by preventing indefinite black irregularities (contamination spots) or the like which are problems peculiar to the mass-production of IPS liquid crystal display devices (IPS: In-Plane Switching mode).

The outline of a representative aspect of the invention disclosed herein will be described below in brief. There is provided an in-plane switching mode liquid crystal display device having a construction in which scanning signal lines, video signal lines, pixel electrodes and counter electrodes for displaying a picture are formed under a passivation film formed over one of a pair of substrates, while electrodes or lines each having either or both of a positive pole and a negative pole are formed over the passivation film, and the electrodes or lines for displaying a picture are connected to the electrodes or lines each having either or both of a positive pole and a negative pole, via through-holes.

According to this construction, it is possible to restrain spotted black irregularities (contamination spots) from occurring when protective-film defects exist in the electrodes and lines. Incidentally, in the invention, the term "electrode and line on a negative side" means a scanning signal line. An electrode or line which is at a higher potential than the scanning signal line is termed "electrode or line on a positive side", and the term "electrode or line on a positive side" means the electrodes or lines required to display a picture, such as video signal lines, pixel electrodes and counter electrodes.

BRIEF DESCRIPTION OF THE DRAWINGS

The invention will become more readily appreciated and understood from the following detailed description of preferred embodiments of the invention when taken in conjunction with the accompanying drawings, in which:

FIGS. 8A and 8B are, respectively, a plan view and a cross-sectional view showing the connection portion between a gate terminal GTM and a gate line GL as well as the vicinity of the connection portion;

FIGS. 9A and 9B are, respectively, a plan view and a cross-sectional view showing the connection portion between a drain terminal DTM and a video signal line DL as well as the vicinity of the connection portion;

FIGS. 11A and 11B are, respectively, a plan view and a cross-sectional view showing the connection portion between a counter electrode terminal CTM2, a common bus line CB2 and the counter voltage signal line CL as well as the vicinity of the connection portion;

FIG. 65 is a view showing one example of the molecular structure of a cyano-containing liquid crystal;

FIG. 66 is a view showing one example of an reduction reaction of the cyano-containing liquid crystal;

DETAILED DESCRIPTION OF THE INVENTION

Figure 1:
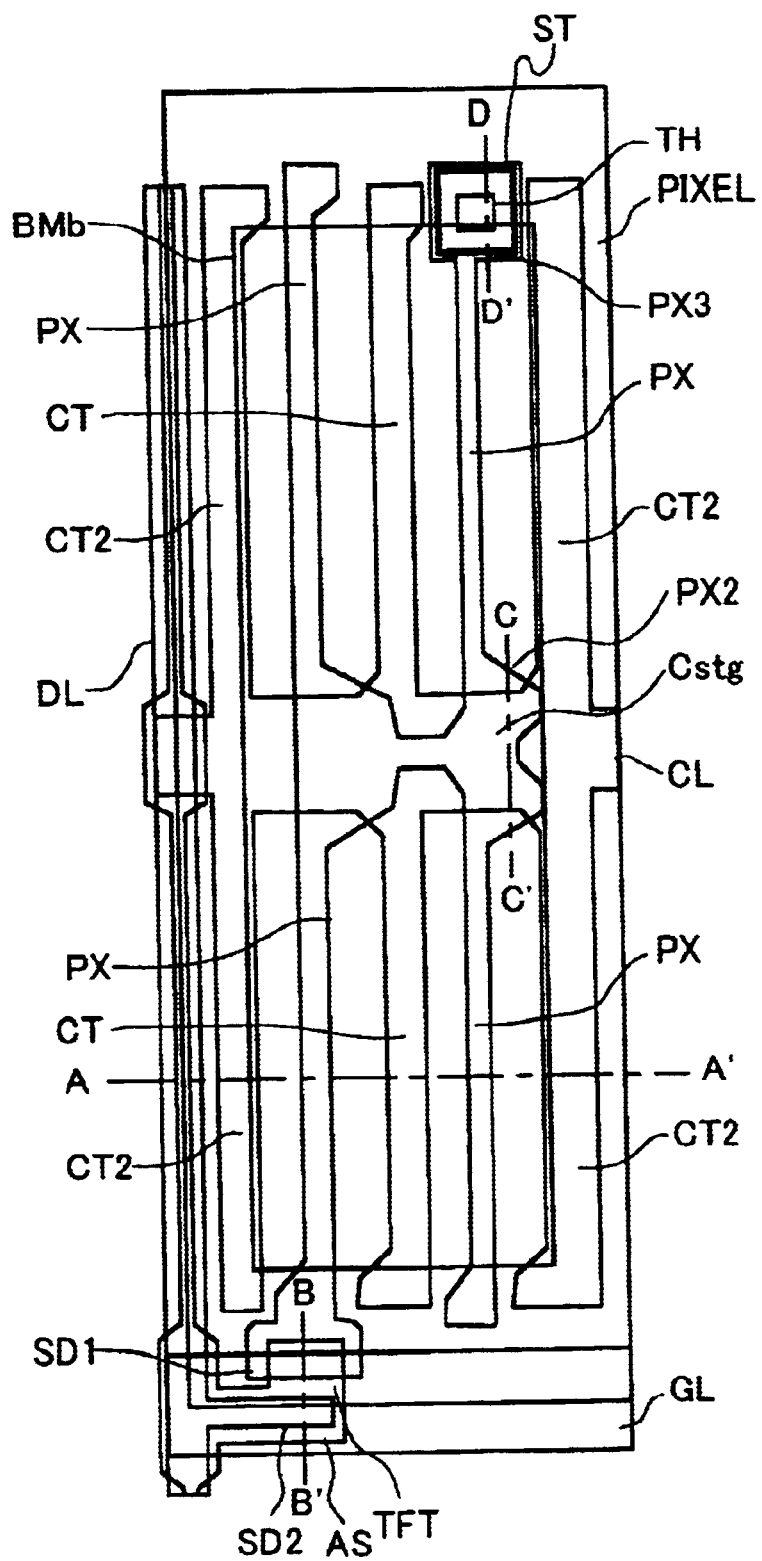
FIG. 1 is a plan view showing one pixel of a liquid crystal display part of an active matrix color liquid crystal display device according to one Embodiment of this invention.

The details of the invention will be described below. Although not described herein, all combinations of embodiments which will be described below are to be construed to belong to the category of the invention.

Embodiment 1

<<Active Matrix Liquid Crystal Display Device>>

An embodiment of an active matrix type of color liquid crystal display device to which the invention is applied will be described below. Incidentally, in drawings which will be referred to below, constituent elements having identical functions are denoted by identical reference numerals, and repetition of the same description is omitted herein.

<<Plane Construction of Matrix Part (Pixel Part)>>

Figure 2:
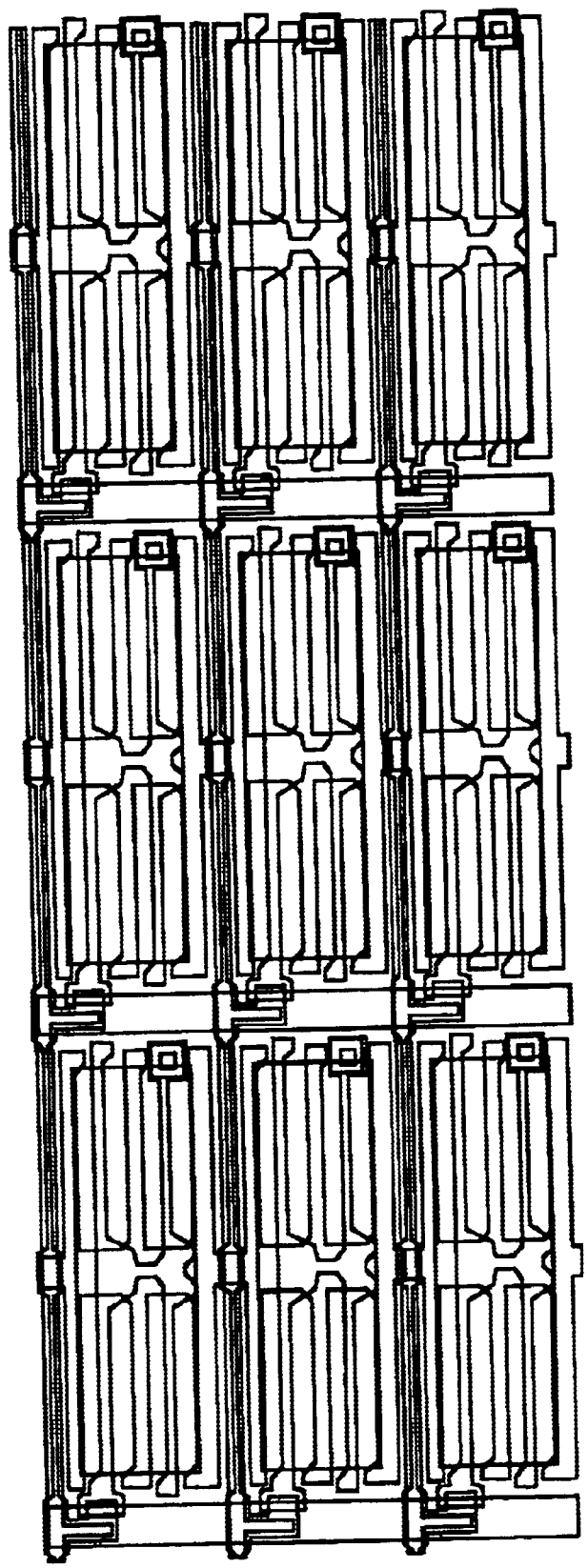
FIG. 2 is a plan view showing the surrounding portion of the one pixel of the liquid crystal display part of the active matrix color liquid crystal display device according to one Embodiment of this invention.

FIG. 1 is a plan view showing the construction of one pixel of the active matrix liquid crystal display element according to the invention, and FIG. 2 is a plan view showing the relationship between the one pixel and the surrounding portion.

As shown in FIGS. 1 and 2, each pixel PIXEL is disposed in an intersection area (an area surrounded by four signal lines) of two adjacent scanning signal lines (gate signal lines or horizontal signal lines) GL and two adjacent video signal lines (drain signal lines or vertical signal lines) DL. Each pixel PIXEL includes a thin film transistor TFT, a storage capacitance Cstg, pixel electrodes PX, counter electrodes CT and CT2 and a counter voltage signal line CL. The scanning signal lines GL and the counter voltage signal line CL are disposed to extend in the lateral direction and to be juxtaposed in the vertical direction, as viewed in FIGS. 1 and 2. The video signal lines DL are disposed to extend in the vertical direction and to be juxtaposed in the lateral direction, as viewed in FIGS. 1 and 2. Each of the pixel electrodes PX is formed of a conductive film d3, and is electrically connected to the thin film transistor TFT via a source electrode SD 1 which is formed integrally with the pixel electrode PX. The counter electrodes CT and CT2 are formed of a conductive film g3, and is electrically connected to the counter voltage signal line CL. A drain electrode SD2 of the thin film transistor TFT is formed of the same conductive film g3 as the pixel electrodes PX, and is formed integrally with the video signal line DL. Incidentally, the gate electrode of the thin film transistor TFT uses a part of the scanning signal line GL. In addition, the storage capacitance Cstg is formed by superposing the counter voltage signal line CL and a part PX2 of the pixel electrodes PX on each other.

The pixel electrodes PX and the counter electrodes CT and CT2 are disposed to oppose each other, and control the state of display by controlling the optical state of a liquid crystal LC by means of an electric field which is approximately parallel to substrate surfaces or has components parallel to the substrate surfaces between each of the pixel electrodes PX and the adjacent one of the counter electrodes CT and CT2. The pixel electrodes PX and the counter electrodes CT and CT2 are arranged in a comb-teeth-like shape, and are each formed as an electrode which is elongated in the vertical direction as viewed in FIGS. 1 and 2.

The counter electrodes CT are constructed so that the number (O) of the counter electrodes CT (the number of teeth) in one pixel and the number (P) of the pixel electrodes PX (the number of teeth) in one pixel necessarily have the relationship of O=P−1 (in Embodiment 1, O=P−1), while the number of the counter electrodes CT2 necessarily becomes two. This is because it is necessary that the counter electrodes CT and CT2 and the pixel electrodes PX be alternately disposed with the counter electrodes CT2 being disposed adjacently to the video signal line DL. In this construction, the counter electrodes CT2 can shield the counter electrodes CT and CT2 and the pixel electrodes PX against the lines of electric force generated from the video signal line DL so that the electric fields between the counter electrodes CT and CT2 and the pixel electrodes PX are prevented from being influenced by an electric field generated from the video signal line DL. Since the counter electrodes CT2 are consistently supplied with a potential from the outside through the counter voltage signal line CL, the potentials of the counter electrodes CT2 are stable. Accordingly, even if the counter electrodes CT2 are adjacent to the video signal line DL, almost no variations occur in the potentials of the counter electrodes CT2. In addition, in this construction, since the geometric positions of the pixel electrodes PX are away from the video signal line DL, the parasitic capacitances between the pixel electrodes PX and the video signal line DL are decreased to a great extent, and variations in a pixel electrode potential Vs due to video signal voltages can also be restrained. Accordingly, it is possible to restrain crosstalk which occurs in the vertical direction (a picture defect called vertical smear).

The electrode width of each of the pixel electrodes PX is made as thin as possible to the limit of machining accuracy so that the aperture ratio of the display device can be made large. In addition, the electrode width of each of the counter electrodes CT is also made as thin as possible to the limit of machining accuracy so that the aperture ratio can be made large. In Embodiment 1, each of the pixel electrodes PX and the counter electrodes CT is 5 μm wide. Incidentally, the electrode widths of the pixel electrodes PX and those of the counter electrodes CT may be made different, such as 4 μm, 6 μm, 7 μm and 8 μm, according to the convenience of pixel design.

The electrode width of the video signal line DL may be the same as that of each of the pixel electrodes PX or that of each of the counter electrodes CT, but to prevent disconnection, it is preferable to make the electrode width of the video signal line DL slightly wider than those of the pixel electrodes PX and the counter electrodes CT. In Embodiment 1, the electrode width of the video signal line DL is made 8 μm. The electrode width of the video signal line DL is set to be less than twice that of each of the adjacent counter electrodes CT2. Otherwise, in the case where the electrode width of the video signal line DL is determined from the productivity of yield factor, the electrode width of each of the counter electrodes CT2 adjacent to the video signal line DL is set to a value exceeding ½ of that of the video signal line DL. This setting is intended to enable the lines of electric force generated from the video signal line DL to be absorbed by both adjacent counter electrodes CT2 lying on the opposite sides of the video signal line DL, and if the lines of electric force generated from a certain electrode width are to be absorbed, it is necessary to use an electrode having an electrode width equal to or greater than the certain electrode width.

Therefore, since each of the adjacent counter electrodes CT2 lying on the opposite sides of the video signal line DL needs only to absorb the lines of electric force generated from half (a 4-μm-wide portion) of the video signal line DL, the electrode width of each of the counter electrodes CT adjacent to the video signal line DL is made more than ½.

In addition, the electrode width of each of the counter electrodes CT2 needs to be more than ½ of the electrode width of each of the pixel electrodes PX because the counter electrodes CT2 need to absorb the lines of electric force from the pixel electrodes PX and generate electric fields to operate the liquid crystal molecules in the areas between the counter electrodes CT2 and the pixel electrodes PX. Accordingly, to satisfy those both requirements, the electrode width of each of the counter electrodes CT2 needs to be greater than or equal to a value obtained by adding ½ of the electrode width of each of the pixel electrodes PX to ½ of the electrode width of the video signal line DL. In Embodiment 1, the electrode width of each of the counter electrodes CT2 is made 10 μm. In addition, as a whole, it is preferable that a value obtained by adding the sum of the widths of the pixel electrodes PX to the width of the video signal line DL be equal to or less than the sum of those of the counter electrodes CT and CT2.

According to this construction, it is possible to apply effectively and uniformly the electric fields between the pixel electrodes PX and the counter electrodes CT and CT2, and it is also possible to prevent crosstalk from occurring due to the influence of a video signal, particularly in the vertical direction (vertical crosstalk).

In addition, it is preferable that the width of each of the pixel electrodes PX, the counter electrodes CT and CT2 and the video signal line DL be made larger than the thickness of a liquid crystal layer (to be described later) so that sufficient electric fields can be applied to the entire liquid crystal layer in the thickness direction the liquid crystal layer.

The electrode width of each of the scanning signal lines GL is set to satisfy a resistance value which enables a scanning voltage to be fully applied to a gate electrode GT of a pixel located on a trailing-end side (the opposite side to a scanning electrode terminal GTM which will be described later). In addition, the electrode width of each of the counter voltage signal lines CL is set to satisfy a resistance value which enables a counter voltage to be fully applied to the counter electrodes CT of a pixel located on the trailing-end side (a pixel farthest from common bus lines CB1 and CB2 which will be described later, i.e., an intermediate pixel between CB1 and CB2).

The electrode distance between each of the pixel electrodes PX and an adjacent one of the counter electrodes CT and CT2, the number of the pixel electrodes PX and the number of the counter electrodes CT are determined by pixel pitch, liquid crystal material, particularly, inherent driving voltage parameter of liquid crystal material, and breakdown voltage of video signal driver circuit (signal-side driver). The reason for this is that since the electric field strength required to achieve a maximum optical transmissivity differs for different liquid crystal materials, the electrode distance needs to be set according to the kind of liquid crystal material so that the maximum optical transmissivity can be obtained within the maximum amplitude range of a signal voltage to be set by the breakdown voltage of video signal driver circuits to be used (signal-side drivers). In Embodiment 1, since the pixel pitch is 99 µm, the electrode distance is made 13.5 µm and the number of the pixel electrodes PX is made four, on the basis of a driver voltage parameter which is determined by the dielectric anisotropy $\Delta\in$ and the twist elastic constant $K_{22}$ of a liquid crystal which will be described later.

Incidentally, it is apparent that the specific numerical values used in Embodiment 1 are mere examples and no matter how arbitrarily such numerical values are set within limits which satisfy the above-described relationship, it is possible to achieve the same advantages as the present invention.

The most important constituent element in which the gist of the invention resides is an electrode ST shown in FIG. 1. With this electrode ST, it is possible to reduce a stain which becomes gradually rounder and darker (a contamination spot). In Embodiment 1, the electrode ST is connected to a portion PX3 of the pixel electrodes PX via a through-hole TH. Details will be described below.

<<Electrode ST>>

The electrode ST in which the gist of the invention resides is capable of reducing a spotted stain (contamination spot) which becomes gradually rounder and darker with electrical conduction time.

Figure 62:
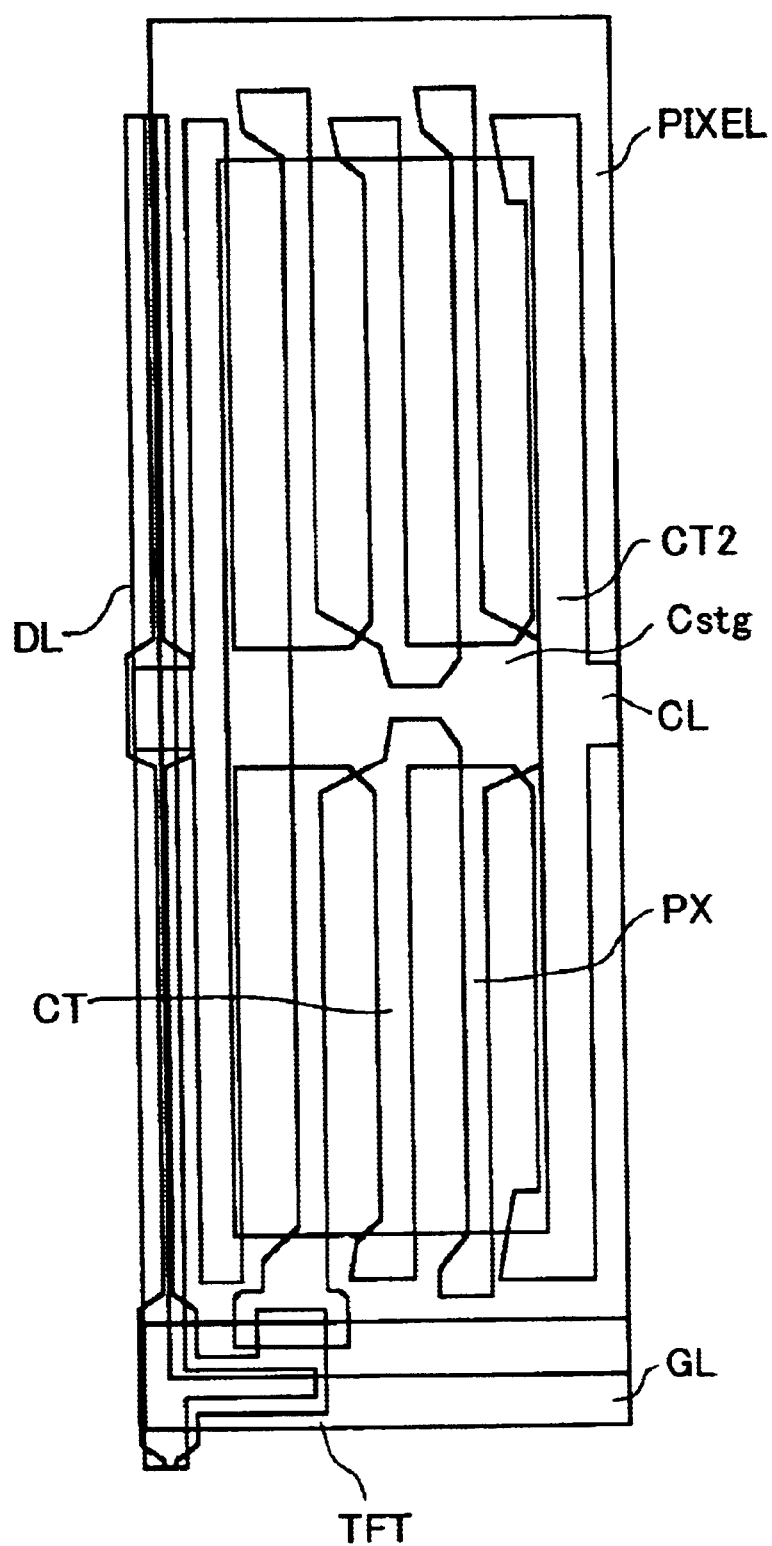
FIG. 62 is a plan view showing one pixel of a prior art example.

FIG. 62 is a plan view of one pixel of a prior art example. The pixel shown in FIG. 62 has no electrodes on a protective film PSV, and each electrode and each line are completely insulated from a liquid crystal by the protective film PSV. The contamination spot occurs when the voltage retention of the liquid crystal is lowered by an electrode reaction due to the flow of a direct current in the liquid crystal. The principle of the contamination spot will be described below.

In the prior art pixel, the reason why the current flows in the liquid crystal has been considered to be that two electrodes having different potentials are exposed above the protective film PSV and a leak current flows between the two electrodes. However, the microscopic observation of almost all contamination spot portions has shown that one insulating-film defect can only be observed in any of the contamination spot portions. From this result, a mechanism has been inferred which is caused by a current due to the charging of the protective film capacitance of another electrode by the exposed electrodes. In this case, even if the number of protective-film defects is one, a charge current flows and a contamination spot occurs.

A sample was prepared in which defects were deliberately formed in its protective film PSV and its insulating film GI, and the state of contamination spots was observed. As a result, a contamination spot was observed even in an area where a defect was formed on only one electrode, and even in an area where defects were respectively formed in the respective two electrodes having different potentials, two contamination spots were observed and it was apparent that the contamination spots occurred in the respective defective portions. From this fact as well, it is confirmed that the contamination spots were caused by electrode reactions due to the flow of a charge current into the protective-film capacitance of the latter.

Figure 63A:
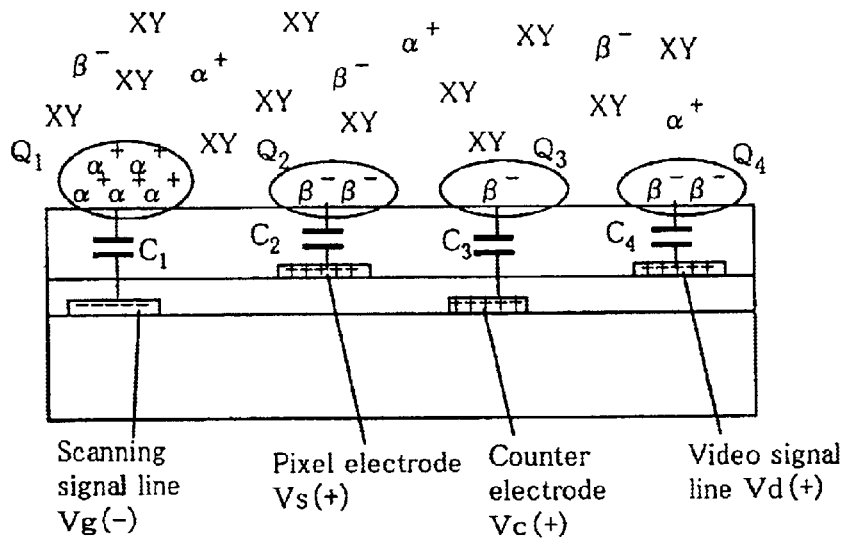
FIG. 63 is a view showing the principle of occurrence of a contamination spot on a positive side.
Figure 63B:
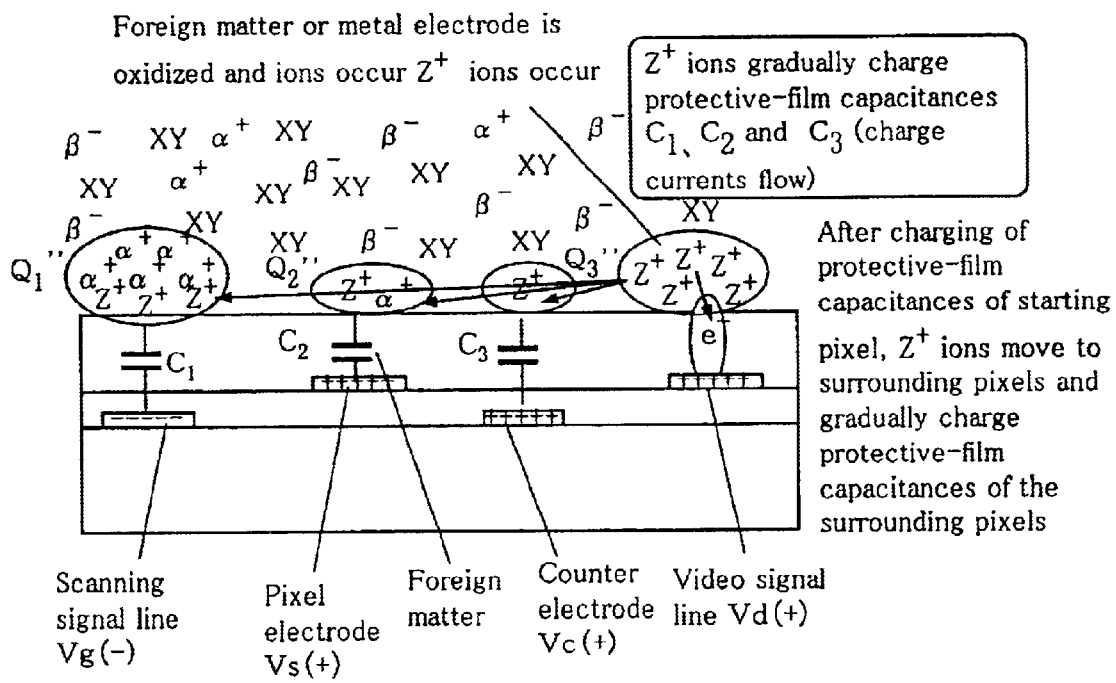
Figure 64A:
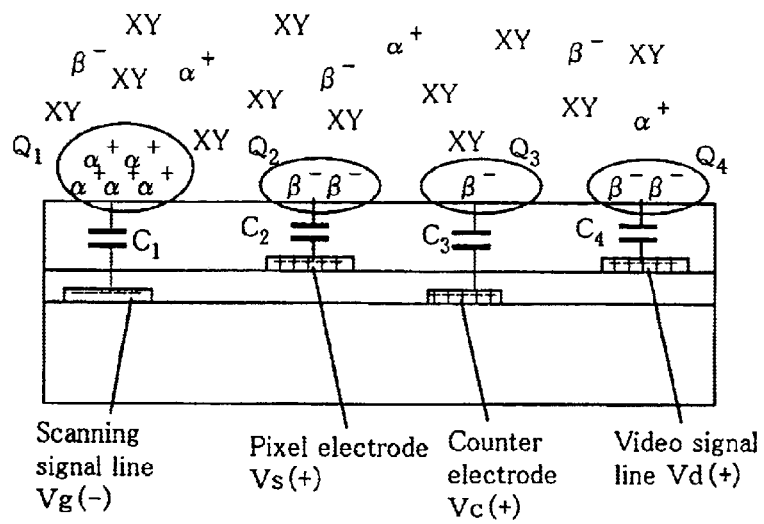
FIG. 64 is a view showing the principle of occurrence of a contamination spot on a negative side.
Figure 64B:
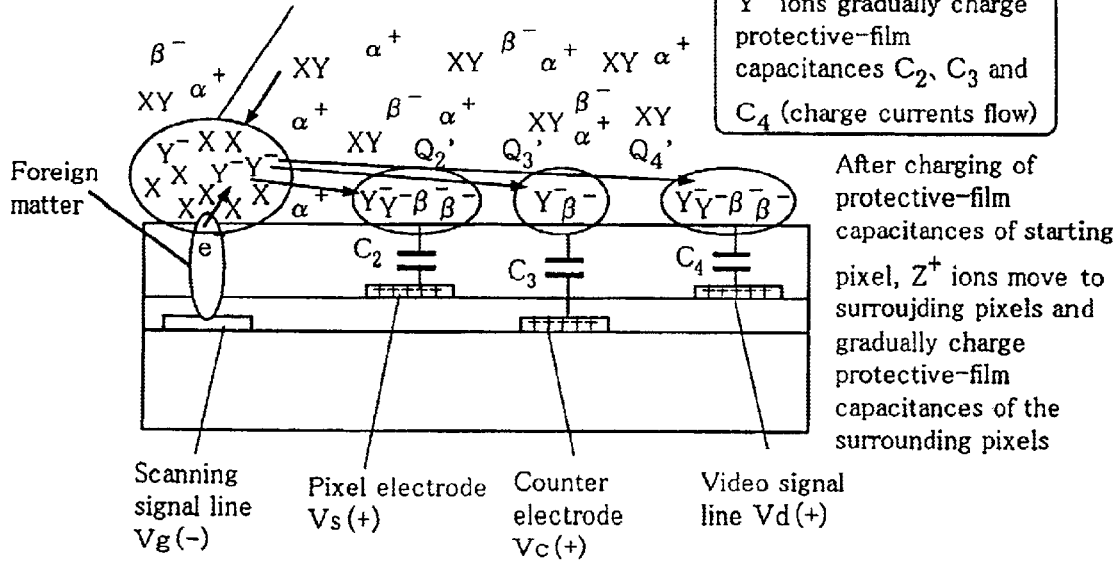

FIGS. 63 and 64 show the detailed mechanisms of such a phenomenon. As shown in FIG. 63 by way of example, metallic foreign matter which has caused a protective-film defect is oxidized above an electrode located on a positive side of higher potential, or this electrode itself is oxidized, thereby producing positive ions and charging the protective-film capacitance of another electrode with the potential on the positive side. This charge current also flows into the surrounding pixel capacitances, and extends the area charged with the potential on the positive side. In the charged area, the ion concentration becomes high due to the increase of positive ions, and the resistivity of a liquid crystal lowers and the retention of a voltage applied to the liquid crystal lowers. As a result, during a normally black mode in which black is obtained with no voltage applied, pixels which surround the protective-film defect become darker than those surrounding the pixels, and are observed as a black spotted luminance irregularity.

As shown in FIG. 64, above an electrode located on the positive side of lower potential, liquid crystal molecules are reduced and decomposed into negative ions to charge the protective-film capacitance of another electrode with the potential on a negative side. This charge current also flows into the surrounding pixel capacitances, and extends the area charged with the potential on the negative side. In the charged area, the ion concentration becomes high due to the increase of negative ions, and the resistivity of the liquid crystal lowers and the retention of the voltage applied to the liquid crystal lowers. As a result, during a normally black mode in which black is obtained with no voltage applied, pixels which surround the protective-film defect become darker than those surrounding the pixels, and are observed as a black spotted luminance irregularity.

In FIGS. 63 and 64, symbols XY represent the liquid crystal molecules, while symbols X and $Y^-$ represent the decomposed state of the liquid crystal molecules. Symbols $\alpha^+$ and $\beta^-$ represent the dissociated state of impurity ions or dopants in the liquid crystal, and symbols $Z^+$ represent the melted and ionized state of the foreign matter or the electrodes.

Particularly in a scheme which applies an electric field parallel to a substrate surface (In-Plane Switching Mode), it is favorable to use a cyano-containing liquid crystal containing a cyano group which cannot be used in a twisted nematic type of TFT-LCD because of its low resistivity but is capable of high-speed response and low-voltage driving. FIG. 65 shows one example of the molecular structure of a cyano-containing liquid crystal. Incidentally, FIG. 65 shows only a part of the molecular structure.

Such a liquid crystal molecule shows a reduction reaction at a negative pole, as shown in FIG. 66 by way of example, and is decomposed into a neutral host portion and cyano ions. In this manner, in the prior art pixel, even if there is only one protective-film defect, a black spotted stain (contamination spot) occurs. This contamination spot is not observed during its initial state because no reaction yet occurs, but when electrical conduction continues, the reaction proceeds and the size of the contamination spot reaches an observable level to cause a display defect.

To cope with this problem, in the invention, electrodes or conductors which are deliberately given potentials are disposed on a protective film. In other words, the electrodes or conductors which are given potentials are formed above the protective film or below an alignment film. In this construction, by charging the capacitance of the protective film in advance, it is possible to prevent a charge current from easily flowing, even if a protective-film defect occurs and an electrode is exposed.

Figure 67:
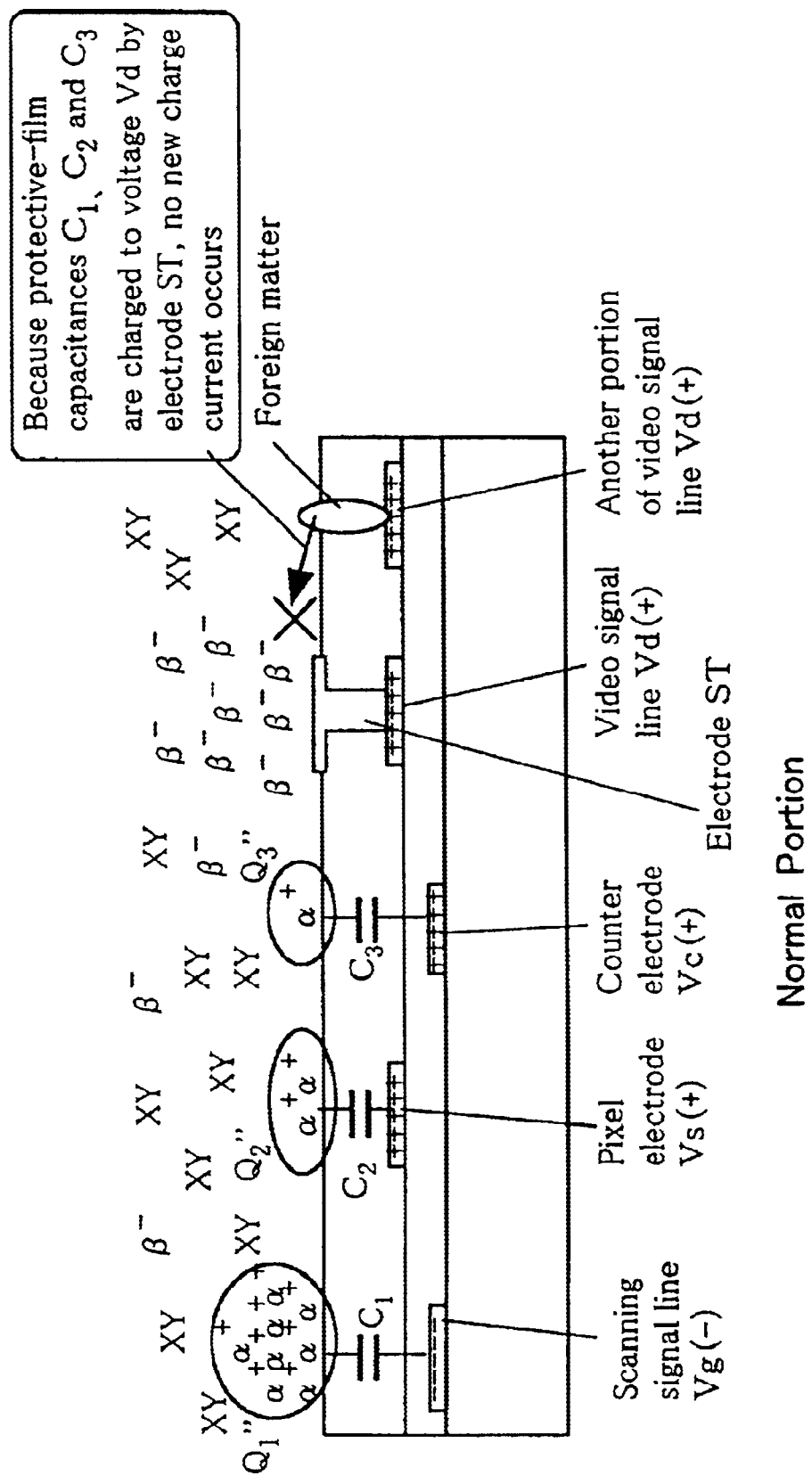
FIG. 67 is a view showing the restraint principle of the occurrence of a contamination spot in the case where an electrode ST is installed on the positive side.
Figure 68:
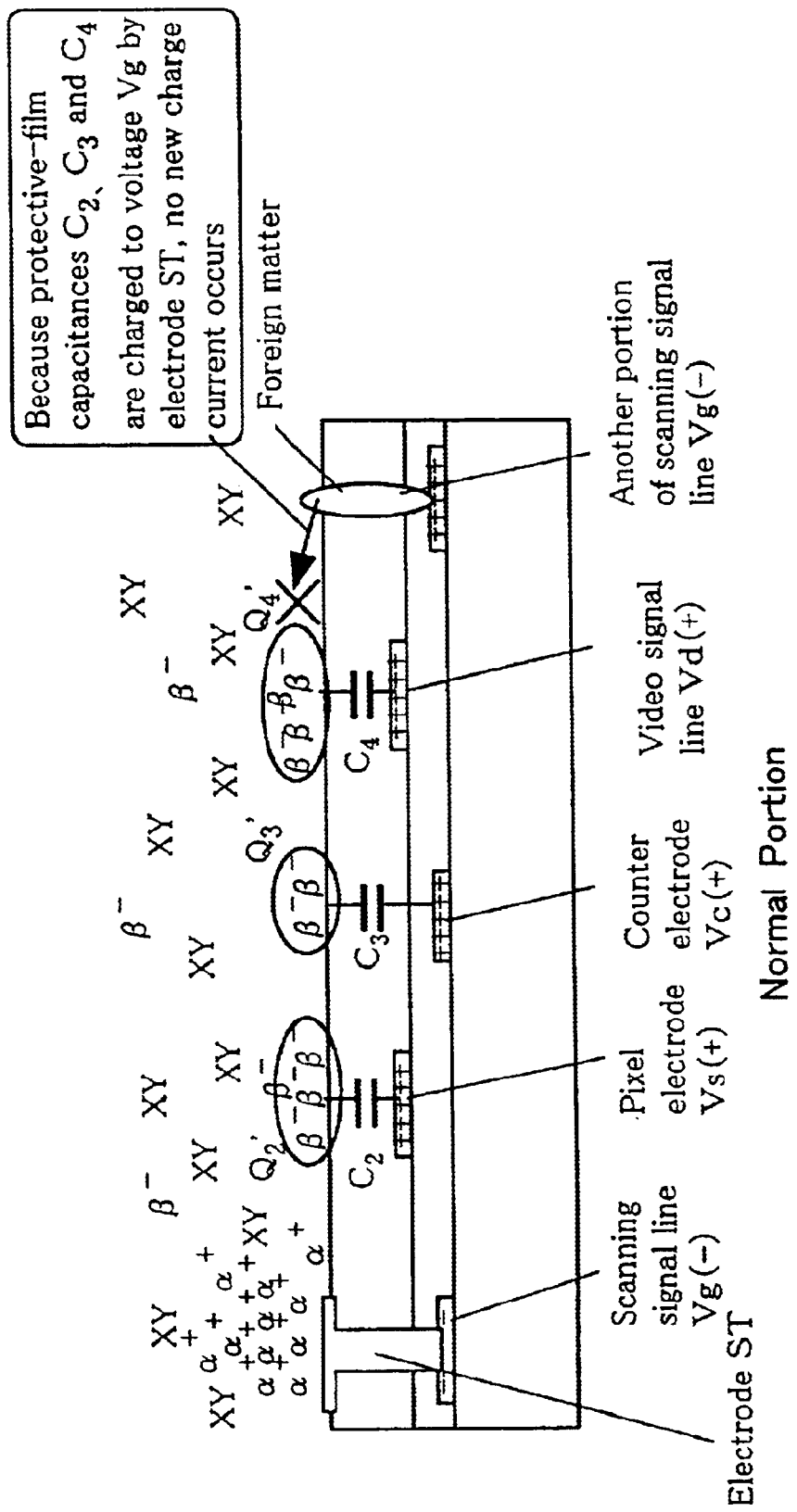
FIG. 68 is a view showing the restraint principle of the occurrence of a contamination spot in the case where an electrode ST is installed on the negative side.

Accordingly, an electrode reaction (electrochemical reaction) at a negative or positive pole is restrained, whereby melting of metal ions and reduction of liquid crystal molecules are restrained. In other words, since the electrode reaction is a phenomenon which occurs after a current flows, and if a current does not flow, the electrode reaction does not occur and the occurrence of a contamination spot is restrained. Accordingly, since a decrease in the retention of a voltage applied to the liquid crystal molecules is prevented, the contamination spot is reduced. FIG. 67 shows the case where the electrode ST is disposed on a positive side, while FIG. 68 shows the case where the electrode ST is disposed on a negative side.

Figure 6:
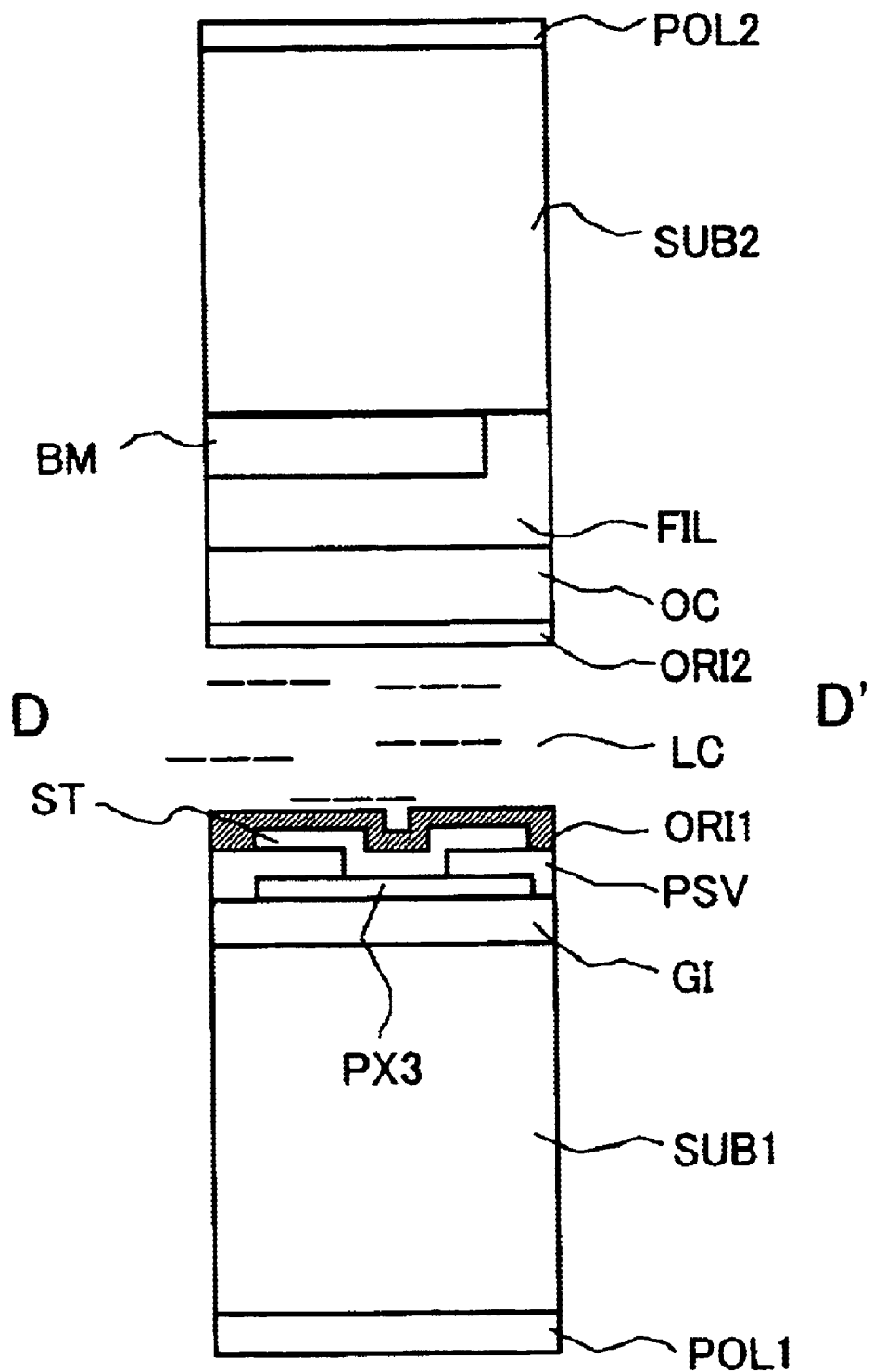
FIG. 6 is a cross-sectional view of an electrode ST portion taken along cutting line D–D' of FIG. 1.

In Embodiment 1, the electrode ST is formed of a metal film (a layer containing metal atoms) i1, and is connected to the portion PX3 of the pixel electrodes PX via the through-hole TH. Moreover, this electrode ST needs to be necessarily supplied with a potential from the outside, and the effect of the electrode ST cannot be obtained from a floating-electrode structure. For this reason, as shown in FIGS. 1 and 6, the through-hole TH is formed in the protective film PSV, and the electrode ST is connected to another electrode via the through-hole TH. In Embodiment 1, the electrode ST is connected to the portion PX3 formed integrally with the pixel electrodes PX.

Even if variations occur in the working accuracy of the through-hole TH or the electrode ST during a manufacturing process, a base which is larger than the pixel electrode PX integral with the portion PX3 as shown in FIG. 1 is disposed integrally with the pixel electrode PX in a portion in which the portion PX3 is superposed on the through-hole TH at an end of the pixel electrode PX, so that the portion PX 3 of the pixel electrode PX can necessarily provide contact with the electrode ST.

In this manner, in Embodiment 1, the electrode ST electrically connected to the pixel electrode PX is formed over a protective film PAS. In this construction, a capacitance (protective-film capacitance), which is resultantly formed between the liquid crystal and the pixel electrodes PX as well as the counter electrodes CT and CT2 and whose dielectric is the protective film PSV or a protective film PSV1 and an insulating film GI, is steadily charged by the electrode ST, whereby a charge current does not flow even if an electrode having approximately the same direct current potential as the electrode ST (in the case of alternating current, an electrode having approximately the same potential as the electrode ST in terms of its DC component) is exposed to the liquid crystal layer by foreign matter or the like. Therefore, an electrochemical reaction (electrode reaction) does not occur near the exposed electrode. In other words, since the electrode ST is formed over the protective film PSV, it is possible to restrain a charge current from flowing into a protective-film capacitance of another electrode owing to a protective-film defect on the electrode, whereby it is possible to restrain the occurrence of a contamination spot.

Particularly in the invention, the gate electrodes GT or the scanning signal lines GL are defined as negative-side electrodes or lines. Moreover, electrodes or lines which are of higher potential than the gate electrodes GT or the scanning signal lines GL are defined as positive-side electrodes or lines. The positive-side electrodes and lines are the source electrodes SD1, the drain electrodes SD2, the video signal lines DL, the pixel electrodes PX, the counter electrodes CT and CT2, and the counter voltage signal lines CL. As described above, in Embodiment 1, as one example of such positive-side electrodes or lines, the electrode ST is electrically connected to the pixel electrodes PX, but the electrode ST may be electrically connected to an electrode or a line which has either or both of positive and negative poles. These combinations and their unique advantages will be described later as other embodiments.

Although in Embodiment 1 a metal film (a layer containing metal atoms) is used for the electrode ST, ITO or IZO may also be used. Otherwise, it is also preferable to use a metal which forms a self-oxidized film, such as aluminum or aluminum alloy. This is because a self-oxidized film of ITO, IZO, aluminum or aluminum alloy is an oxide and, as compared with other metal films, an oxidation reaction does not easily occur after the formation of the electrode ST. In particular, since the electrode ST is provided over the protective film PSV, there is the risk that if an oxidation reaction occurs, electrons or holes flow out of the electrode ST and metal ions dissolve in a liquid crystal material. Accordingly, it is preferable to use the above-described type of oxide film. However, if there is no such risk, a nonoxide metal material may be used.

Incidentally, at least one electrode ST may be disposed for plural pixels on the basis of the above-described detailed mechanism. However, as in Embodiments 7 and 8 which will be described later, plural electrodes ST may be formed in one pixel. In addition, it goes without saying that, as in Embodiment 1, one electrode ST may be disposed in one pixel.

<<Cross-Sectional Construction of Matrix Part (Pixel Part)>>

Figure 3:
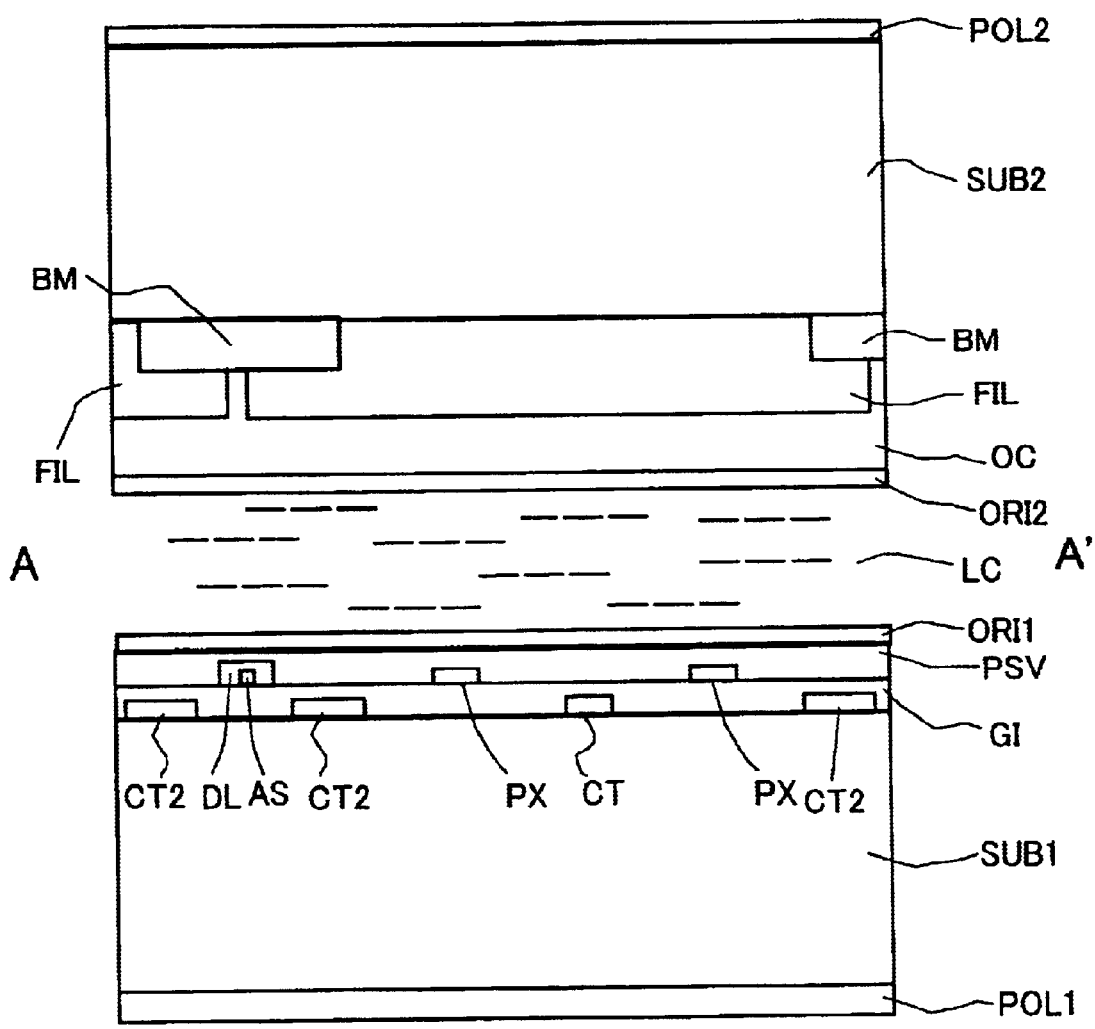
FIG. 3 is a cross-sectional view of a liquid crystal switching region portion taken along cutting line A–A' of FIG. 1.
Figure 4:
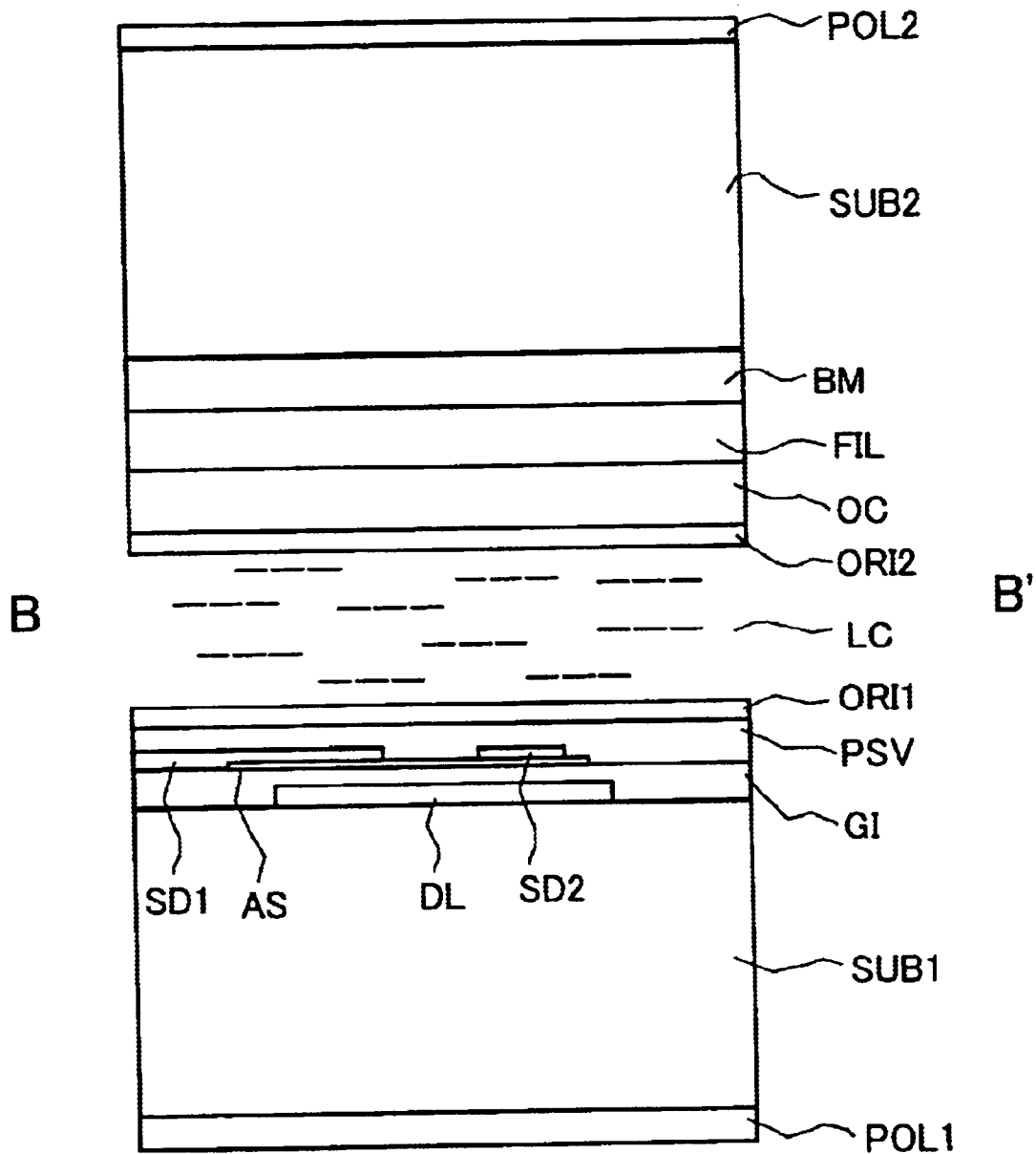
FIG. 4 is a cross-sectional view of a thin film transistor TFT portion taken along cutting line B–B' of FIG. 1.
Figure 5:
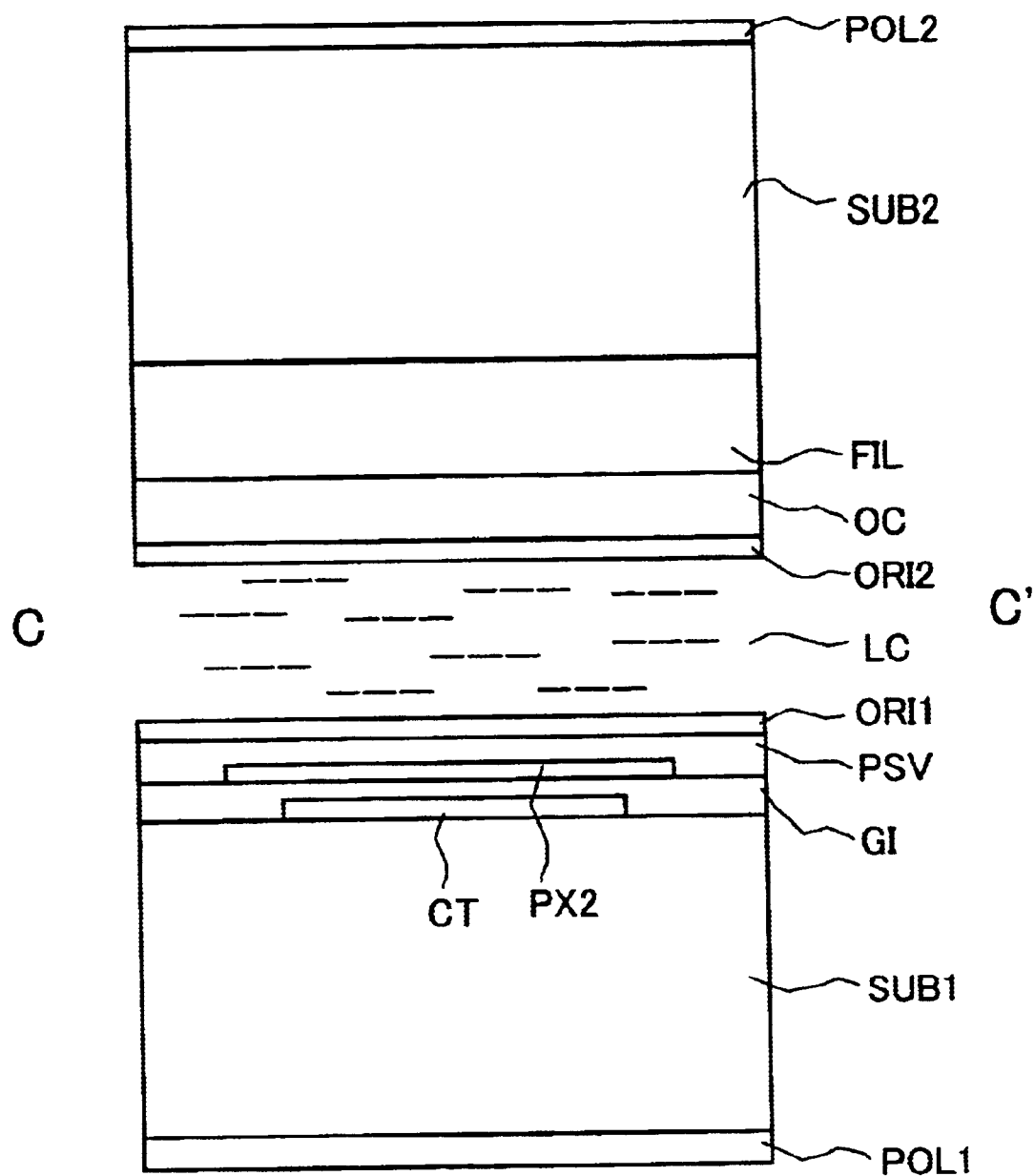
FIG. 5 is a cross-sectional view of a storage capacitance Cstg portion taken along cutting line C–C' of FIG. 1.

FIG. 3 is a cross-sectional view taken along cutting line A–A' of FIG. 1, FIG. 4 is a cross-sectional view of the thin film transistor TFT, taken along cutting line B–B' of FIG. 1, and FIG. 5 is a cross-sectional view of the storage capacitance Cstg, taken along cutting line C–C' of FIG. 1. As shown in FIGS. 3 to 5, the thin film transistor TFT, the storage capacitance Cstg and the above-described electrodes are formed over a lower transparent glass substrate SUB1 with respect to a liquid crystal layer LC, and a color filter FIL and a light-shielding black matrix pattern BM are formed over an upper transparent glass substrate SUB2.

Alignment films ORI1 and ORI2 which control the initial alignment of the liquid crystal are respectively provided over the inside surfaces (the liquid-crystal-LC-side surfaces) of the transparent glass substrates SUB1 and SUB2. Polarizers POL1 and POL2 which are arranged so that their polarizing axes are perpendicular to each other (crossed-Nicols arrangement) are respectively provided over the outside surfaces of the transparent glass substrates SUB1 and SUB2.

FIG. 6 is a cross-sectional view taken along cutting line D–D' of FIG. 1. The electrode ST must necessarily be formed over the protective film PSV. In other words, the electrode ST is formed under the alignment film ORI1. If stated in another way, a conductive film is formed over the protective film PSV or under the alignment film ORI1. This conductive film may have a volume resistivity of, preferably $10^{11}$ Ω·cm or less, more preferably $10^4$ Ω·cm or less. In Embodiment 1, a transparent conductive film i1 (Indium-Tin-Oxide, ITO: nesa film) is used for the conductive material of the electrode ST. The material of the electrode ST may also be a metal, but if contamination of the liquid crystal material is given into consideration, ITO which is a stable material is suitable as a material to be provided over the protective film PSV. For the same reason, IZO (Indium-Zn-Oxide) is also suitable. If a metal is to be used, a material such as Al which does not easily cause an electrochemical reaction (electrode reaction) is more preferable than a material such as Cr which is low in standard potential and does not easily cause an electrode reaction.

Moreover, this electrode ST needs to be necessarily supplied with a potential from the outside and cannot perform its effect in a floating state. For this reason, as shown in FIGS. 1 and 6, the through-hole TH is formed in the protective film PSV, and the electrode ST is connected to another electrode via the through-hole TH. In Embodiment 1, the electrode ST is connected to the portion PX3 formed integrally with the pixel electrodes PX.

<<TFT Substrate>>

The construction of the lower transparent glass substrate SUB1 (TFT substrate) will be described below in detail.

<<Thin Film Transistor TFT>>

The thin film transistor TFT operates so that when a positive bias is applied to its gate electrode GT which constitutes part of the scanning signal line GL, its source-to-drain channel resistance becomes small, and when the bias is made zero, the channel resistance becomes large.

As shown in FIG. 3, the thin film transistor TFT has the gate electrode GT, the insulating film GI, an i-type semiconductor layer AS made of an i-type (intrinsic: not doped with a conductivity type determining impurity) amorphous silicon (Si), and a pair of source electrode SD1 and drain electrode SD2. Incidentally, it is to be understood that the drain and the source are originally determined by the bias polarity therebetween and during the operation of the circuit of this liquid crystal display device, the bias polarity is inverted and the drain and the source are switched therebetween. However, in the following description, for the sake of convenience, one of the electrodes is fixed as the drain and the other is fixed as the source.

<<Gate Electrode GT>>

The gate electrode GT is formed integrally with the scanning signal line GL, and a region of the scanning signal line GL is constructed to constitute the gate electrode GT. The gate electrode GT is a portion which surmounts the active region of the thin film transistor TFT. In this example, the gate electrode GT is formed of the single-layer conductive film g3. The conductive film g3 uses, for example, a chromium-molybdenum alloy (Cr—Mo) film formed by sputtering, but is not limited thereto. For example, Cr, Mo, W, Ti, Ta, Al or Cu or an alloy which mainly contains part or all of them may be used. If a decrease in resistance is desired, it is preferable to use Al or Cu or an alloy which mainly contains either or both of them. In addition, the conductive film g3 may be formed as a stacked film having a stacked structure made of two or more layers, and there are some cases where this stacked structure is useful in the process of tapering the cross section of the conductive film g3. Specifically, if a stacked structure having different corrosion potentials is used, its thin upper layer is formed into a perpendicular shape or an inversely tapered shape, and its lower layer thicker than the upper layer is formed into a forward tapered shape. Accordingly, the whole of the line is formed into a nearly forward tapered shape, whereby the coverage of an insulating film or the like which covers the line is compensated for. Incidentally, an alloy such as Cr—Mo, Cr—W, Cr—Ti or Cr—Ta is used for the thin upper layer, and Cr is used for the thick lower layer. According to this construction, the highest etching speed is obtained at the interface between the upper and lower layers by the influence of a cell reaction, whereby the side edge surfaces of the whole of the lower layer are each worked into a forward tapered shape, and the side edge surfaces of the upper layer are each worked into a shape perpendicular to the surface of the substrate SUB1 or a slightly inversely tapered shape.

Incidentally, in the case of Al, if hillocks are to be restrained from being generated from Al, it is effective to use Al as an alloy with Nd. In addition, the formation of an anodic oxide film on the surface of the gate electrode GT by anodization is effective in suppressing the occurrence of short-circuiting to another electrode.

<<Scanning Signal Line GL>>

The scanning signal line GL is made of the conductive film g3. The conductive film g3 of this scanning signal line GL is formed in the same manufacturing process as, and integrally with, the conductive film g3 of the gate electrode GT. A gate voltage Vg is supplied to the gate electrode GT from the outside circuit through the scanning signal line GL. In addition, the portion of the scanning signal line GL which intersects the video signal line DL is made thin so that the probability of short-circuiting to the video signal line DL can be reduced. Otherwise, the portion of the scanning signal line GL which intersects the video signal line DL may be bifurcated so that even if short-circuiting occurs, the scanning signal line GL and the video signal line DL can be separated from each other by laser trimming.

<<Insulating Film GI>>

The insulating film GI is used as a gate insulating film for giving an electric field to the semiconductor layer AS in cooperation with the gate electrode GT in the thin film transistor TFT. The insulating film GI is formed as a layer which overlies the gate electrode GT and the scanning signal line GL. As the insulating film GI, for example, a silicon nitride film formed by plasma CVD is selected and formed to a thickness of 2,000–5,000 Å (in Embodiment 1, approximately 3,500 Å). The insulating film GI also serves as an interlayer insulating film between the video signal line DL and the scanning signal line GL as well as the counter voltage signal line CL, and contributes to the electrical insulation therebetween. The gate insulating film may be an oxide silicon film. In addition, if the oxide silicon film is formed as two layers, the gate insulating film is effective in preventing short-circuiting from occurring between electrodes.

<<I-Type Semiconductor Layer AS>>

The i-type semiconductor layer AS is made of amorphous silicon and is formed to a thickness of 100–3,000 Å (in Embodiment 1, to a thickness of approximately 1,200 Å). A layer d0 is an $n^+$-type amorphous silicon semiconductor layer doped with phosphorus (P) for ohmic contact, and is left at only a location where the i-type semiconductor layer AS is present as an underlying layer and the conductive layer d3 is present as an overlying layer.

The i-type semiconductor layer AS and the layer d0 are also provided at the intersection (crossover) of the scanning signal line GL and the video signal line DL and at the intersection (crossover) of the counter voltage signal line CL and the video signal line DL. The respective i-type semiconductor layers AS at these respective intersections prevent short-circuiting from occurring between the scanning signal line GL and the video signal line DL as well as between the counter voltage signal line CL and the video signal line DL.

The i-type semiconductor layer AS is not limited to amorphous silicon, and may be formed of poly-silicon or single-crystal silicon. Incidentally, if amorphous silicon is used, it is preferable to make the i-type semiconductor layer AS as thin as possible so that a defective voltage retention due to photoconduction can be prevented.

<<Source Electrode SD1, Drain Electrode SD2>>

The source electrode SD1 and the drain electrode SD2 are each formed of the conductive film d3 which is in contact with the $n^+$-type semiconductor layer do.

The conductive film d3 uses a chromium-molybdenum (Cr—Mo) film formed by sputtering, and is formed to a thickness of 500–3,000 Å (in Embodiment 1, approximately 2,000 Å). Since the Cr—Mo film is a low stress film, the Cr—Mo film can be formed to a comparatively large thickness, and contributes to a reduction in the resistance of lines. In addition, the Cr—Mo film has good adhesion to the n+-type semiconductor layer d0. The conductive film d3 may use, in addition to the Cr—Mo film, a high melting point metal (Cr, Mo, Ti, Ta or W) film or a high melting point metal silicide ($MoSi_2$, $TiSi_2$, $TaSi_2$ or $WSi_2$) film. Otherwise, the conductive film d3 may have a stacked structure using Al or Cu or an alloy which mainly contains either or both of them.

After the conductive film d3 has been patterned with a mask pattern, the $n^+$-type semiconductor layer d0 is removed by using the conductive film d3 as a mask. In other words, the $n^+$-type semiconductor layer d0 which remains on the i-type semiconductor layer AS is removed in self-alignment from a portion where the conductive film d3 is absent. At this time, since the $n^+$-type semiconductor layer d0 is completely etched to a depth equivalent to its thickness, the surface portion of the semiconductor layer AS is also etched to a small extent, but the extent of this etching may be controlled with etching time.

In Embodiment 1, channel formation is performed with the above-described back channel etching (BCE) scheme, but a channel protection (CHP) scheme may also be used which protects a channel by forming an insulating film such as silicon nitride over the i-type semiconductor layer AS.

<<Video Signal Line DL>>

The video signal line DL is formed of the conductive film d3 which constitutes the same layer as the source electrode SD1 and the drain electrode SD2. The video signal line DL is formed integrally with the drain electrode SD2. The other construction of the video signal line DL is similar to those of the source electrode SD1 and the drain electrode SD2. If a decrease in resistance is desired, it is preferable that the video signal line DL has a stacked structure using Al or Cu or an alloy which mainly contains either or both of them.

<<Pixel Electrode PX>>

The pixel electrodes PX are formed of the conductive film d3 and are formed integrally with the source electrode SD2 as well as the portions PX2 and PX3 of the pixel electrodes PX. By applying a voltage between the pixel electrodes PX and the counter electrodes CT which will be described later, the operation of the liquid crystal molecules is controlled to provide display.

<<Counter Electrodes CT and CT2>>

The counter electrodes CT and CT2 are formed of the conductive film d3 and are formed integrally with the counter voltage signal line CL. By a voltage applied between the pixel electrodes PX and the counter electrodes CT and CT2 which will be described later, the operation of the liquid crystal molecules is controlled to provide display.

A counter voltage Vcom is applied to each of the counter electrodes CT. In Embodiment 1, the counter voltage Vcom is set to a potential which is lower than an intermediate DC potential between a minimum-level driving voltage Vdmin and a maximum-level driving voltage Vdmax which are applied to the video signal line DL, by a field-through voltage ΔVs which is generated when the thin film transistor TFT is to be turned off. However, if the power supply voltage of integrated circuits used in the video signal driver circuits is to be reduced to half, an AC voltage may be applied.

<<Counter Voltage Signal Line CL>>

The counter voltage signal line CL is formed of the conductive film g3. This counter voltage signal line CL is formed in the same manufacturing process as the conductive film g3 for the gate electrode GT, the scanning signal line GL and the counter electrodes CT, and is constructed to be electrically connectable to the counter electrodes CT.

Through the counter voltage signal line CL, the counter voltage Vcom is supplied to the counter electrodes CT from the outside circuit. In addition, the portion of the counter voltage signal line CL which intersects the video signal line DL is made thin so that the probability of short-circuiting to the video signal line DL can be reduced. Otherwise, such portion may be bifurcated so that even if short-circuiting occurs, the counter voltage signal line CL and the video signal line DL can be separated from each other by laser trimming.

<<Storage Capacitance Cstg>>

The conductive film d3 is formed to be superposed on the counter voltage signal line CL, in the portion of the source electrode SD2. As is also apparent from FIG. 5, this superposition constitutes the storage capacitance (electrostatic capacitance element) Cstg which uses the portion PX3 (d3) of the pixel electrodes PX as one electrode and the counter voltage signal line CL as the other electrode. The dielectric film of the storage capacitance Cstg is formed of the insulating film GI which is used as the gate insulating film of the thin film transistor TFT.

As shown in FIG. 1, the storage capacitance Cstg is formed in a portion of the counter voltage signal line CL in plan view.

<<Protective Film PSV1>>

The protective film PSV1 is provided over the thin film transistor TFT. The protective film PSV1 is formed mainly in order to protect the thin film transistor TFT from moisture or the like, and uses a material which has high transparency and good moisture resistance. The protective film PSV1 is formed, for example, of a silicon oxide film or nitride silicon film formed by a plasma CDV apparatus or an acrylic resin or polyimide, and is formed to a thickness of approximately 0.1–3 μm.

The protective film PSV1 is removed so that external connection terminals DTM and GTM are exposed. Regarding the thickness relationship between the protective film PSV1 and the insulating film GI, the protective film PSV1 is made thick in terms of the effect of protection, while the protective film PSV1 is made thin in terms of the mutual conductance gm of the thin film transistor TFT. In Embodiment 1, the protective film PSV1 is batch-worked by being patterned with the same photomask as the insulating film GI. Thus, the required number of manufacturing steps is reduced and an improvement in throughput can be realized. In the pixel part, the through-hole TH is formed to provide electrical connection between the portion PX3 of the pixel electrodes PX and the electrode ST. The through-hole TH is formed as a hole which extends up to the layer of the conductive film d3, because the through-hole TH is blocked by the conductive film d3.

<<Color Filter Substrate>>

Referring back to FIGS. 1 and 2, the construction of the upper transparent glass substrate SUB 2 (the color filter substrate) will be described below in detail.

<<Light-Shielding Film BM>>

The light-shielding film BM (which is called a black matrix) is formed over the upper transparent glass substrate SUB2 so that light transmitted through an unnecessary gap (a gap other than the gap between the pixel electrodes PX and the counter electrodes CT) is prevented from emerging into a display plane and lowering a contrast ratio or the like. The light-shielding film BM also serves the role of preventing external light or backlight from entering the i-type semiconductor layer AS. Specifically, the i-type semiconductor layer AS of the thin film transistor TFT is sandwiched between the overlying light-shielding film BM and the underlying gate electrode GT which is wider than the i-type semiconductor layer AS, whereby the i-type semiconductor layer AS is shielded from external natural light and backlight.

The lines Bmb shown in FIG. 1 are lines representative of the boundary of an aperture of the light-shielding film BM. The light-shielding film BM is constructed in matrix form to pass above the thin film transistor TFT and extend upwardly, downwardly, rightwardly and leftwardly with respect to the thin film transistor TFT as viewed in FIG. 1. This pattern is one example, and the shape of the aperture of the light-shielding film BM can be arbitrarily set on condition that the shape does not sacrifice contrast and other optical characteristics. Regarding a portion where the direction of an electric field is disturbed such as the end of each comb-teeth-like electrode, display appearing in that portion has a one-to-one correspondence to picture information for the pixel and becomes black in the case of picture information indicative of black and white in the case of picture information indicative of white. Accordingly, such display can be used as a part of a visual display.

The light-shielding film BM is formed of a film which has a light-shielding characteristic and a high insulation characteristic which does not affect the electric fields between the pixel electrodes PX and the counter electrodes CT. In Embodiment 1, a resist material which contains black pigment is prepared and is formed to a thickness of about 1.2 $\mu$m.

The light-shielding film BM is formed in matrix form to extend upwardly, downwardly, rightwardly and leftwardly with respect to each pixel in each row as viewed in FIG. 2, whereby an effective display area is partitioned along each row and each column by the lines of the matrix. Accordingly, the contours of the respective pixels arranged along each row and each column are made distinct by the light-shielding film BM. Specifically, the light-shielding film BM has two functions, i.e., the function of a black matrix and the function of shielding the semiconductor layer AS against light.

The light-shielding film BM is formed in a frame-like shape at the periphery of the upper transparent glass substrate SUB2, and the frame-like pattern is formed integrally with the pattern of the matrix portion shown in FIG. 1. The light-shielding film BM at the periphery is extended outwardly from a sealing portion SL to prevent leak light such as reflected light due to the structure of a manufactured apparatus such as a personal computer from entering the matrix portion, as well as to prevent light from a backlight or the like from leaking from a display area. In addition, the light-shielding film BM is set back by about 0.3–1.0 mm from the edges of the upper transparent glass substrate SUB2, and is formed to avoid a cut area of the upper transparent glass substrate SUB2.

<<Color Filter FIL>>

The color filter FIL is formed in a stripe-like shape so that a red filter element, a green filter element and a blue filter element are arranged in a repetitive pattern at positions corresponding to the individual pixels. The color filter FIL is formed to overlap the edge portion of the light-shielding film BM.

The color filter FIL can be formed in the following manner. A base material which contains a red, green or blue pigment such as acrylic resin is formed on a surface of the upper transparent glass substrate SUB2 and is patterned by photolithographic techniques, whereby filter elements for individual colors (red, green and blue) are formed in sequence. To make color purity far higher, such a base material may contain another color pigment such as a cyan pigment.

<<Overcoat Film OC>>

The overcoat film OC is provided for preventing a dye-stuff of the color filter FIL from leaking into the liquid crystal LC, and for flattening steps formed by the color filter FIL and the light-shielding film BM. The overcoat film OC is formed of a transparent resin material such as acrylic resin or epoxy resin.

<<Liquid Crystal Layer and Polarizer>>

The liquid crystal layer, the alignment films, polarizers and the like will be described below.

<<Liquid Crystal Layer>>

The liquid crystal material LC uses a nematic liquid crystal which has a positive dielectric anisotropy $\Delta\in$ of 13.2 and a refractive anisotropy $\Delta$n of 0.075 (789 nm, 20° C.). The thickness (gap) of the liquid crystal layer is 3.9 $\mu$m, and its retardation $\Delta$n·d is 0.285. The alignment films and the polarizers all of which will be described later are combined on the basis of the value of this retardation $\Delta$n·d, whereby when the liquid crystal molecules are rotated by 45° from the rubbing direction toward the field direction, a maximum optical transmissivity can be obtained and transmitted light having almost no wavelength dependence can be obtained within the range of visible light. Incidentally, the thickness (gap) of the liquid crystal layer is controlled with polymer beads. Moreover, the liquid crystal material LC is not limited to a particular kind, and the dielectric anisotropy $\Delta\in$ may also be negative. As the dielectric anisotropy $\Delta\in$ is made larger, the driving voltage can be reduced. Incidentally, as the refractive anisotropy $\Delta$n is made smaller, the thickness (gap) of the liquid crystal layer can be made larger, whereby the charge time of a liquid crystal can be reduced and a variation in gap size can be reduced. Particularly if uncolored white display is to be realized, it is preferable that the retardation be in the range of 0.25–0.32.

<<Alignment Film>>

Figure 21:
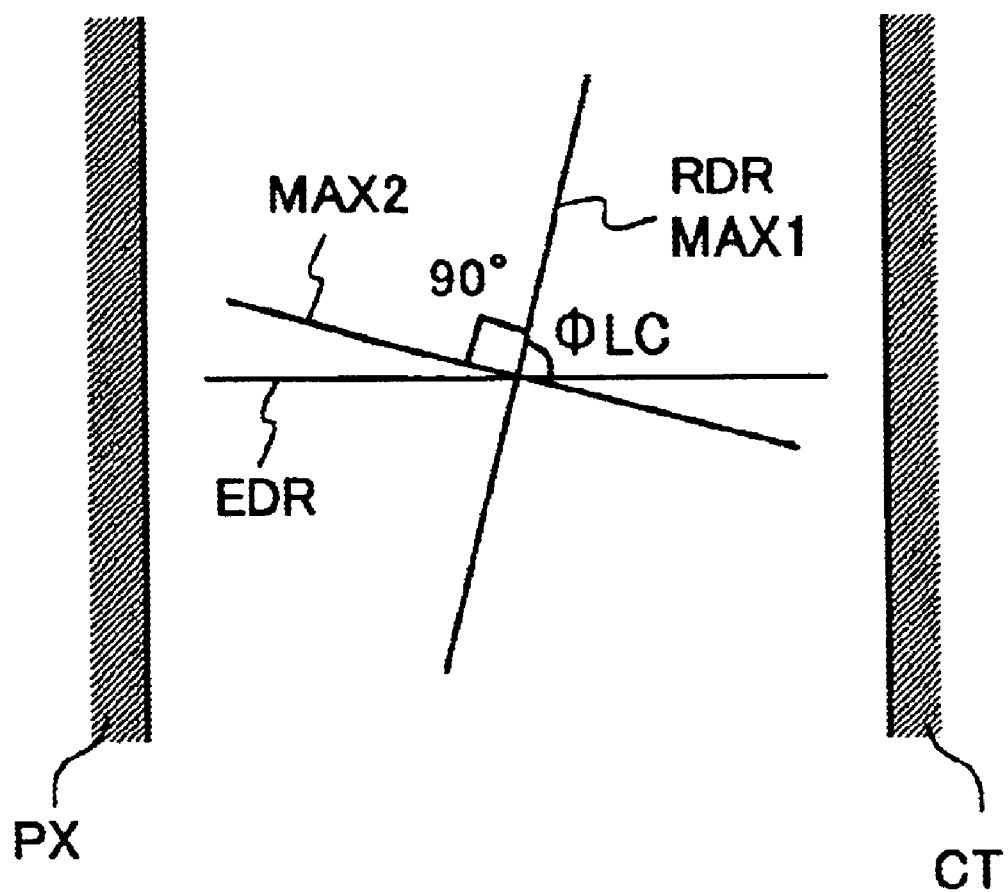
FIG. 21 is a view showing the angle between a rubbing direction and the axis of optical transmission of a polarizer in one Embodiment of this invention.

Polyimide is used as the alignment film ORI (ORI1 and ORI2). Its rubbing direction RDR is made parallel to the upper and lower substrates, and the angle made by the rubbing direction RDR and an applied field direction EDR is 75°. This relationship is shown in FIG. 21.

Incidentally, the angle made by the rubbing direction RDR and the applied field direction EDR must be 45° or more and less than 90° if the dielectric anisotropy $\Delta\in$ of a liquid crystal material is positive, and if the dielectric anisotropy $\Delta\in$ is negative, such angle must be more than 0° and 45° or less.

<<Polarizer>>

Regarding the polarizer POL (POL1 and POL2), a polarized light transmission axis MAX1 of the lower polarizer POL1 is made coincident with the rubbing direction RDR, while a polarized light transmission axis MAX2 of the upper polarizer POL2 is made perpendicular to the polarized light transmission axis MAX1. This relationship is shown in FIG. 21. According to this construction, it is possible to obtain a normally close characteristic in which as a voltage to be applied to each pixel according to this invention (a voltage to be applied between the pixel electrodes PX and the counter electrodes CT and CT2) is increased, the optical transmissivity increases. In addition, when no voltage is being applied, good black display can be provided.

<<Construction of Periphery of Matrix>>

Figure 7:
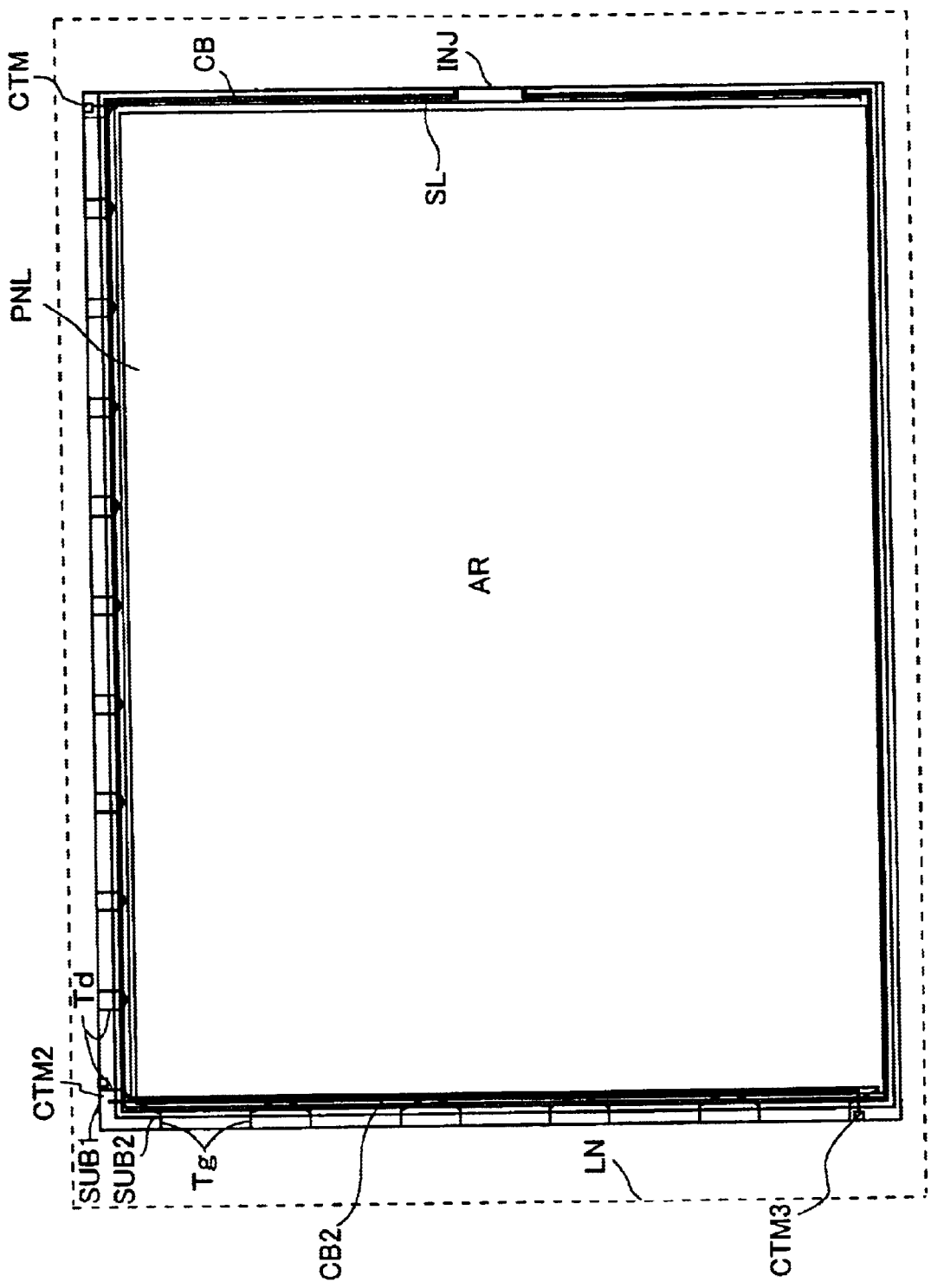
FIG. 7 is a plan view aiding in explaining the construction of a peripheral portion of the matrix of a display panel.

FIG. 7 is a plan view of an essential portion of the periphery of the matrix (AR) of a liquid crystal display panel PNL which includes the upper and lower glass substrates SUB1 and SUB2.

In the manufacture of this panel PNL, if the panel PNL has a small size, to realize an improvement in throughput, plural devices are worked over one glass substrate at the same time and the glass substrate is divided into individual devices. If the panel PNL has a large size, to realize common use of manufacturing facilities, a glass substrate having a standardized size is worked irrespective of the kind of product and is then reduced to a size which conforms to each kind of product. In either case, the glass substrate is cut after a series of steps has been completed. FIG. 7 shows an example of the latter case, and represent the cut states of the upper and lower substrates SUB1 and SUB2. Symbol LN denotes the edges of each of the substrates SUB1 and SUB2 before cutting. In either case, when the liquid crystal display panel is finished, the size of the upper substrate SUB2 is limited to a size smaller than that of the lower substrate SUB1 so as to expose portions in which external connecting terminal groups Tg and Td and terminals CTM (whose affixes are omitted in FIG. 7) are present (in FIG. 7, the top and left sides of the panel PNL). Each of the terminal groups Tg represents a group of one scanning circuit connecting terminal GTM (which will be described later) and its plural lead line portions for each tape carrier package TCP (FIGS. 18 and 19) on which an integrated circuit chip CHI is mounted, and each of the terminal groups Td represents a group of one video signal circuit connecting terminal DTM (which will be described later) and its plural lead line portions for each such tape carrier package TCP.

The lead lines of each of the groups which extend from the matrix part to the corresponding external connection terminal part are inclined toward their ends. This is because the pitch of the terminals DTM and GTM of the display panel PNL needs to be made coincident with the arrangement pitch of the packages TCP and the pitch of connecting terminals in each of the packages TCP. The counter electrode terminals CTM are terminals for giving counter voltages from the outside circuit to counter electrodes CT1 and the counter electrodes CT2 and the counter voltage signal lines CL. The counter voltage signal lines CL of the matrix part are led to the scanning circuit connecting terminals GTM and to the opposite side (in FIG. 7, to the right and left), and the individual counter voltage signal lines CL are joined together by common bus lines CB1 and CB2 and are connected to the counter electrode terminals CTM.

Incidentally, in Embodiment 1, the counter electrode terminals CTM are provided separately from the external connecting terminal groups Tg and Td, but may be incorporated into part of the external connecting terminal groups Tg and Td. Although two common bus lines are provided, the number of common bus lines may also be one. However, two common bus lines are preferable because the waveform distortion of counter voltage can be canceled.

In Embodiment 1, a TCP scheme is used, but it is also possible to use a scheme (COG, FCA or the like) in which driver ICs are directly mounted on a glass substrate.

The sealing pattern SL is formed to seal the liquid crystal LC between the transparent glass substrates SUB1 and SUB2 along the edges thereof excluding a liquid-crystal filling port INJ. The sealing material is made of, for example, an epoxy resin.

The layers of the alignment films ORI1 and ORI2 are formed on the inside of the sealing pattern SL. The polarizers POLL and POL2 are respectively arranged on the outside surfaces of the lower transparent glass substrate SUB1 and the upper transparent glass substrate SUB2. The liquid crystal LC is sealed in the area closed by the sealing pattern SL between the lower alignment layer ORI1 and the upper alignment layer ORI2 which set the orientation of liquid crystal molecules. The lower alignment layer ORI1 is formed over the protective layer PSV1 on the side of the substrate SUB1. The lower alignment film ORI1 is formed over the protective film PSV1 on the lower transparent glass substrate SUB1.

This liquid crystal display panel is assembled by stacking various layers over each of the lower transparent substrate SUB1 and the upper transparent glass substrate SUB2, forming the sealing pattern SL over the substrate SUB2, superposing the lower transparent glass substrate SUB1 and the upper transparent glass substrate SUB2 on each other, charging the liquid crystal LC through the opening INJ of the sealing material SL, sealing the charging port INJ with an epoxy resin or the like, and cutting the upper and lower glass substrates SUB1 and SUB2.

Incidentally, in Embodiment 1, the liquid-crystal filling port INJ is provided on the opposite side to the scanning circuit connecting terminals GTM, but may be provided on the opposite side to the video signal circuit connecting terminals DTM. It is preferable to dispose two or more liquid-crystal filling ports, because the charging time of the liquid crystal LC can be reduced.

<<Gate Terminal Part>>

FIGS. 8A and 8B are views showing the structure of connection between one of the scanning signal lines GL and the corresponding one of the scanning circuit connecting terminals GTM in the display matrix. FIG. 8A is a plan view, and FIG. 8B is a cross-sectional view taken along cutting line B—B of FIG. 8A. FIGS. 8A and 8B correspond to a portion shown on the left-hand side of FIG. 7, and an inclined portion of the scanning signal line GL is shown in the form of a straight line for convenience' sake. In FIGS. 8A and 8B, the Cr—Mo layer g3 is hatched for ease of understanding.

The gate terminal GTM is formed of the Cr—Mo layer g3 and the transparent conductive layer i1 for protecting the surface of the Cr—Mo layer g3 and improving the reliability of connection to a TCP (Tape Carrier Package). This transparent conductive layer i1 uses a transparent conductive film ITO which is formed in the same step as the electrode ST.

In the plan view of FIG. 8A, the insulating film GI and the protective film PSV1 are formed rightwardly away from its left-hand boundary, and the terminal part GTM located on the left-hand end is exposed from the insulating film GI and the protective film PSV1 so that the gate terminal GTM can be electrically connected to an external circuit. FIGS. 8A and 8B show only one pair of gate line GL and gate terminal GTM, but in practice, plural such pairs are juxtaposed to constitute the terminal groups Tg (FIG. 7). In a manufacturing process, the left-hand end of the gate terminal GTM is formed to extend beyond a cutting area of the substrate SUB1 and be short-circuited by a line SHg (not shown). This construction serves to prevent electrostatic breakdown during a step such as rubbing of the alignment film ORI1 in the manufacturing process.

<<Drain Terminal DTM>>

FIGS. 9A and 9B are views showing the structure of connection between some of the video signal lines DL and the corresponding ones of the external connection terminals DTM. FIG. 9A is a plan view, and FIG. 9B is a cross-sectional view taken along cutting line B—B of FIG. 9A. FIGS. 9A and 9B correspond to a portion shown on the top side of FIG. 7, and although the direction of each of the drawings is changed for convenience' sake, the right-hand sides of FIGS. 9A and 9B correspond to the top end of the lower transparent glass substrate SUB1.

Symbol TSTd denotes a test terminal. The test terminal TSTd is not connected to an external circuit, and is made wider than its associated line portion so that a probe or the like can be brought into contact with the test terminal TSTd. Similarly, the drain terminal DTM is made wider than its associated line portion so that the drain terminal DTM can be connected to an external circuit. Plural external connection drain terminals DTM are juxtaposed to constitute the terminal groups Td (whose affixes are omitted) as shown in FIG. 7. The left-hand end of each of the drain terminals DTM is formed to extend beyond the cutting line of the substrate SUB1. In the manufacturing process, all the drain terminals DTM are short-circuited by a line SHd (not shown) for the purpose of prevention of electrostatic breakdown. The test terminals TSTd are formed on every second one of the video signal lines DL as shown in FIG. 9A.

Each of the drain terminals DTM is formed of the transparent conductive layer i1, and is connected to the corresponding one of the video signal lines DL in a portion where the protective film PSV1 is removed. Similarly to the gate terminal GTM, this transparent conductive layer i1 uses the transparent conductive film ITO formed in the same step as the electrode ST. The lead lines from the matrix part to the drain terminals DTM are formed of the layer d3 which is at the same level as the video signal lines DL.

<<Counter Electrode Terminal CTM>>

Figure 10A:
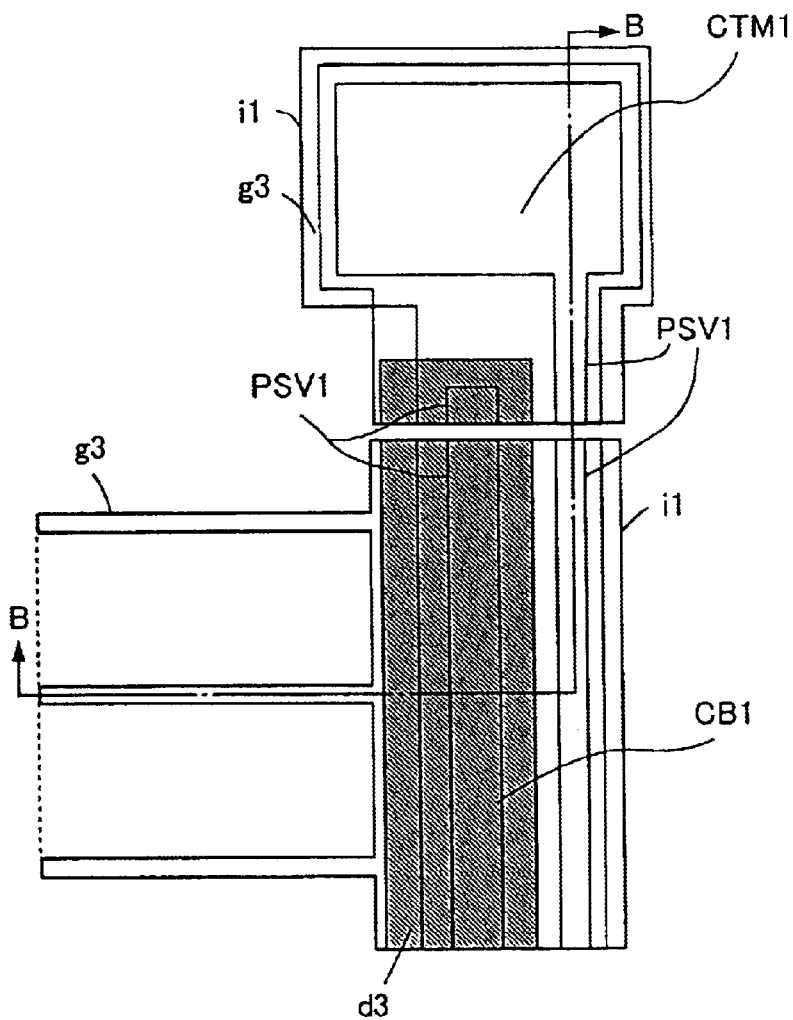
FIGS. 10A and 10B are, respectively, a plan view and a cross-sectional view showing the connection portion between a counter electrode terminal CTM1, a common bus line CB1 and a counter voltage signal line CL as well as the vicinity of the connection portion.
Figure 10B:
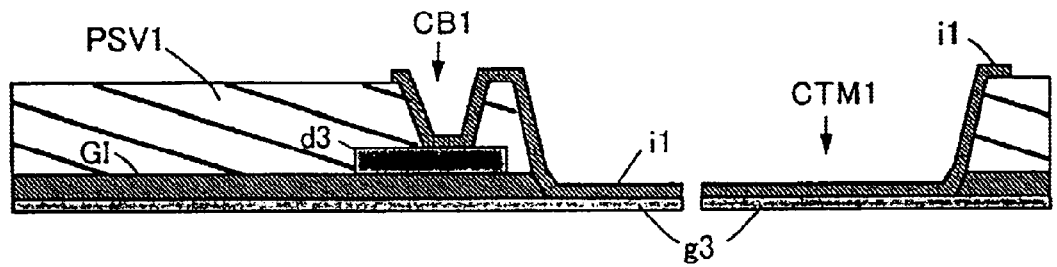

FIGS. 10A and 10B are views showing the structure of connection between some of the counter voltage signal lines CL and the external connection terminal CTM. FIG. 10A is a plan view, and FIG. 10B is a cross-sectional view taken along cutting line B—B of FIG. 10A. FIGS. 10A and 10B correspond to a portion near the top right of FIG. 7.

The counter voltage signal lines CL are interconnected by the common bus line CB1 and are led to the counter electrode connecting terminal CTM. The common bus line CB1 has a structure in which the conductive layer d3 is stacked over the conductive layer g3 and the conductive layer d3 and the conductive layer g3 are electrically connected by the transparent conductive layer i1. This structure is intended to lower the resistance of the common bus line CB1 and so that a counter voltage can be fully supplied from the external circuit to each of the counter voltage signal lines CL. This structure has the advantage that the resistance of the common bus line CB1 can be lowered without the need to add a new conductive layer.

The counter electrode connecting terminal CTM has a structure in which the transparent conductive layer i1 is stacked on the conductive layer g3. Similarly to the other terminals, this transparent conductive layer i1 uses the transparent conductive film ITO which is formed in the same step as the pixel electrodes PX. The conductive layer g3 is covered with the highly durable transparent conductive layer i1 for protecting the surface of the conductive layer g3 and preventing electrolytic corrosion or the like. The electrical connection between the transparent conductive layer i1 and the conductive layers g3 and d3 is provided by a through-hole formed in the protective film PSV1 and the insulating film GI.

FIGS. 11A and 11B are views showing the structure of connection between the other ends of the counter voltage signal lines CL and an external connection terminal CTM 2. FIG. 11A is a plan view, and FIG. 11B is a cross-sectional view taken along cutting line B—B of FIG. 11A. FIGS. 11A and 11B correspond to a portion near the top left of FIG. 7. The other ends (on the side of the gate terminals GTM) of the counter voltage signal lines CL are interconnected by the common bus line CB2 and are led to the counter electrode connecting terminal CTM2. The common bus line CB2 differs from the common bus line CB1 in that the common bus line CB2 is formed of the conductive layer d3 and the transparent conductive layer i1 so that the common bus line CB2 is insulated from the scanning signal line GL. The insulation of the common bus line CB2 from the scanning signal lines GL is provided by the insulating film GI.

<<Equivalent Circuit of Entire Display Device>>

Figure 12:
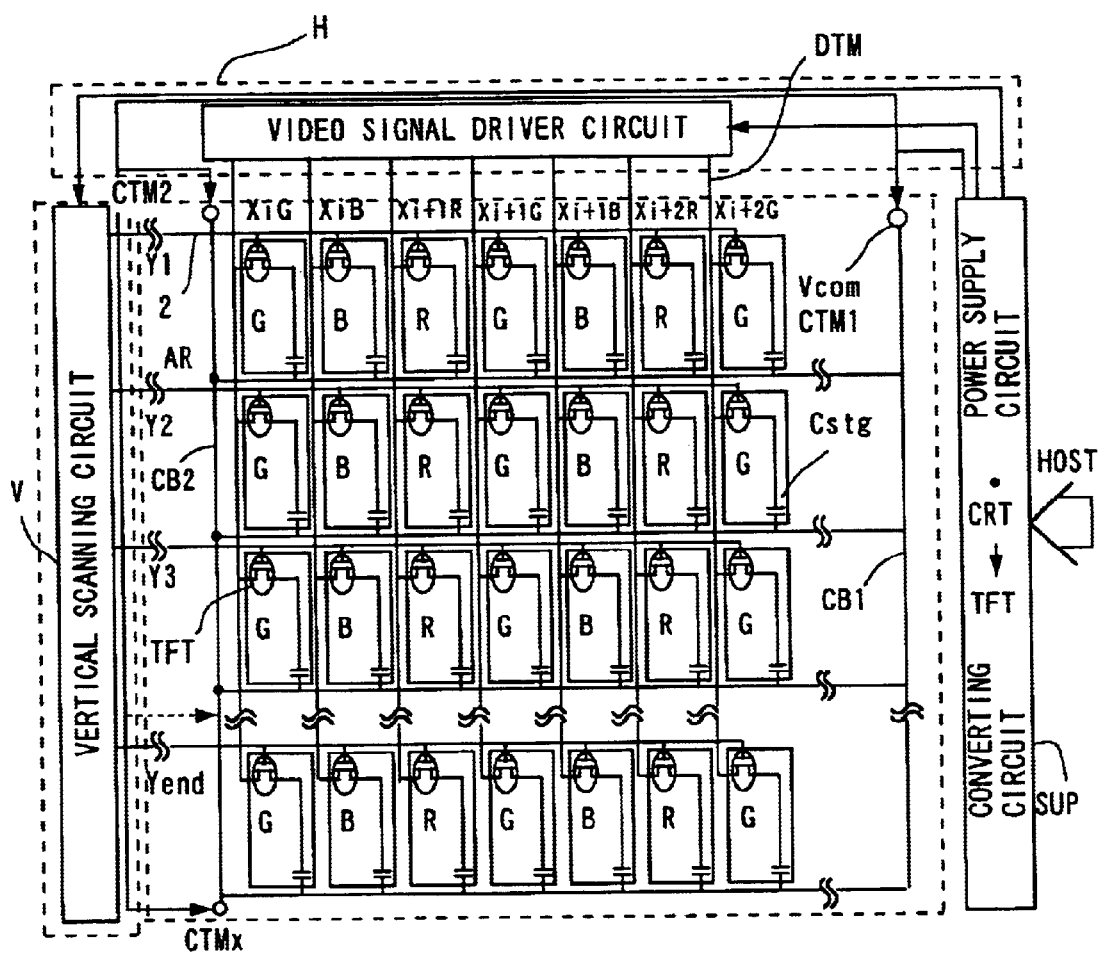
FIG. 12 is a circuit diagram showing a matrix part and a peripheral circuit thereof in the active matrix color liquid crystal display device according to one Embodiment of this invention.

FIG. 12 is a connection diagram showing the equivalent circuit and its peripheral circuit of the display matrix part. FIG. 12 is a circuit diagram which is drawn to correspond to an actual geometric arrangement. Symbol AR denotes a matrix array in which plural pixels are arrayed two-dimensionally. In FIG. 12, "X" means the video signal line DL, and affixes G, B and R are added to the symbol X to correspond to green, blue and red pixels, respectively. "Y" means the scanning signal line GL, and affixes 1, 2, 3, . . . , end are added to the symbol Y in accordance with the sequence of scanning timing.

The scanning signal lines Y (whose affixes are omitted) are connected to a vertical scanning circuit V, and the video signal lines X (whose affixes are omitted) are connected to a video signal driver circuit H. A circuit SUP includes a power supply circuit for obtaining plural divided stabilized voltage sources from one voltage source, and a circuit for exchanging information for a CRT (cold-cathode tube) received from a host (a host processing unit) into information for a TFT liquid crystal display device.

<<Driving Method>>

Figure 13:
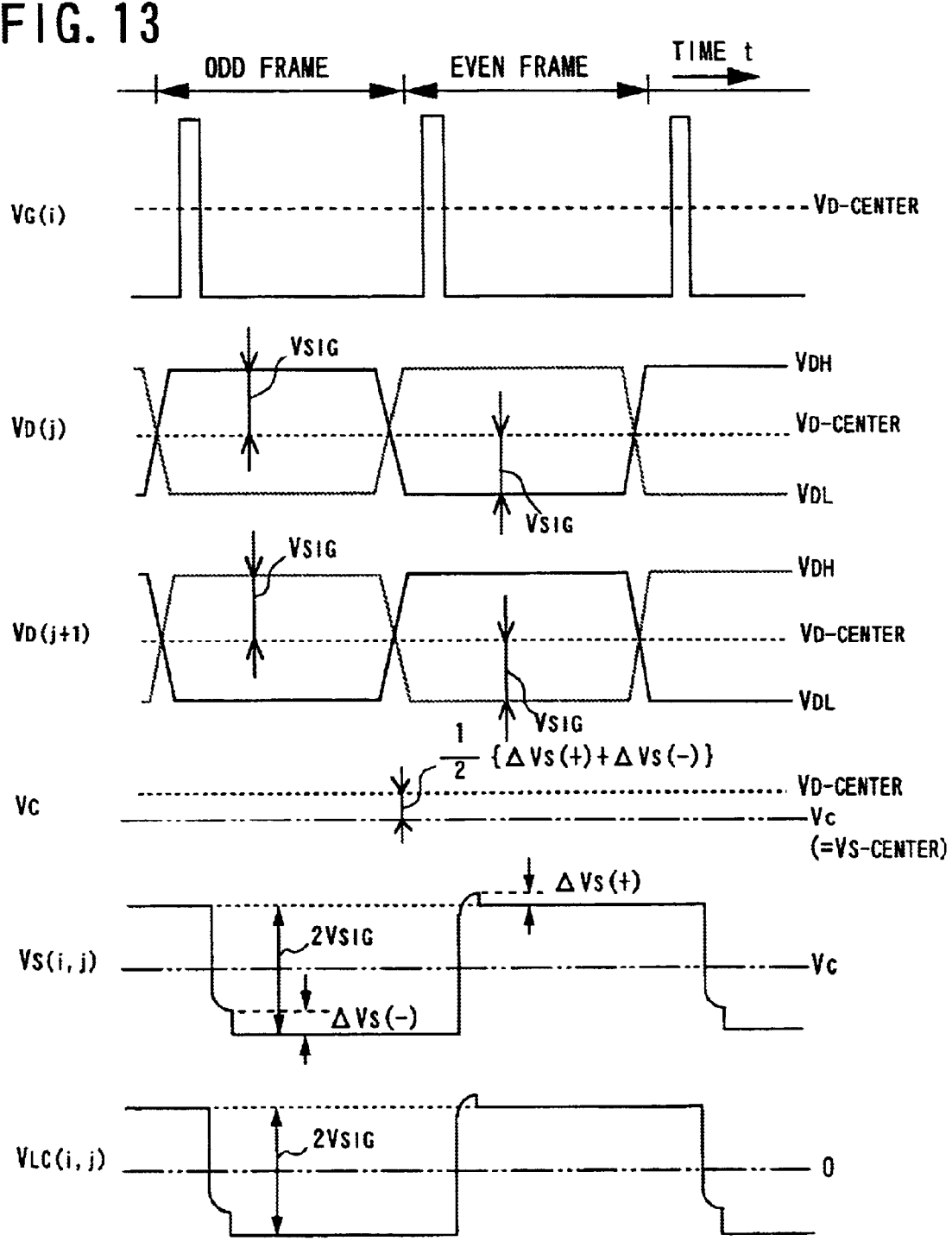
FIG. 13 is a view showing driving waveforms of the active matrix color liquid crystal display device according to one Embodiment of this invention.

FIG. 13 shows driving waveforms of the liquid crystal displace device of Embodiment 1. A counter voltage Vc is assumed to be a constant voltage. A scanning signal Vg is switched to its on level at intervals of one scanning period, and is switched to its off level during the other periods. A video signal voltage Vd is polarity-inverted between positive and negative at intervals of one frame within an amplitude which is twice that of a voltage to be applied to the liquid crystal layer, and the polarity-inverted video signal voltage is applied to one pixel. At this time, the video signal voltage Vd is polarity-inverted every column as well as every other row. In this manner, each pixel of either polarity neighbors pixels of the opposite polarity in the horizontal and vertical directions, whereby flickers and crosstalk (smear) can be prevented from easily occurring. The counter voltage Vc is set to a voltage which is lowered by a predetermined amount from a center voltage about which the video signal voltage Vd is polarity-inverted. This setting is intended to correct a field-through voltage which occurs when a thin film transistor TFT changes from on to off, and is carried out so that an AC voltage which does not contain a large amount of DC component can be applied to the liquid crystal (if a DC voltage is applied to the liquid crystal, image retention, degradation or the like becomes serious). Therefore, the potential of the DC component of each of the pixel electrodes and the potential of the corresponding counter electrode become approximately the same. In addition, the alternation of the counter voltage Vc can reduce the maximum amplitude of the video signal voltage Vd, whereby a circuit of low breakdown voltage can be used as the video signal driver circuit (signal-side driver) H.

<<Operation of Storage Capacitance Cstg>>

The storage capacitance Cstg is provided for storing video information written into a pixel for a long time (after a thin film transistor TFT is switched off). Unlike a scheme which applies an electric field perpendicularly to a substrate surface, in a scheme which applies an electric field in parallel with a substrate surface, such as that used in the invention, there is almost no capacitance (so-called liquid crystal capacitance) which is formed by the pixel electrode and the counter electrode, so that if there is no storage capacitance Cstg, video information cannot be stored in the pixel. Accordingly, in the scheme which applies an electric field in parallel with a substrate surface, the storage capacitance Cstg is an indispensable constituent element.

The storage capacitance Cstg also serves to reduce the influence of a gate potential variation $\Delta Vg$ on the pixel electrode potential Vs when the thin film transistor TFT switches. This manner is expressed by the following equation:

$$\Delta Vs = \{Cgs/(Cgs+Cstg+Cpix)\} \times \Delta Vg,$$

where Cgs represents the parasitic capacitance formed between the gate electrode GT and the source electrode SD1 of the thin film transistor TFT; Cpix represents the capacitance formed between the pixel electrodes PX and the counter electrodes CT and CT2; and $\Delta Vs$ represents a variation in the pixel electrode potential Vs due to $\Delta Vg$, i.e., a so-called field-through voltage. This variation $\Delta Vs$ is the cause of a DC component to be applied to the liquid crystal LC, and as the storage capacitance Cstg is made larger, the value of the variation $\Delta Vs$ can be made smaller. A reduction in the DC component to be applied to the liquid crystal LC improves the life of the liquid crystal and can prevent so-called image persistence, i.e., the phenomenon that a previous image remains when a liquid crystal display picture is switched over.

As described previously, the gate electrode GT is formed to be so large as to completely cover the i-type semiconductor layer AS, the area of the gate electrode GT that overlaps the source electrode SD1 and the drain electrode SD2 increases, and therefore, the parasitic capacitance Cgs increases and causes the opposite effect of the pixel electrode potential Vs becoming easily susceptible to the influence of the gate (scanning) voltage Vg. However, by providing the storage capacitance Cstg, it is possible to solve such demerit.

<<Manufacturing Method>>

A method of manufacturing the lower transparent glass substrate SUB1 of the liquid crystal display device will be described below with reference to FIGS. 14 to 16. In each of FIGS. 14 to 16, the letters shown in the center are abbreviations of the names of process steps, the left-hand side shows the portion of the thin film transistor TFT, and the right-hand side represents the flow of processing, showing a cross section of the vicinity of the gate terminal GTM shown in FIG. 8. The method is divided into Steps A to I in accordance with individual photographic treatment steps, except for Steps B and D, and the cross-sectional view of each of the steps shows the state in which a photoresist is removed after the completion of processing following photographic treatment. Incidentally, the term "photographic treatment" used herein indicates a series of processes from application of a photoresist to development thereof through selective exposure with a mask, and repetitive description of the term "photographic treatment" is omitted. The following description will be given with reference to the individual steps.

Figure 14:
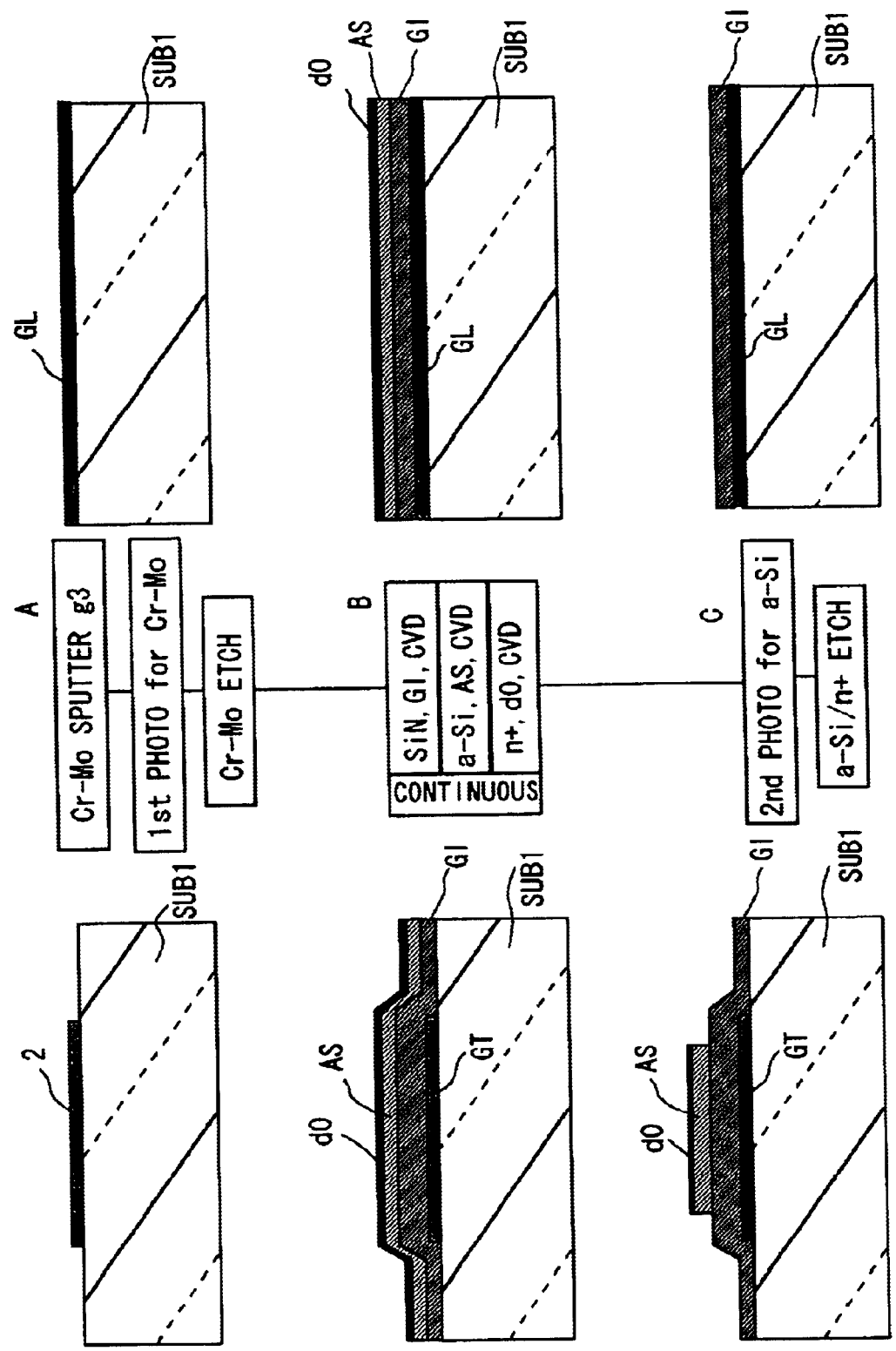
FIG. 14 is a flowchart of a manufacturing process (Steps A to C) for circuit elements on a substrate SUB1, showing a pixel portion and a gate terminal portion in cross section.

Step A, FIG. 14

The conductive layer g3 which is made of a 2,000-Å-thick Cr—Mo film or the like is formed over the lower transparent glass substrate SUB1 made of AN635 glass (tradename), by sputtering. After photographic treatment, the conductive layer g3 is selectively etched by ceric ammonium nitrate, thereby forming the gate electrodes GT, the scanning signal lines GL, the counter voltage signal lines CL, the gate terminals GTM, the first conductive layer of the common bus line CB1, the first conductive layer of the counter electrode connecting terminal CTM1, and a bus line SHg (not shown) which connects the gate terminals GTM.

Step B, FIG. 14

Ammonium gas, silane gas and nitrogen gas are introduced into a plasma CVD apparatus to form a silicon nitride film of thickness 3,500 Å, and ammonium gas and hydrogen gas are introduced into the plasma CVD apparatus to form an i-type amorphous silicon film of thickness 1,200 Å. After that, hydrogen gas and phosphine gas are introduced into the plasma CVD apparatus to form a N$^+$-type amorphous silicon film of thickness 300 Å.

Step C, FIG. 14

After photographic treatment, $SF_6$ and $CC_{14}$ are used as dry etching gas to selectively etch the N$^+$-type amorphous silicon film and the i-type amorphous silicon film, thereby forming an island of the i-type semiconductor layer AS.

Figure 15:
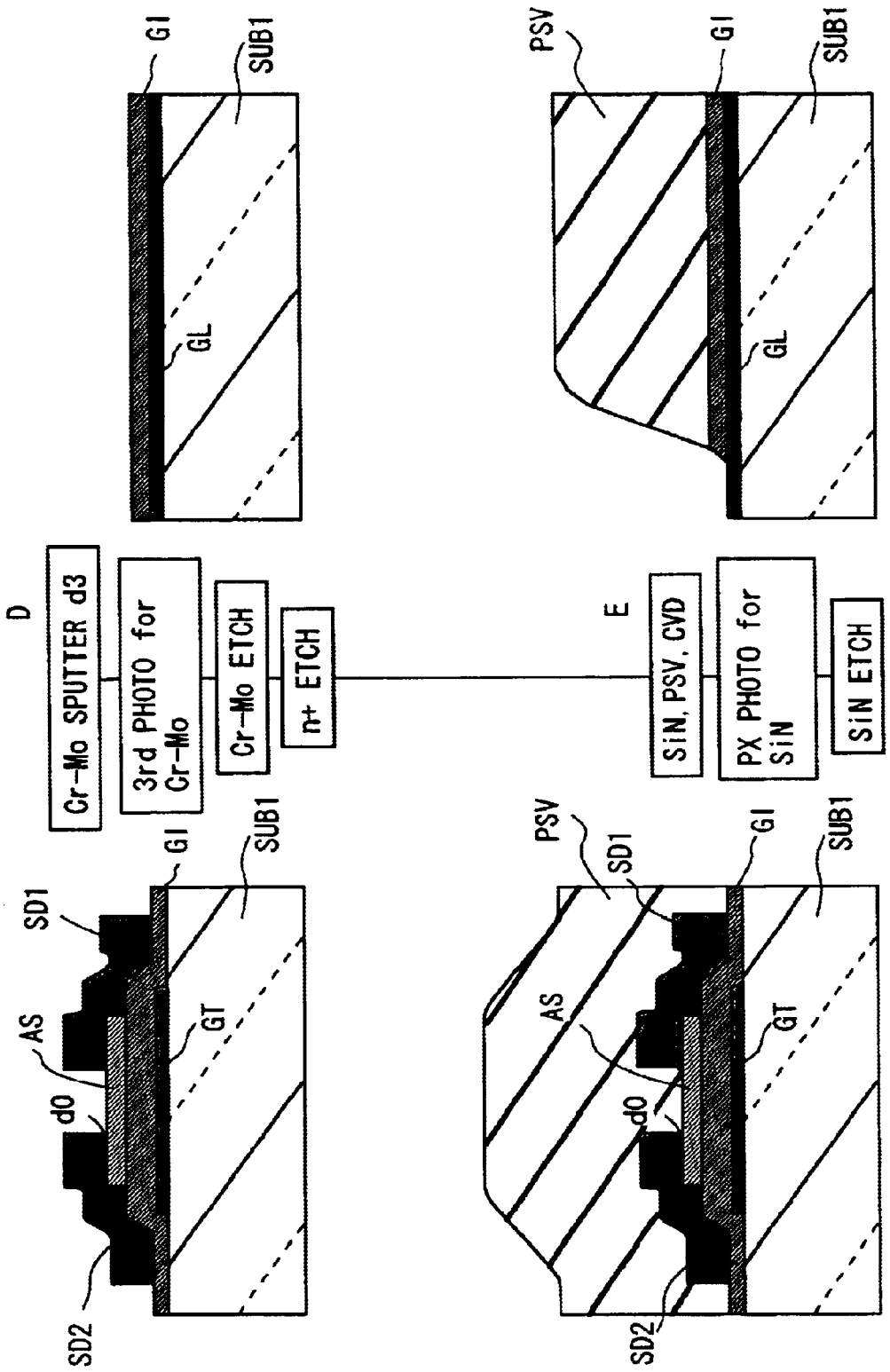
FIG. 15 is a flowchart of a manufacturing process (Steps D to E) for circuit elements on the substrate SUB1, showing the pixel portion and the gate terminal portion in cross section.

Step D, FIG. 15

The conductive layer d3 made of a Cr film of thickness 300 Å is formed by sputtering. After photographic treatment, the conductive layer d3 is etched by the same liquid as that used in Step A, thereby forming the video signal lines DL, the source electrodes SD1, the drain electrodes SD2, the first conductive layer of the common bus line CB2, and the bus line SHd (not shown) which short-circuits the drain terminals DTM. Then, $CC_{14}$ and $SF_6$ are introduced into a dry etching apparatus to etch the N$^+$-type amorphous silicon film, thereby selectively removing the n$^+$-type semiconductor layer d0 between the source electrode SD1 and the drain electrode SD2.

Step E, FIG. 15

Ammonium gas, silane gas and nitrogen gas are introduced into the plasma CVD apparatus to form a silicon nitride film of thickness 0.4 µm. After photographic treatment, $SF_6$ is used as dry etching gas to selectively etch the silicon nitride film, thereby patterning the protective film PSV1 and the insulating film GI.

Figure 16:
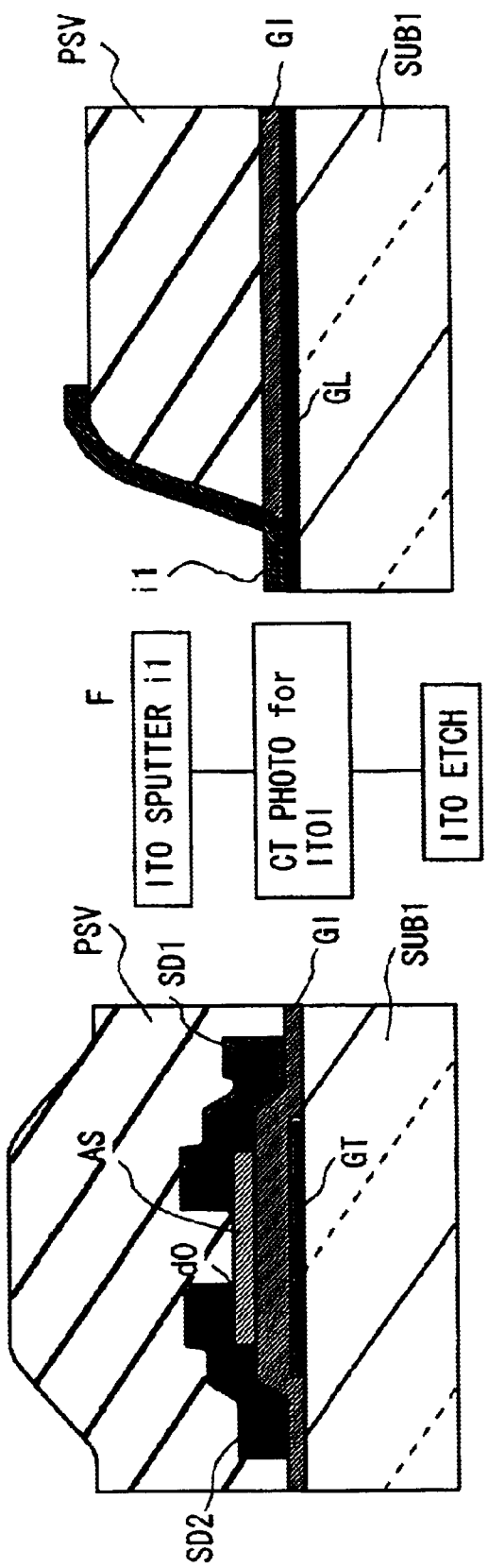
FIG. 16 is a flowchart of a manufacturing process (Step F) for circuit elements on the substrate SUB1, showing the pixel portion and the gate terminal portion in cross section.

Step F, FIG. 16

The transparent conductive layer i1 made of an ITO film of thickness 1,400 Å is formed by sputtering. After photographic treatment, the transparent conductive layer i1 is selectively etched by a mixture of hydrochloric acid and nitric acid, thereby forming the uppermost layer of the gate terminals GTM, the drain terminals DTM and the second conductive layer of the counter electrode connecting terminals CTM1 and the CTM2.

<<Display Panel PNL and Driver Circuit Board PCB1>>

Figure 17:
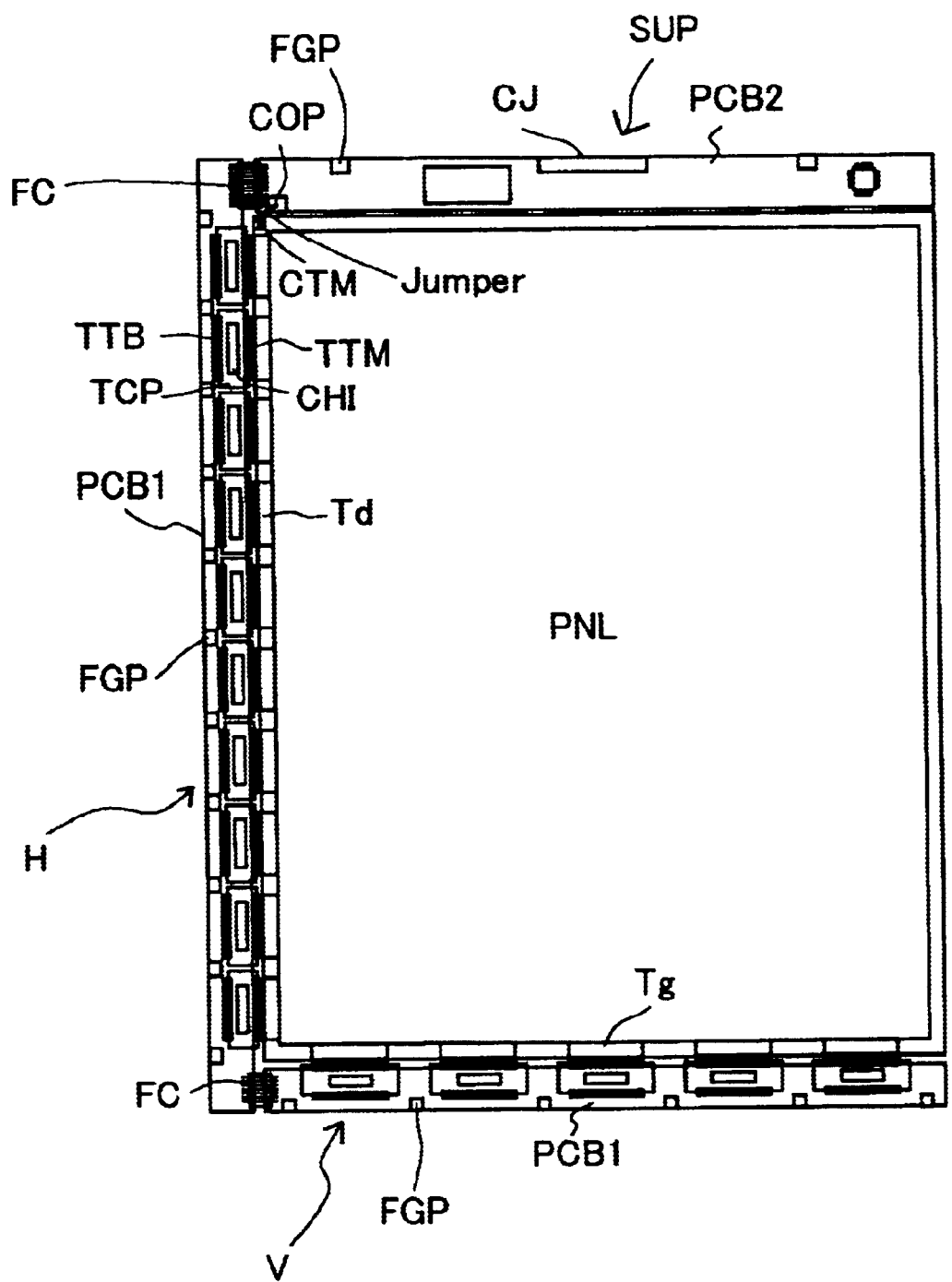
FIG. 17 is a top plan view showing the state in which peripheral driver circuits are mounted on the liquid crystal display panel.

FIG. 17 is a top plan view showing the state in which the video signal driver circuit H and the vertical scanning circuit V are connected to the display panel PNL shown in FIG. 7 and others.

Symbol CHI denotes driver IC chips for driving the display panel PNL (the bottom five are driver IC chips for the vertical scanning circuit V, and the left ten are driver IC chips for the video signal driver circuit H). Symbol TCP denotes tape carrier packages on which the respective driver IC chips CHI are mounted by tape automated boding (TAB) as will be described later with reference to FIGS. 18 and 19. Symbol PCB1 denotes a driver circuit board on which the TCPs, capacitors and the like are mounted, and the driver circuit board PCB1 is divided into two blocks for the video signal driver circuit H and the scanning signal driver circuit V. Symbol FGP denotes frame ground pads to which to solder springy pieces formed by cutting a shield case SHD. Symbol FC denotes a flat cable for electrically connecting the bottom-side driver circuit board PCB1 and the left-side driver circuit board PCB1. As shown, the flat cable FC uses a cable in which plural lead wires (made of a Sn-plated phosphor bronze material) are sandwiched between a stripe-shaped polyethylene layer and polyvinyl alcohol layer.

<<Connection Structure of TCP>>

Figure 18:
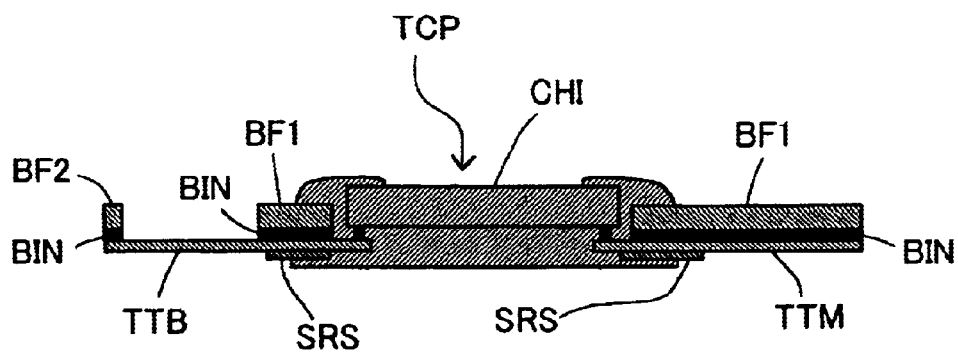
FIG. 18 is a view showing a cross-sectional structure of a tape carrier package TCP in which an integrated circuit CHI which constitutes a driver circuit is mounted on a flexible wiring board.
Figure 19:
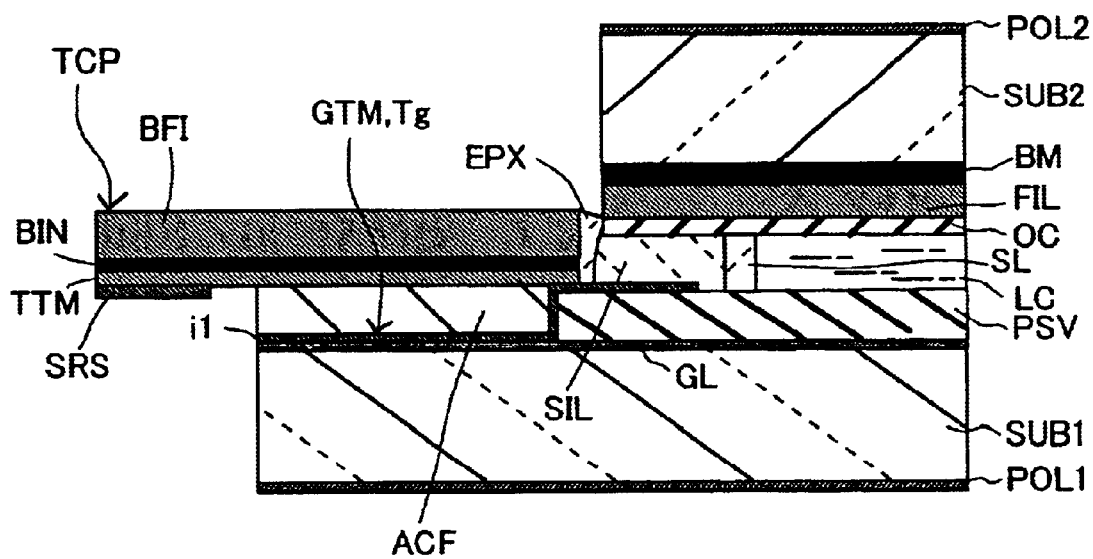
FIG. 19 is a diagrammatic cross-sectional view showing the state in which the tape carrier package TCP is connected to a terminal GTM for a scanning signal circuit of a liquid crystal display panel PNL.

FIG. 18 is a view showing the cross-sectional structure of one of the tape carrier packages TCP which the respective integrated circuit chips CHI are mounted on flexible wiring boards to constitute the vertical scanning circuit V and the video signal driver circuit H. FIG. 19 is a diagrammatic cross-sectional view showing the state in which the tape carrier package TCP is connected to the corresponding one of the gate terminals GTM of the display panel PNL in Embodiment 1.

In FIGS. 18 and 19, symbol TTB denotes an input terminal and interconnection line part for the integrated circuit CHI, and symbol TTM denotes an output terminal and interconnection line part for the integrated circuit CHI. Each of the terminals TTB and TTM is made of Cu, and bonding pads PAD of the integrated circuit CHI are connected to the inside end (generally called an inner lead) of each of the terminals TTB and TTM by a so-called face-down bonding method. The outside ends (generally called outer leads) of the respective terminals TTB and TTM correspond to the input and the output of the semiconductor integrated circuit chip CHI, and are respectively connected to a CRT/TFT converter and power source circuit SUP by soldering or the like and to the liquid crystal display panel PNL by an anisotropic conductive film ACF. The tape carrier package TCP is connected to the display panel PNL in such a manner that its end portion covers the connecting terminal GTM of the display panel PNL which is exposed from the protective film PSV1. Accordingly, the external connection terminal GTM (DTM) is covered with at least either of the protective film PSV1 and the package TCP, whereby the external connection terminal GTM (DTM) becomes resistant to electrolytic corrosion.

Symbol BF1 denotes a base film made of polyimide or the like, and symbol SRS denotes a solder resist film for masking the terminals TTB and TTM to prevent solder from sticking to an unnecessary portion during soldering. Outside the sealing pattern SL, the gap between the lower and upper transparent glass substrates SUB1 and SUB2 is protected by an epoxy resin EPX or the like after having been cleaned, and the portion between the package TCP and the upper substrate SUB2 is charged with a silicone resin SIL, thereby realizing multiple protection.

<<Driver Circuit Board PCB2>>

The driver circuit board PCB2 is provided with electronic parts such as ICs, capacitors and resistors. This driver circuit board PCB2 is provided with the circuit SUP which includes a power source circuit for obtaining plural divided stabilized voltage sources from one voltage source as well as a circuit for converting information for a CRT (cold-cathode tube) received from a host (a host processing unit) into information for the TFT liquid crystal display device. Symbol CJ denotes a connector connecting part to which to connect a connector (not shown) for connection to an outside circuit. The driver circuit board PCB1 and the driver circuit board PCB2 are electrically connected by the flat cable FC.

<<Entire Construction of Liquid Crystal Display Module>>

Figure 20:
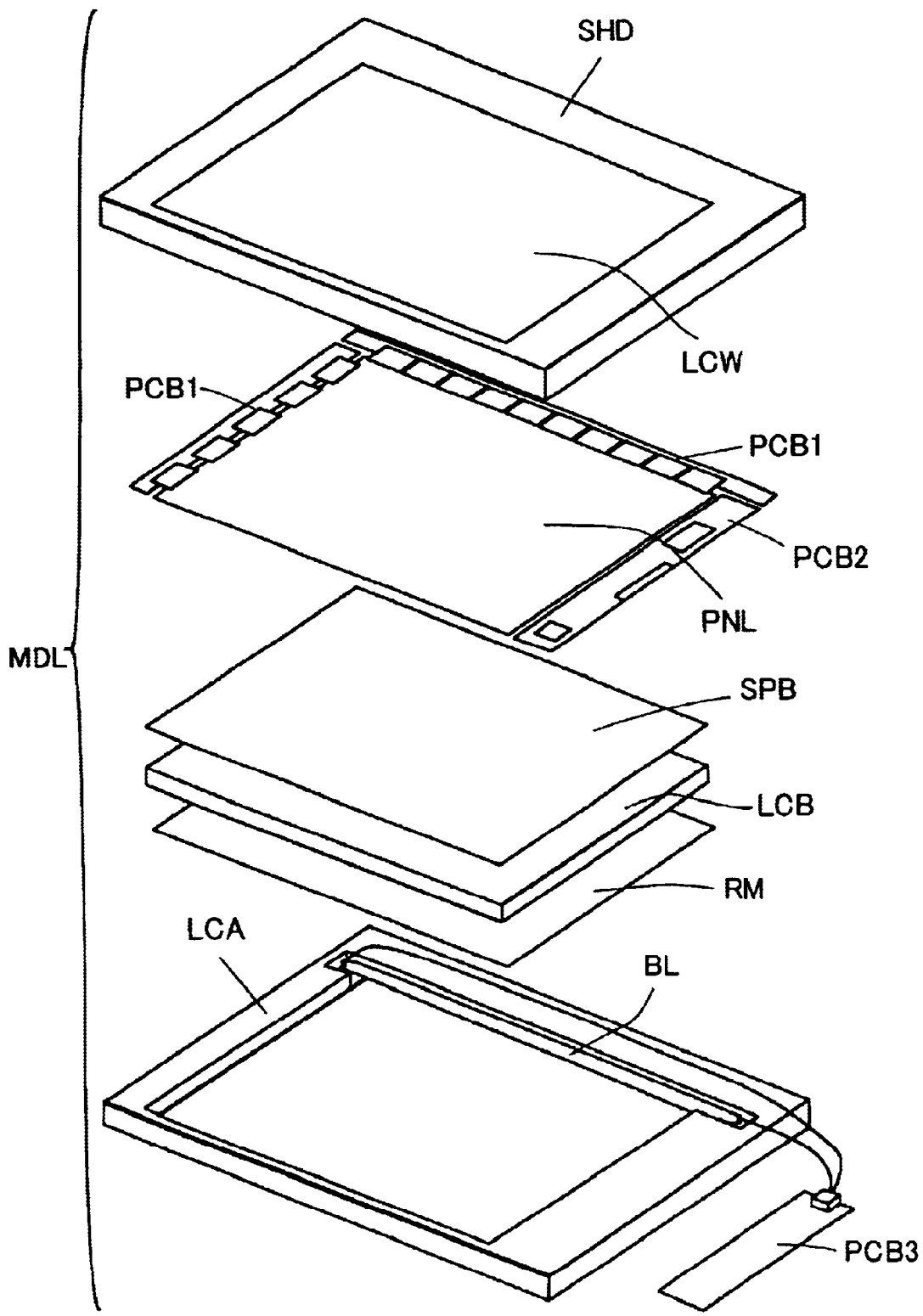
FIG. 20 is an exploded perspective view of a liquid crystal display module.

FIG. 20 is an exploded perspective view of constituent components of a liquid crystal display module MDL.

In FIG. 20, symbol SHD denotes a frame-shaped shield case (metal frame) made of a metal plate; symbol LCW a display window of the shield case SHD; symbol PNL the liquid crystal display panel; SPB an optical diffusion sheet; symbol LCB a light guide body; symbol RM a reflecting sheet; symbol BL a backlight fluorescent tube; and symbol LCA a backlight case. These members are stacked in the shown arrangement to assemble the liquid crystal display module MDL.

The liquid crystal display module MDL is constructed so that all the members are fixed by claws and hooks disposed on the shield case SHD. The backlight case LCA has a shape which accommodates the backlight fluorescent tube BL, the optical diffusion sheet SPB, the light guide body LCB and the reflecting sheet RM. Light of the backlight fluorescent tube BL which is disposed on one side of the light guide body LCB is formed into backlight which becomes uniform on the display screen, by the light guide body LCB, the reflecting sheet RM and the optical diffusion sheet SPB, and the backlight is made to exit toward the liquid crystal display panel PNL.

An inverter circuit board PCB 3 is connected to the backlight fluorescent tube BL, and serves as the power source of the backlight fluorescent tube BL. Incidentally, Embodiment 1 uses a so-called side backlight in which a fluorescent tube is disposed on one side of a light guide body, but may also use a so-called direct backlight in which a fluorescent tube is disposed directly below an optical diffusion sheet to increase luminance. As described above, Embodiment 1 is newly provided with the electrodes ST which are electrically connected to the pixel electrodes and formed on the protective film. In other words, since the electrodes ST are formed directly below the alignment film, it is possible to restraining spotted black irregularities (contamination spots) from occurring when protective-film defects exist in the IPS type of TFT-LCD. In particular, Embodiment 1 has the advantage of nearly completely solving contamination spots due to protective-film defects over the pixel electrodes PX, PX2 and PX3 and the source electrodes SD1 as well as contamination spots due to protective-film defects over the counter electrodes CT and CT2 and the counter voltage signal lines CL, because all the electrodes and lines are at approximately the same potential as the electrodes ST (in the case of AC voltages, at approximately the same potential in terms of their DC components).

Moreover, in Embodiment 1, not only is it possible to restrain contamination spots, but it is also possible to restrain the flow of ionic impurities and hence the occurrence of indefinite black irregularities, by preventing new charge currents in protective-film capacitances. Similarly, owing to the same effect, it is possible to greatly reduce image retention (image persistence) which is the phenomenon that the edge of a fixed pattern becomes black when the fixed pattern is displayed for a long time.

Embodiment 2

Embodiment 2 is the same as Embodiment 1 except for the following points.

Figure 22:
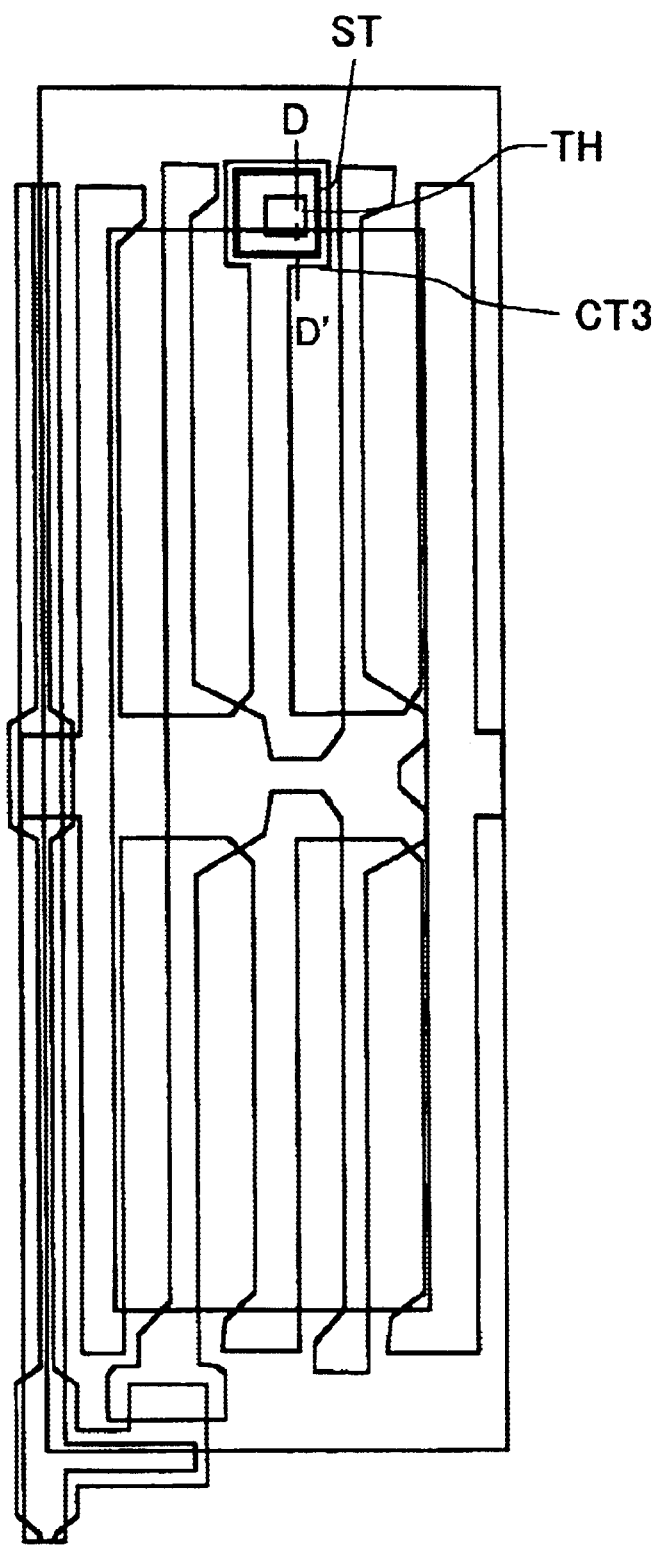
FIG. 22 is a plan view showing one pixel of a liquid crystal display part of an active matrix color liquid crystal display device according to one Embodiment of this invention.
Figure 23:
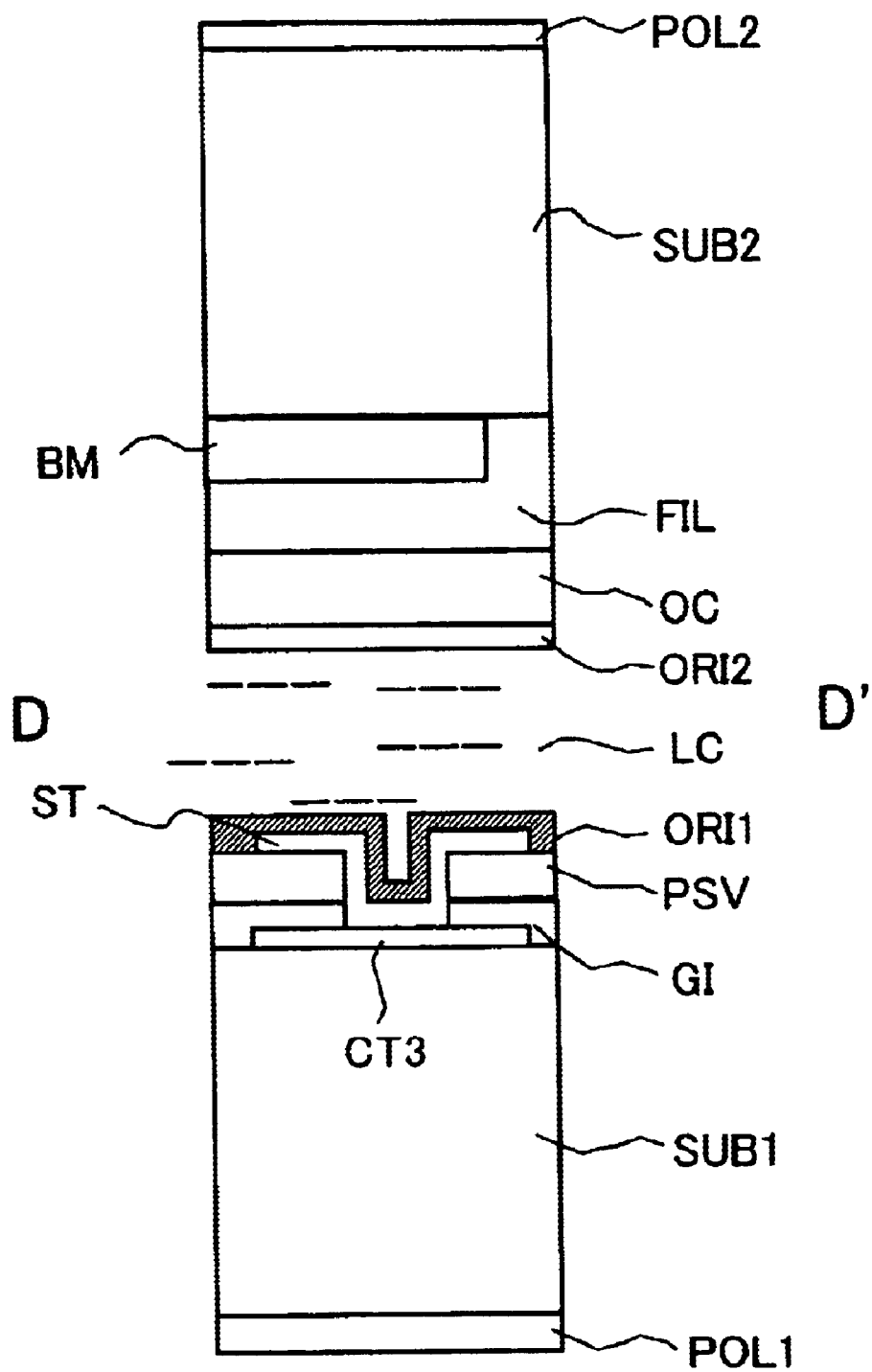
FIG. 23 is a cross-sectional view of an electrode ST portion taken along cutting line D–D' of FIG. 22.

FIG. 22 is a plan view showing one pixel of Embodiment 2. FIG. 23 is a cross-sectional view taken along cutting line D–D' of FIG. 22. In Embodiment 2, the electrode ST is connected to a portion CT3 of a counter electrode via a through-hole TH.

Unlike the pixel electrode, the counter electrode is not supplied with a voltage via a switching element and is consistently supplied with a sufficient voltage from the outside, so that the charging of the protective-film capacitance of each pixel which causes a contamination spot becomes fully fast. Accordingly, it is possible to greatly reduce the duration of time of the state of defective display such as a reduced contrast ratio and the occurrence of flickers during an initial turn-on period or other periods during which charging from the electrode ST is in an insufficient state.

Embodiment 2 has, in addition to the advantage of Embodiment 1, the advantage that it is possible to restrain defective display during an initial turn-on period.

Embodiment 3

Embodiment 3 is the same as Embodiment 1 except for the following points.

Figure 24:
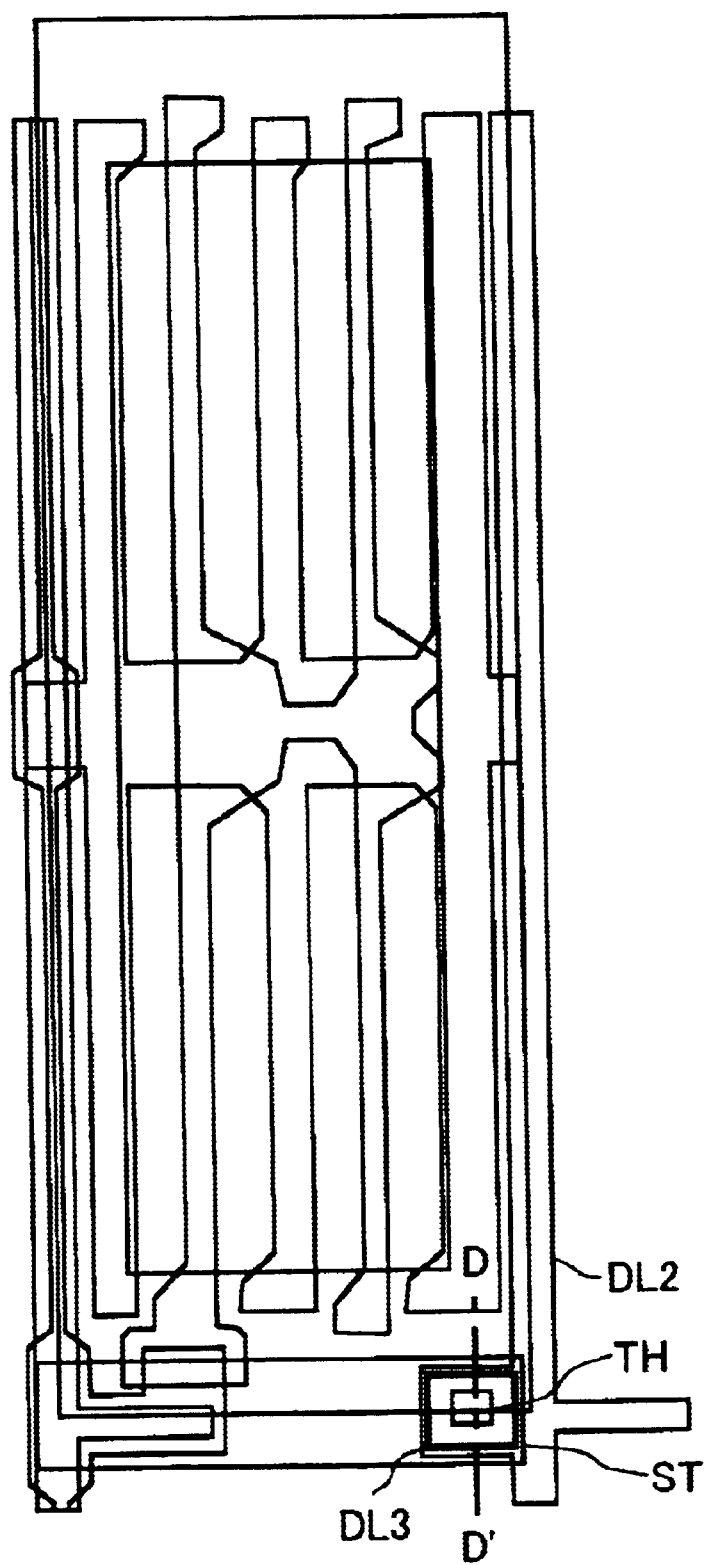
FIG. 24 is a plan view showing one pixel of a liquid crystal display part of an active matrix color liquid crystal display device according to one Embodiment of this invention.
Figure 25:
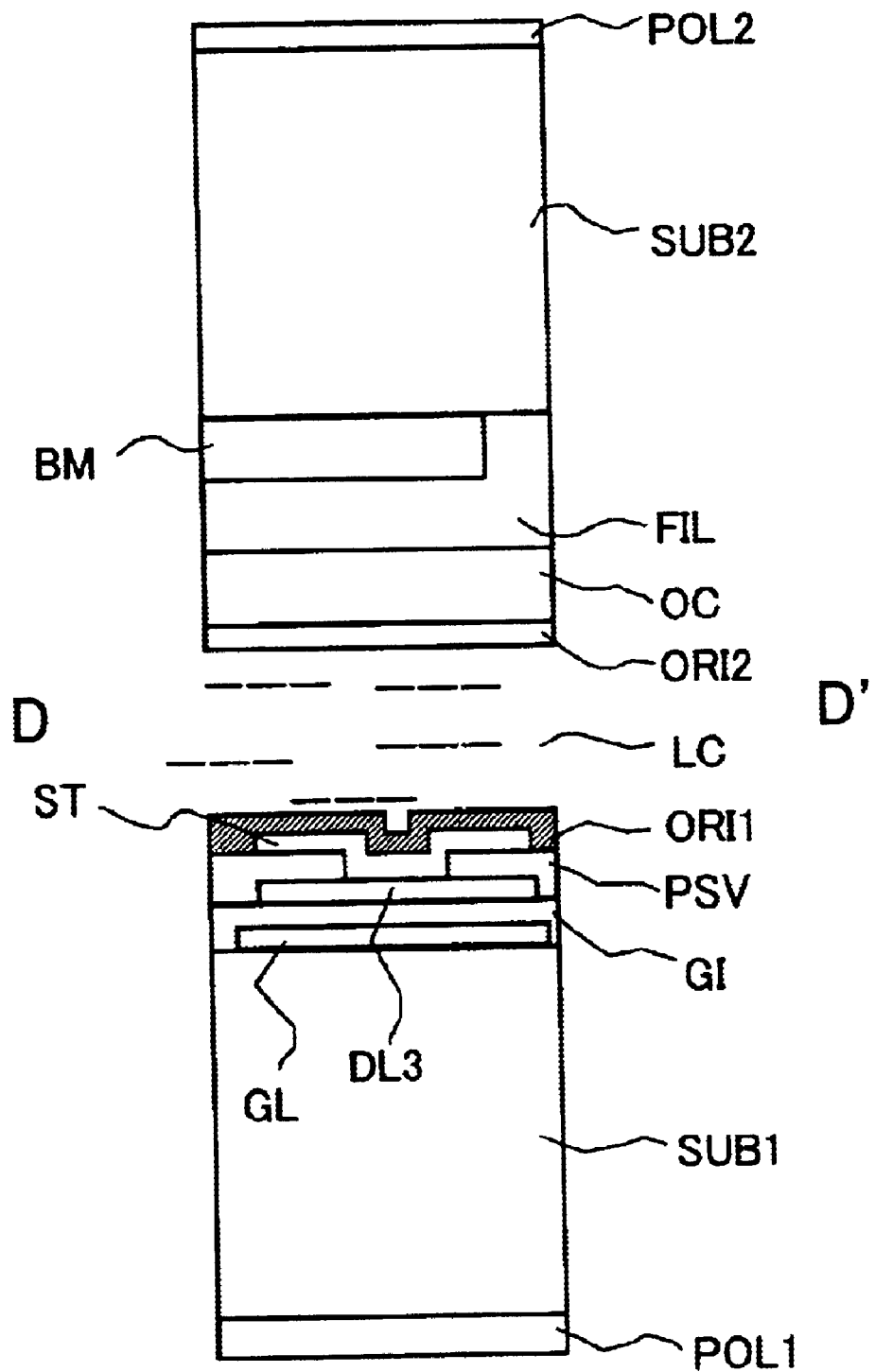
FIG. 25 is a cross-sectional view of an electrode ST portion taken along cutting line D–D' of FIG. 24.

FIG. 24 is a plan view showing one pixel of Embodiment 3. FIG. 25 is a cross-sectional view taken along cutting line D–D' of FIG. 24.

In Embodiment 3, the electrode ST is connected to a portion DL3 of a video signal line via a through-hole TH.

The video signal line has a highest potential in terms of a DC component, as compared with the other electrodes and lines. Therefore, an oxidation reaction on a positive side is completely restrained, and it is possible to prevent disconnection from occurring from the melting of an electrode due to the oxidation reaction.

As described above, in Embodiment 3, since the other electrodes and lines are at approximately the same potential as the electrode ST (in the case of AC voltages, at approximately the same potential in terms of their DC components), there is the advantage that a contamination spot due to a protective-film defect over the video signal line DL can be approximately completely solved and the problem of disconnection which occurs after the starting of electrical conduction of the video signal line DL can be completely solved. Moreover, as in Embodiment 1, it is possible to restrain the flow of ionic impurities and hence the occurrence of indefinite black irregularities. Similarly, owing to the same effect, it is possible to greatly reduce image retention (image persistence) which is the phenomenon that the edge of a fixed pattern becomes black when the fixed pattern is displayed for a long time.

Moreover, unlike the pixel electrode, the video signal line is not supplied with a voltage via a switching element and is consistently supplied with a sufficient voltage from the outside, so that the charging of the protective-film capacitance of each pixel which causes a contamination spot becomes fully fast. Accordingly, it is possible to greatly reduce the duration of time of the state of defective display such as a reduced contrast ratio and the occurrence of flickers during an initial turn-on period or other periods during which charging from the electrode ST is in an insufficient state.

In Embodiment 3, a cyano-containing liquid crystal is used, but it is more preferable to use a fluorine-containing liquid crystal, because the reduction reaction on a negative side can be restrained and merely by applying a positive-side potential to the electrode ST, not only is it possible to restrain a contamination spot on the positive side, but it is also possible to restrain a contamination spot on the negative side.

Embodiment 4

Embodiment 4 is the same as Embodiment 1 except for the following points.

Figure 26:
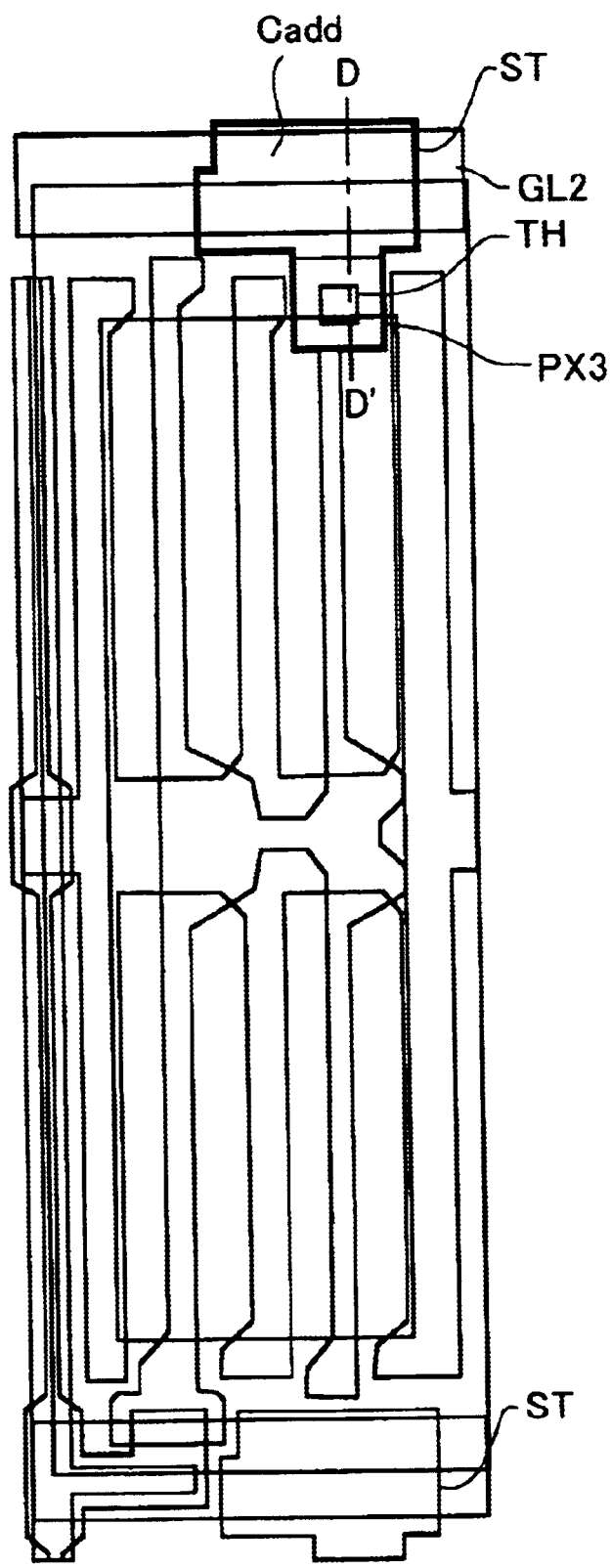
FIG. 26 is a plan view showing one pixel of a liquid crystal display part of an active matrix color liquid crystal display device according to one Embodiment of this invention.
Figure 27:
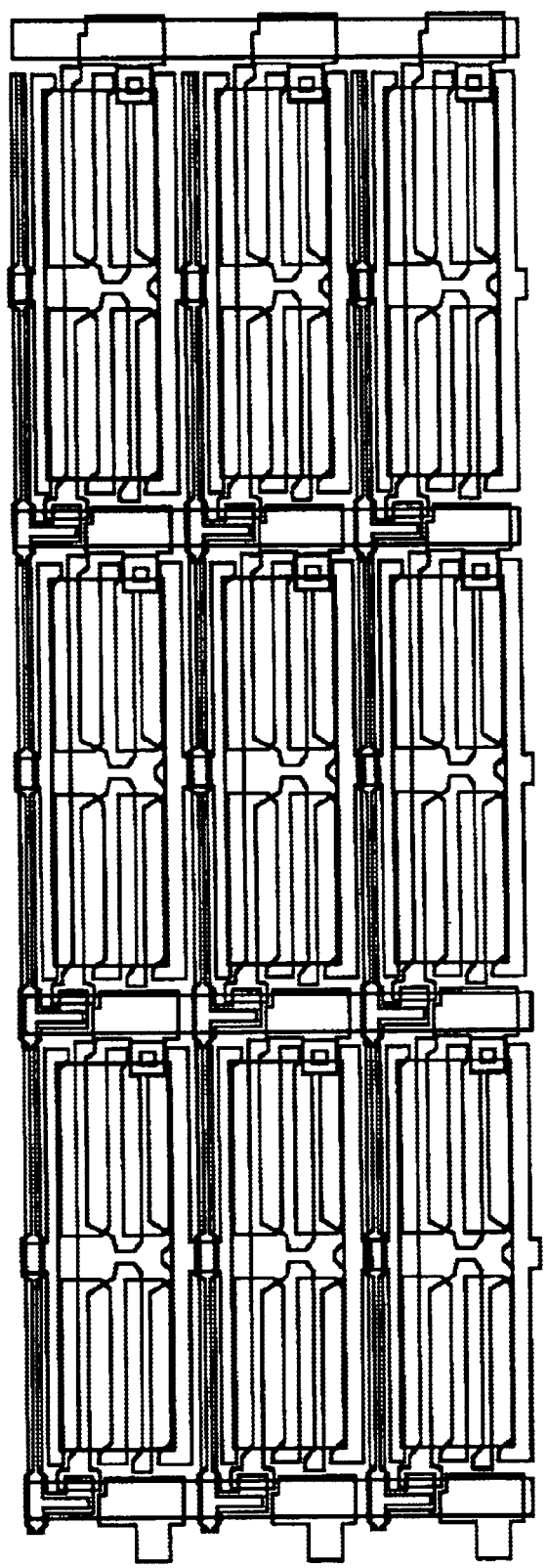
FIG. 27 is a plan view showing the surrounding portion of the one pixel of the liquid crystal display part of the active matrix color liquid crystal display device according to one Embodiment of this invention.
Figure 28:
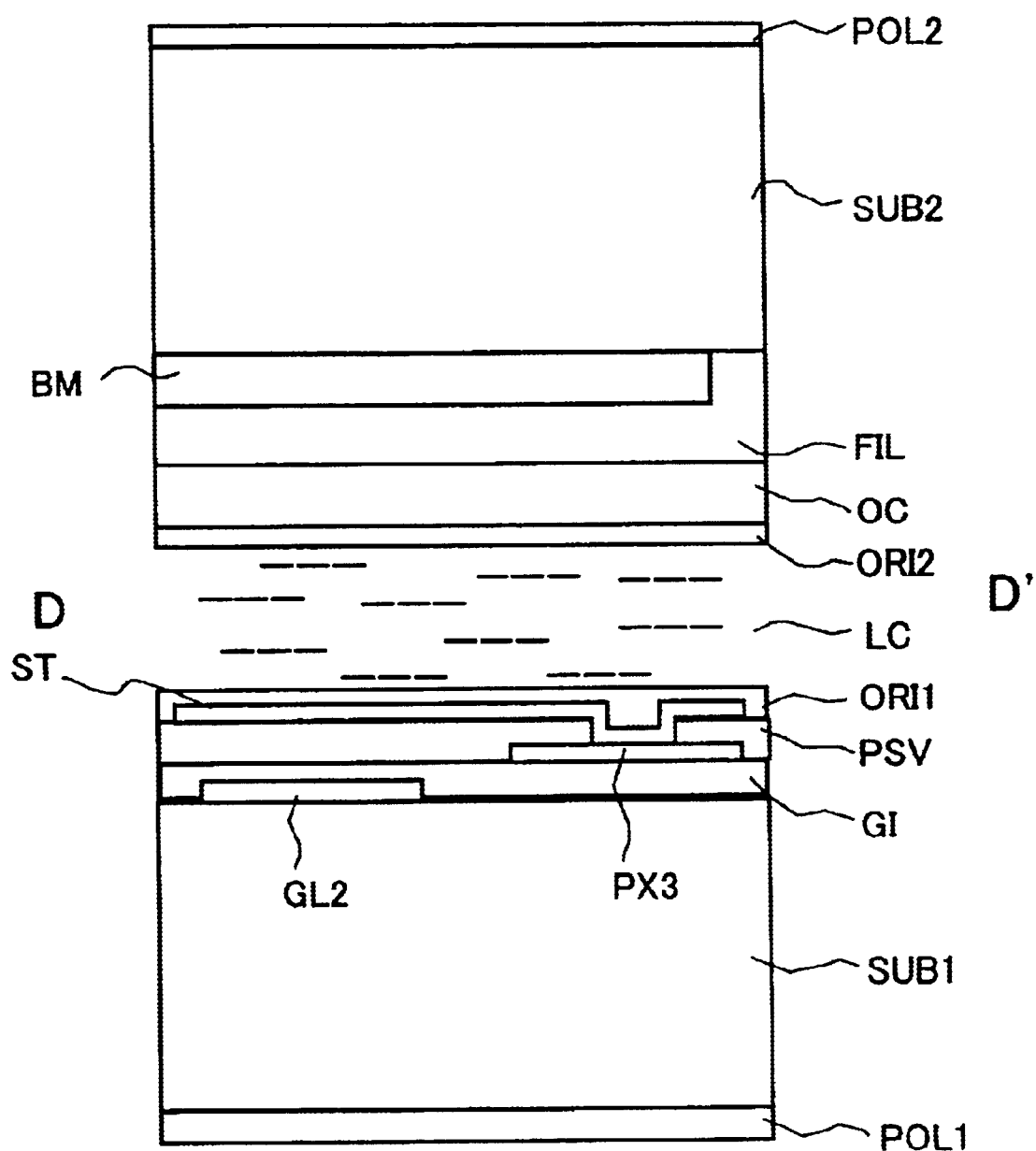
FIG. 28 is a cross-sectional view of an auxiliary capacitance Cadd portion and an electrode ST portion, taken along cutting line D–D' of FIG. 26.

FIGS. 26 and 27 are plan views showing one pixel and its neighboring pixels according to Embodiment 4. FIG. 28 is a cross-sectional view taken along cutting line D–D' of FIG. 26. In Embodiment 4, the electrode ST is connected to the portion PX3 of a pixel electrode via a through-hole TH, and in addition, the electrode ST is formed to be superposed on or overlap a scanning signal line (gate line) GL2 of the previous row. By this formation, an auxiliary capacitance Cadd is formed in addition to the storage capacitance Cstg.

<<Operation of Auxiliary Capacitance Cadd>>

Similarly to the storage capacitance Cstg, the auxiliary capacitance Cadd has the effect of storing video information written into a pixel for a long time (after a thin film transistor TFT is switched off). Particularly if the storage capacitance Cstg is not provided, the auxiliary capacitance Cadd is an indispensable constituent element.

In addition, similarly to the storage capacitance Cstg, the auxiliary capacitance Cadd also serves to reduce the influence of the gate potential variation $\Delta Vg$ on the pixel electrode potential Vs when the thin film transistor TFT switches. This manner is expressed by the following equation:

$$\Delta Vs = \{Cgs/(Cgs+Cstg+Cadd+Cpix)\} \times \Delta Vg.$$

This variation $\Delta Vs$ is the cause of a DC component to be applied to the liquid crystal LC, and as the auxiliary capacitance Cadd is made larger, the value of the variation $\Delta Vs$ can be made smaller. A reduction in the DC component to be applied to the liquid crystal LC improves the life of the liquid crystal LC and can prevent so-called image persistence, i.e., the phenomenon that a previous image remains when a liquid crystal display picture is switched over.

Similarly to the electrode ST of Embodiment 1, the electrode ST of Embodiment 4 has the advantage of nearly completely solving contamination spots due to protective-film defects over the pixel electrodes as well as contamination spots due to protective-film defects over the counter electrodes and the counter voltage signal lines, because the electrode ST is at the same potential as the pixel electrodes. In addition, even if foreign matter lies on the scanning signal lines GL and the insulating film GI and the protective film PSV1 have defects, the electrode ST of Embodiment 4 has the advantage of preventing or restraining the occurrence of contamination spots.

Since the structure of Embodiment 4 is such that even if a protective-film defect lies on the gate line, plural electrodes ST surround the protective-film defect, almost all of the lines of electric force generated from the detective portion are converged to the electrodes ST and almost no charge current flows to the surrounding protective-film capacitances. In addition, the ions of the liquid crystal in the detective portion are minus charged up, but since the surrounding electrodes ST immediately discharge, the minus ions cannot easily diffuse into the surrounding pixels. Accordingly, it is possible to greatly reduce the size of a contamination spot and the strength.

In addition, in Embodiment 4, since the scanning lines are covered with the electrodes connected to the pixel electrodes, even if a pixel electrode and a scanning signal line are short-circuited by foreign matter, the resultant defect is restricted to a dot defect, whereby no reduction in yield is incurred.

As described above, Embodiment 4 has, in addition to the advantage of Embodiment 1, the advantage of greatly reducing a contamination spot due to a protective-film defect on the scanning signal line (gate line) GL. In addition, an unnecessary electric field is prevented from being applied to a display area from a scanning electrode, whereby it is possible to achieve the advantage of solving display defects, such as flickers and image retention, caused by a DC component due to an electric field from the scanning signal line.

Embodiment 5

Embodiment 5 is the same as Embodiments 1, 2 and 4 except for the following points.

Figure 29:
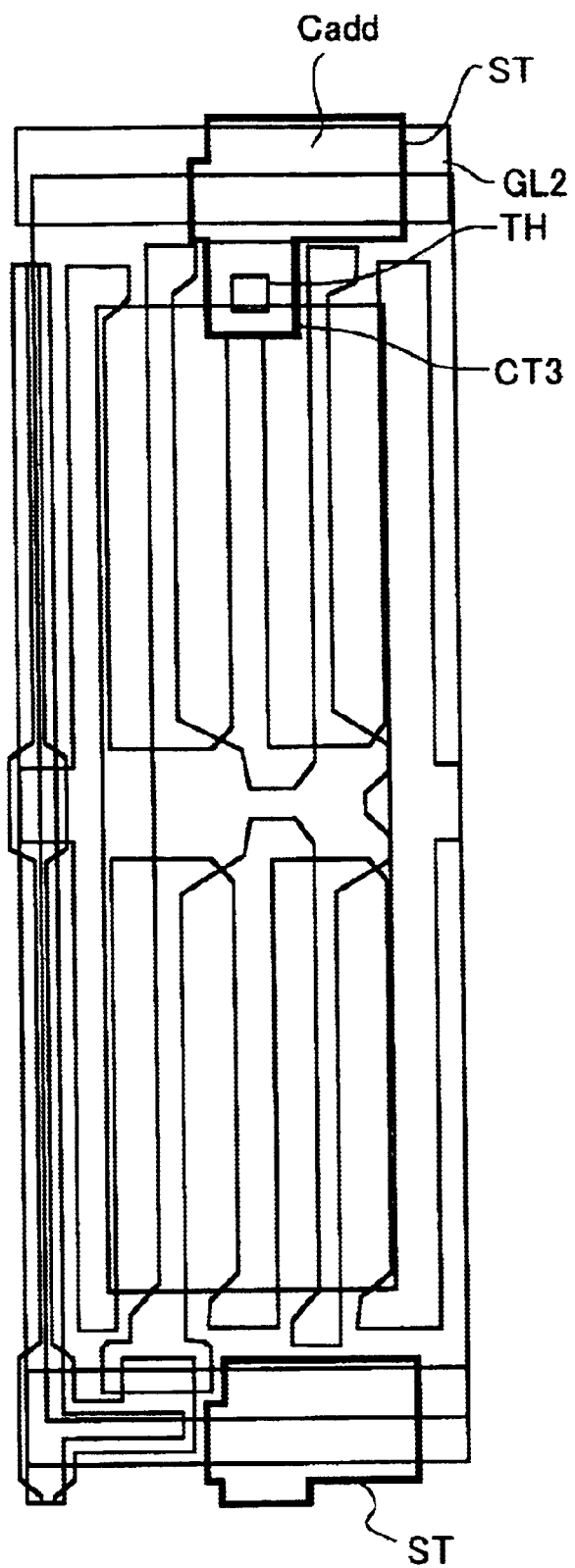
FIG. 29 is a plan view showing one pixel of a liquid crystal display part of an active matrix color liquid crystal display device according to one Embodiment of this invention.

FIG. 29 is a plan view showing one pixel of Embodiment 5.

In Embodiment 5, similarly to the electrode ST of Embodiment 2, the electrode ST is connected to the portion CT3 of a counter electrode via a through-hole TH, and similarly to the electrode ST of Embodiment 4, the electrode ST is formed to be superposed on or overlap the scanning signal line (gate line) GL2 of the previous row. Incidentally, in Embodiment 5, no auxiliary capacitance Cadd is formed.

As described above, Embodiment 5 can achieve the advantages of Embodiments 1, 2 and 4.

Embodiment 6

Embodiment 6 is the same as Embodiments 1, 3 and 4 except for the following points.

Figure 30:
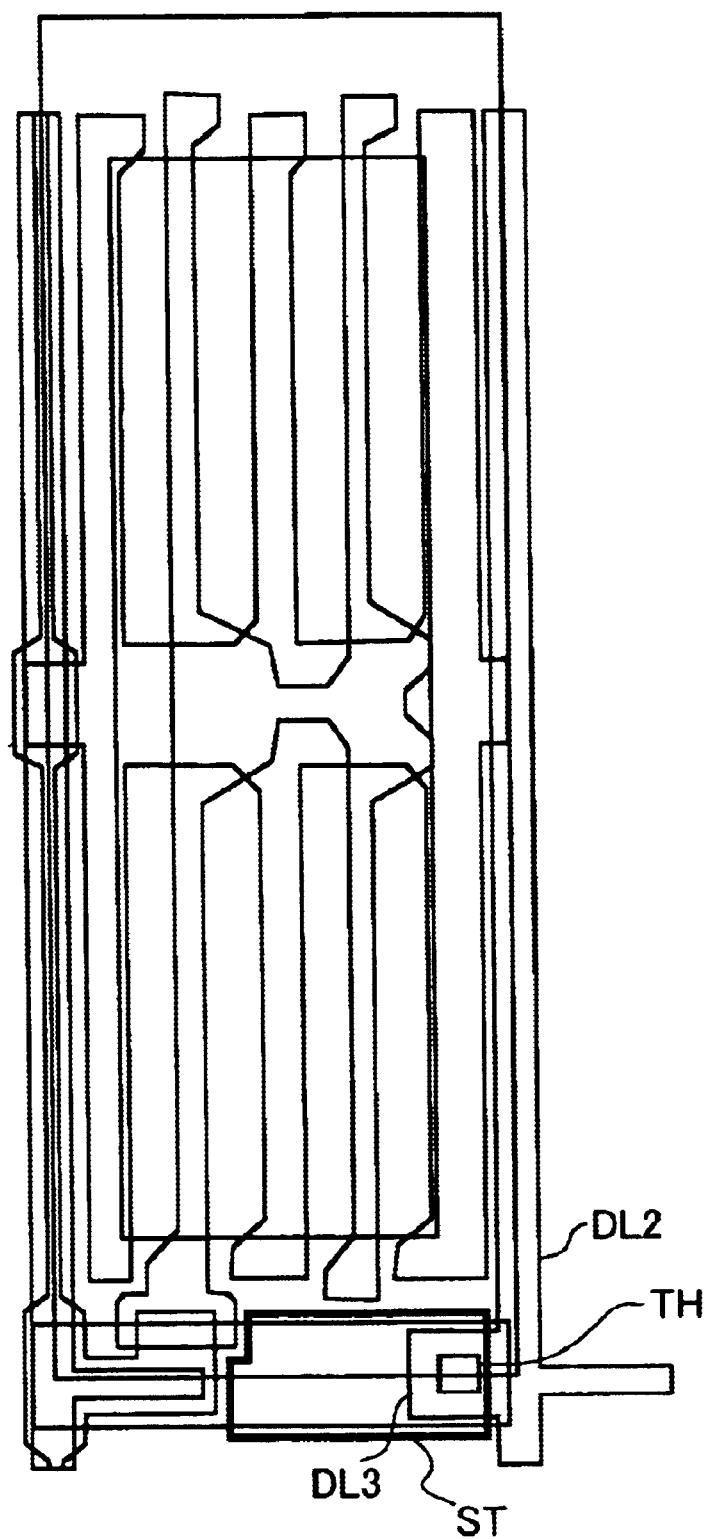
FIG. 30 is a plan view showing one pixel of a liquid crystal display part of an active matrix color liquid crystal display device according to one Embodiment of this invention.

FIG. 30 is a plan view showing one pixel of Embodiment 6. In Embodiment 6, similarly to the electrode ST of Embodiment 3, the electrode ST is connected to the portion DL3 of a video signal line via a through-hole TH, and similarly to the electrode ST of Embodiment 4, the electrode ST is formed to be superposed on or overlap the scanning signal line (gate line) GL2 of the previous row. Incidentally, in Embodiment 6, no auxiliary capacitance Cadd is formed.

As described above, Embodiment 6 can achieve the advantages of Embodiments 1, 3 and 4.

Embodiment 7

Embodiment 7 is the same as Embodiment 1 except for the following points.

Figure 31:
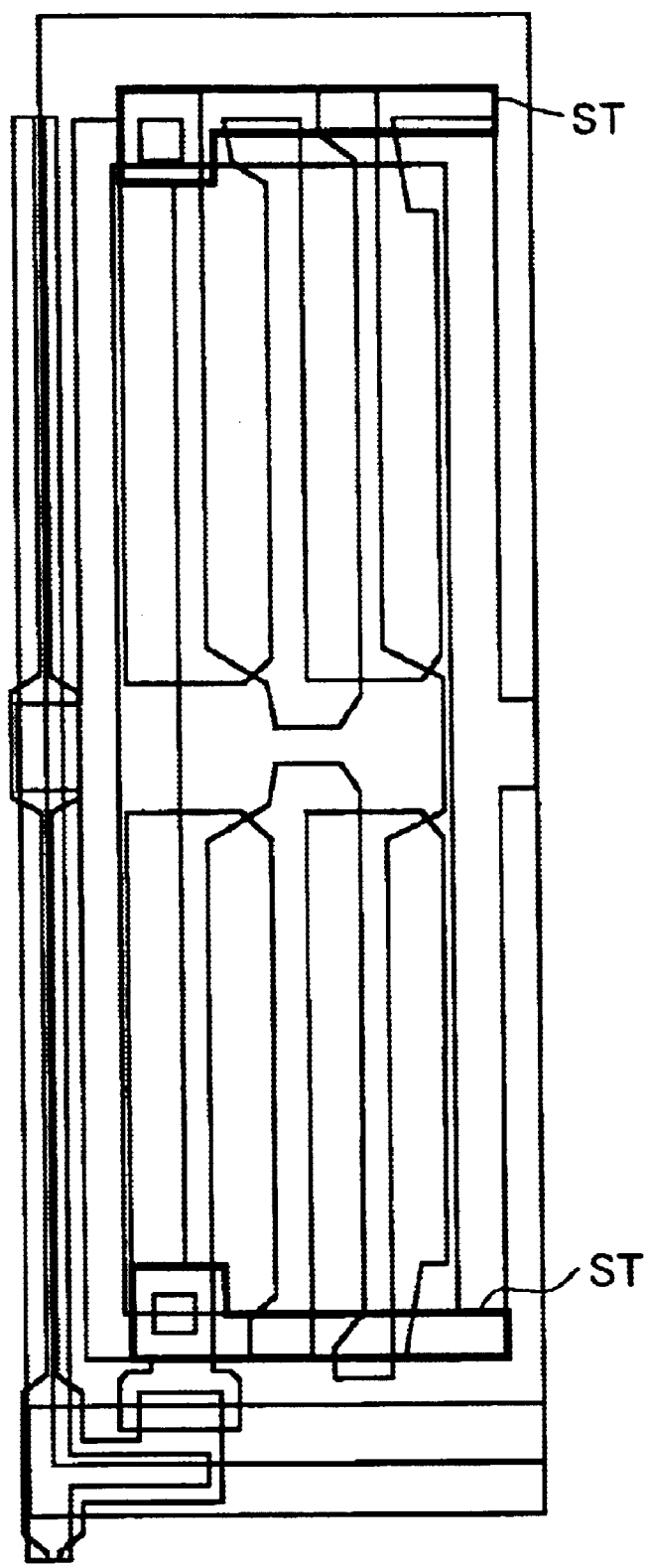
FIG. 31 is a plan view showing one pixel of a liquid crystal display part of an active matrix color liquid crystal display device according to one Embodiment of this invention.

FIG. 31 is a plan view showing one pixel of Embodiment 7. In Embodiment 7, similarly to the electrode ST of Embodiment 1, each electrode ST is connected to a portion of a pixel electrode via a through-hole TH.

In addition, in Embodiment 7, two electrodes ST are formed in one pixel in such a manner as to be arranged along the respective adjacent scanning signal lines GL. According to this construction, as in the case of Embodiment 4, it is possible to reduce a contamination spot due to a protective-film defect on a scanning signal line, and an unnecessary electric field is prevented from being applied to a display area from a scanning electrode, whereby it is possible to solve display defects, such as flickers and image retention, caused by a DC component due to an electric field from the scanning signal line.

As described above, Embodiment 7 can achieve the advantages of Embodiments 1 and 4.

Embodiment 8

Embodiment 8 is the same as Embodiments 1, 2 and 7 except for the following points.

Figure 32:
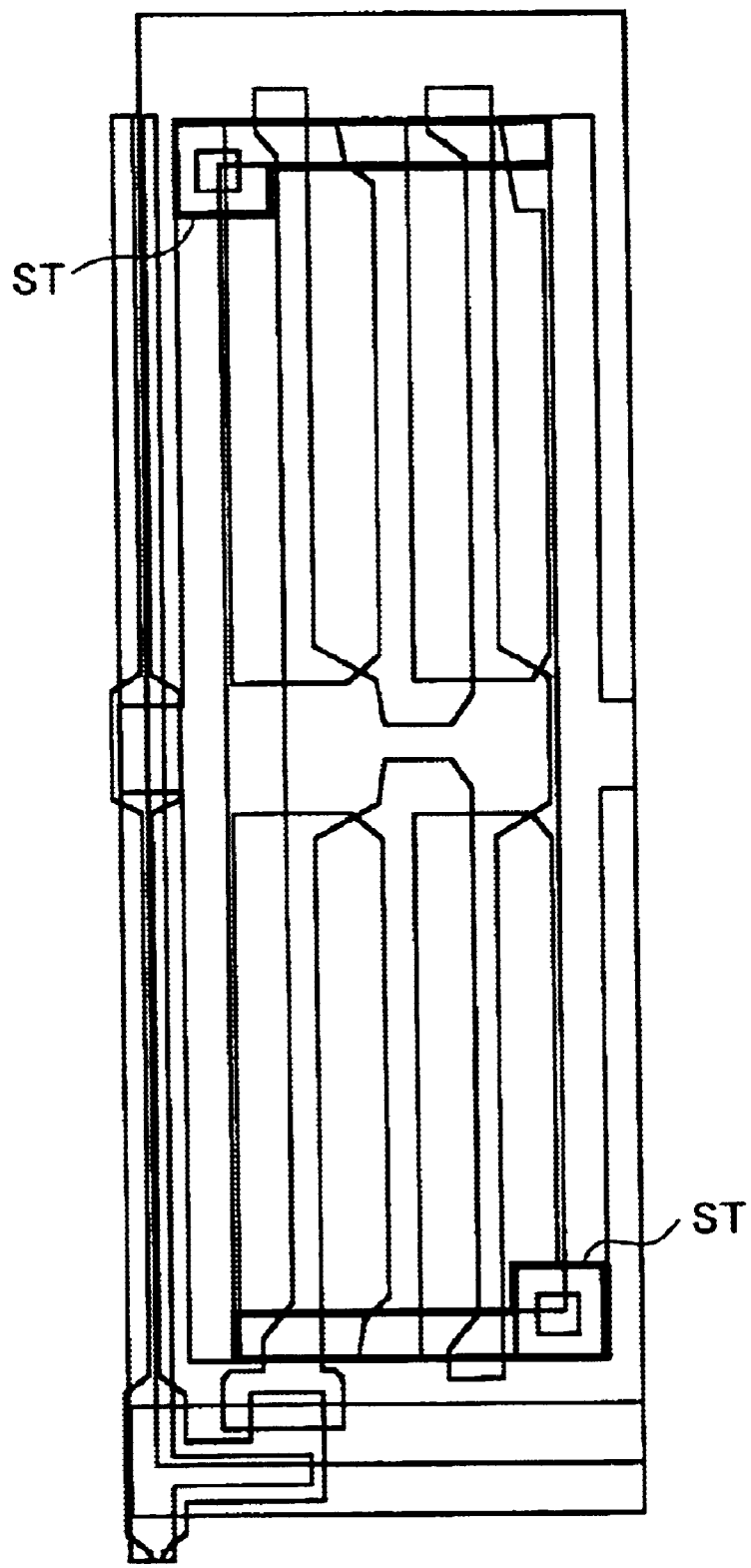
FIG. 32 is a plan view showing one pixel of a liquid crystal display part of an active matrix color liquid crystal display device according to one Embodiment of this invention.

FIG. 32 is a plan view showing one pixel of Embodiment 8. In Embodiment 8, similarly to the electrode ST of Embodiment 2, each electrode ST is connected to a portion of a counter electrode via a through-hole TH.

In addition, in Embodiment 8, two electrodes ST are formed in one pixel in such a manner as to be arranged along the respective adjacent scanning signal lines GL. According to this construction, as in the case of Embodiment 4, it is possible to reduce a contamination spot due to a protective-film defect on a scanning signal line, and an unnecessary electric field is prevented from being applied to a display area from a scanning electrode, whereby it is possible to solve display defects, such as flickers and image retention, caused by a DC component due to an electric field from the scanning signal line.

As described above, Embodiment 8 can achieve the advantages of Embodiments 1, 2 and 4.

Embodiment 9

Embodiment 9 is the same as Embodiments 1 and 4 except for the following points.

Figure 33:
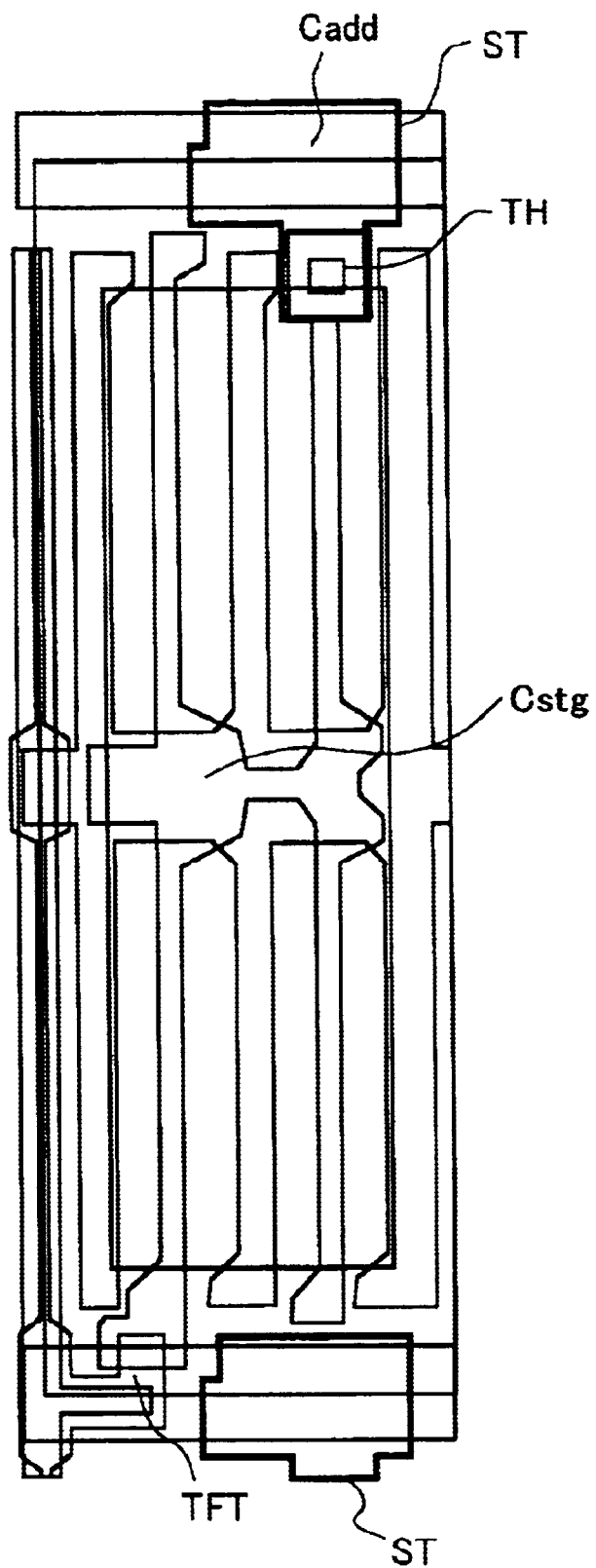
FIG. 33 is a plan view showing one pixel of a liquid crystal display part of an active matrix color liquid crystal display device according to one Embodiment of this invention.

FIG. 33 is a plan view showing one pixel of Embodiment 9.

In Embodiment 9, similarly to the electrode ST of Embodiment 4, the electrode ST is connected to a portion of a pixel electrode via a through-hole TH, and in addition, the electrode ST is formed to be superposed on a scanning signal line of the previous row.

In addition, in Embodiment 9, the storage capacitance Cstg is increased and the parasitic capacitance Cgs of the thin film transistor TFT is decreased, whereby the field-through voltage $\Delta Vs$ (shown in FIG. 13) at which the thin film transistor TFT is switched off is reduced to 1 V or less. According to this construction, the potentials of the DC components of pixel electrodes, counter electrodes and video signal lines are approximately the same as one another, whereby merely by connecting the electrode ST to the pixel electrode, it is possible to restrain the occurrence of charge currents due to protective-film defects on the pixel electrodes, the counter electrodes and the video signal lines, and it is possible to restrain the occurrence of contamination spots. A threshold voltage at which to cause an electrode reaction which produces a contamination spot is about 0.5–1 V. Although the threshold voltage has different values for different liquid crystal materials and different electrode material, since the value of the threshold voltage is 1 V in the construction of Embodiment 9, the storage capacitance Cstg and the parasitic capacitance Cgs of the thin film transistor TFT are set so that the field-through voltage $\Delta Vs$ becomes 1 V or less.

Incidentally, in Embodiment 9, although the storage capacitance Cstg and the parasitic capacitance Cgs of the thin film transistor TFT are set so that the field-through voltage $\Delta Vs$ becomes 1 V or less, it is preferable to set the field-through voltage $\Delta Vs$ to 0.5 V or less so that the threshold voltage does not depend on the kind of material.

As described above, Embodiment 9 has the advantage of nearly completely solving contamination spots due to protective-film defects over the pixel electrodes PX, PX2 and PX3 and the source electrodes SD1, and contamination spots due to protective-film defects over the counter electrodes CT and CT2 and the counter voltage signal lines CL, as well as contamination spots due to protective-film defects over the video signal lines DL and the drain electrodes SD2, because all the electrodes and lines are at approximately the same potential as the electrodes ST (in the case of AC voltages, at approximately the same potential in terms of their DC components). In addition, Embodiment 9 has, in addition to the advantage of Embodiment 4, the advantage of greatly reducing a contamination spot due to a protective-film defect on the scanning signal line (gate line) GL. In addition, an unnecessary electric field is prevented from being applied to a display area from a scanning electrode, whereby it is possible to achieve the advantage of solving display defects, such as flickers and image retention, caused by a DC component due to an electric field from the scanning signal line.

Moreover, as in the case of Embodiment 1, it is also possible to restrain the flow of ionic impurities and hence the occurrence of indefinite black irregularities. Similarly, owing to the same effect, it is possible to greatly reduce image retention (image persistence) which is the phenomenon that the edge of a fixed pattern becomes black when the fixed pattern is displayed for a long time.

Embodiment 10

Embodiment 10 is the same as Embodiments 1, 5 and 9 except for the following points.

In Embodiment 10, similarly to the electrode ST of Embodiment 5, the electrode ST is connected to a portion of a counter electrode via a through-hole TH, and is formed to overlap the scanning signal line of the previous row. In addition, in Embodiment 10, as in the case of Embodiment 9, the storage capacitance Cstg is increased and the parasitic capacitance Cgs of the thin film transistor TFT is decreased, whereby the field-through voltage ΔVs (shown in FIG. 13) at which the thin film transistor TFT is switched off is reduced to 1 V or less. According to this construction, the potentials of the DC components of pixel electrodes, counter electrodes and video signal lines are approximately the same as one another, whereby merely by connecting the electrode ST to the counter electrode, it is possible to restrain the occurrence of charge currents due to protective-film defects on the pixel electrodes, the counter electrodes and the video signal lines, and it is possible to restrain the occurrence of contamination spots. A threshold voltage at which to cause an electrode reaction which produces a contamination spot is about 0.5–1 V. Although the threshold voltage has different values for different liquid crystal materials and different electrode material, since the value of the threshold voltage is 1 V in the construction of Embodiment 10, the storage capacitance Cstg and the parasitic capacitance Cgs of the thin film transistor TFT are set so that the field-through voltage ΔVs becomes 1 V or less.

Incidentally, in Embodiment 10, although the storage capacitance Cstg and the parasitic capacitance Cgs of the thin film transistor TFT are set so that the field-through voltage ΔVs becomes 1 V or less, it is preferable to set the field-through voltage ΔVs to 0.5 V or less so that the threshold voltage does not depend on the kind of material.

As described above, in addition to the advantage of Embodiment 9, similarly to Embodiment 2, Embodiment 10 has the advantage that it is possible to greatly reduce the duration of time of the state of defective display such as a reduced contrast ratio and the occurrence of flickers during an initial turn-on period or other periods during which charging from the electrode ST is in an insufficient state.

Embodiment 11

Embodiment 11 is the same as Embodiments 1, 6 and 9 except for the following points.

In Embodiment 11, similarly to the electrode ST of Embodiment 6, the electrode ST is connected to a portion of a video signal line via a through-hole TH, and is formed to overlap the scanning signal line of the previous row. In addition, in Embodiment 11, as in the case of Embodiment 9, the storage capacitance Cstg is increased and the parasitic capacitance Cgs of the thin film transistor TFT is decreased, whereby the field-through voltage ΔVs (shown in FIG. 13) at which the thin film transistor TFT is switched off is reduced to 1 V or less. According to this construction, the potentials of the DC components of pixel electrodes, counter electrodes and video signal lines are approximately the same as one another, whereby merely by connecting the electrode ST to the video signal line, it is possible to restrain the occurrence of charge currents due to protective-film defects on the pixel electrodes, the counter electrodes and the video signal lines, and it is possible to restrain the occurrence of contamination spots. A threshold voltage at which to cause an electrode reaction which produces a contamination spot is about 0.5–1 V. Although the threshold voltage has different values for different liquid crystal materials and different electrode material, since the value of the threshold voltage is 1 V in the construction of Embodiment 10, the storage capacitance Cstg and the parasitic capacitance Cgs of the thin film transistor TFT are set so that the field-through voltage ΔVs becomes 1 V or less.

Incidentally, in Embodiment 11, although the storage capacitance Cstg and the parasitic capacitance Cgs of the thin film transistor TFT are set so that the field-through voltage ΔVs becomes 1 V or less, it is preferable to set the field-through voltage ΔVs to 0.5 V or less so that the threshold voltage does not depend on the kind of material.

As described above, in Embodiment 11, it is possible to achieve the advantage of Embodiment 3 in addition to the advantage of Embodiment 9.

Embodiment 12

Embodiment 3 is the same as Embodiment 4 except for the following points.

Figure 34:
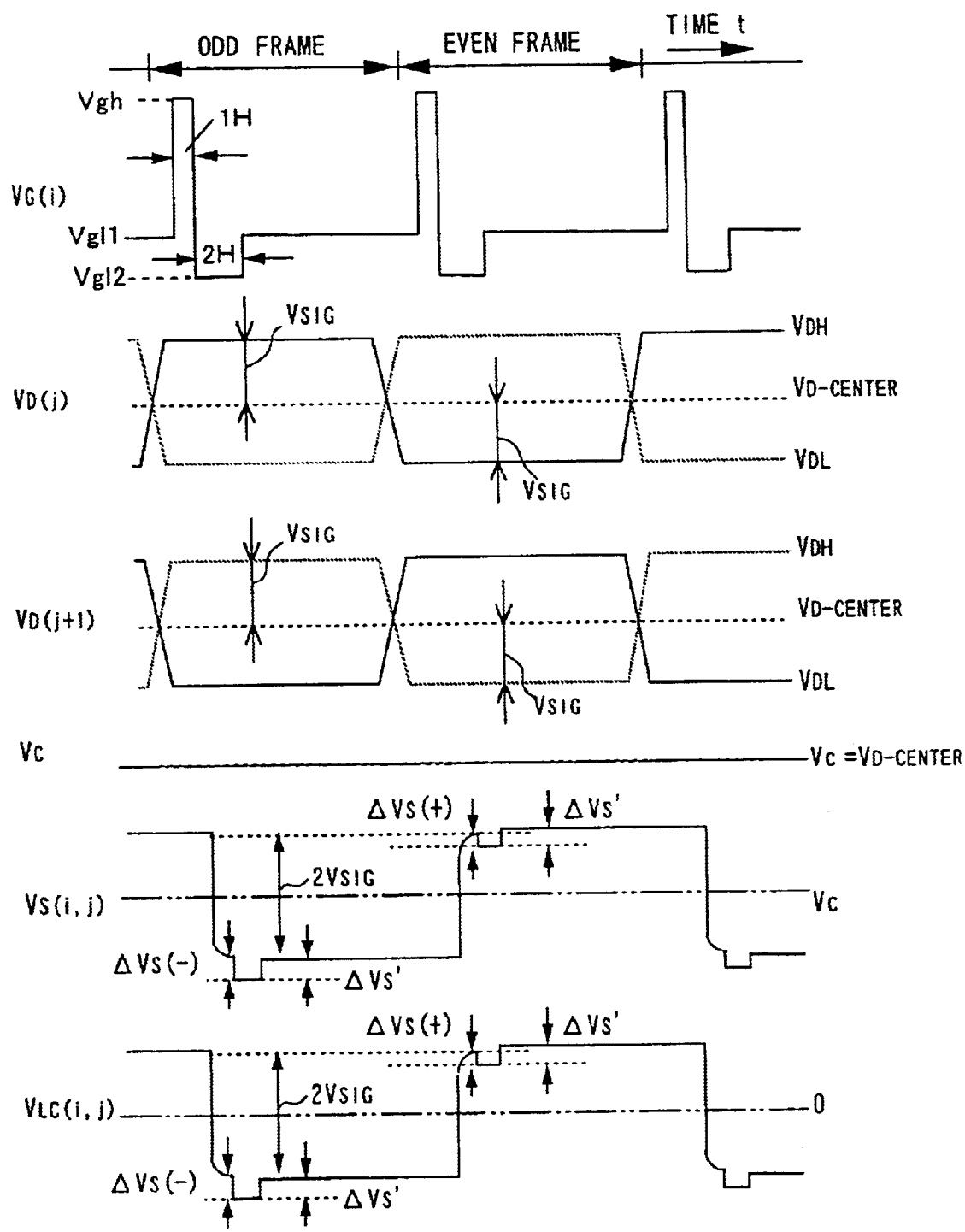
FIG. 34 is a plan view showing one pixel of a liquid crystal display part of an active matrix color liquid crystal display device according to one Embodiment of this invention.

FIG. 34 shows driving waveforms of Embodiment 12. In Embodiment 12, the scanning voltage Vg has three values of voltage. One of these three values of voltage is a selection voltage for switching on the thin film transistor TFT, and the other two are voltages for holding the thin film transistor TFT in an off state. During a scanning period, after the thin film transistor TFT has been switched on and a video signal has been written, the voltage of the thin film transistor TFT is decreased from Vgh to Vg12 to bring the thin film transistor TFT to the off state. At this time, the field-through voltage ΔVs occurs and shifts to a potential lower than the written voltage. This field-through voltage ΔVs differs to a slight extent between when a positive signal is written and when a negative voltage is written. Subsequently, after one scanning period (1H) has passed which is required to bring the thin film transistor TFT to a fully off state, a non-selection voltage which is a scanning signal for the previous row is increased from Vg12 to Vg11. At this time, a field-through voltage ΔVs' is added to the pixel electrode potential Vs via the auxiliary capacitance Cadd, and the pixel voltage shifts to a higher potential. This voltage ΔVg1 and the auxiliary capacitance Cadd are optimized and this voltage ΔVs' is optimized with respect to the field-through voltage ΔVs, whereby the potential of the DC component of the pixel electrode voltage Vs and the counter voltage Vc can be made approximately coincident with the potential of the DC component of the potential of the video signal line DL.

These field-through voltages ΔVs and ΔVs' are determined by the following equations:

$$\Delta Vs = \frac{Cgs(on)}{Cgs(on) + Cstg + Cadd + Clc}(Vgh - Vd - Vth) \quad \text{(Eq. 1)}$$

$$\frac{Cgs(off)}{Cgs(off) + Cstg + Cadd + Clc}(Vd + Vth - Vgl2)$$

$$\Delta Vs' = \frac{Cadd}{Cgs(off) + Cstg + Cadd + Clc}(Vgl1 - Vgl2) \quad \text{(Eq. 2)}$$

In the above equations, Cgs(on) represents the gate-source parasitic capacitance during the on state of the thin film transistor TFT, and Cgs(off) represents the gate-source parasitic capacitance during the off state of the thin film transistor TFT.

According to this construction, if the electrode ST is only connected to any one of a pixel electrode, a counter electrode and a video signal line, it is possible to restrain the occurrence of charge currents due to protective-film defects on the pixel electrode, the counter electrode and the video signal line, and it is possible to restrain the occurrence of contamination spots.

In Embodiment 12, the electrode ST is connected to the pixel electrode, but even if the electrode ST is connected the counter electrode, it is possible to achieve an equivalent advantage.

As described above, Embodiment 12 has the advantage of nearly completely solving contamination spots due to protective-film defects over the pixel electrodes PX, PX2 and PX3 and the source electrodes SD1, and contamination spots due to protective-film defects over the counter electrodes CT and CT2 and the counter voltage signal lines CL, as well as contamination spots due to protective-film defects over the video signal lines DL and the drain electrodes SD2, because all the electrodes and lines are at approximately the same potential as the pixel electrodes (in the case of AC voltages, at approximately the same potential in terms of their DC components). In addition, similarly to Embodiment 4, Embodiment 9 has the advantage of greatly reducing a contamination spot due to a protective-film defect on the scanning signal line (gate line) GL. In addition, an unnecessary electric field is prevented from being applied to a display area from a scanning electrode, whereby it is possible to achieve the advantage of solving display defects, such as flickers and image retention, caused by a DC component due to an electric field from the scanning signal line.

Moreover, as in the case of Embodiment 1, it is also possible to restrain the flow of ionic impurities and hence the occurrence of indefinite black irregularities. Similarly, owing to the same effect, it is possible to greatly reduce image retention (image persistence) which is the phenomenon that the edge of a fixed pattern becomes black when the fixed pattern is displayed for a long time.

Embodiment 13

Embodiment 13 is the same as Embodiment 1 except for the following points.

Figure 35:
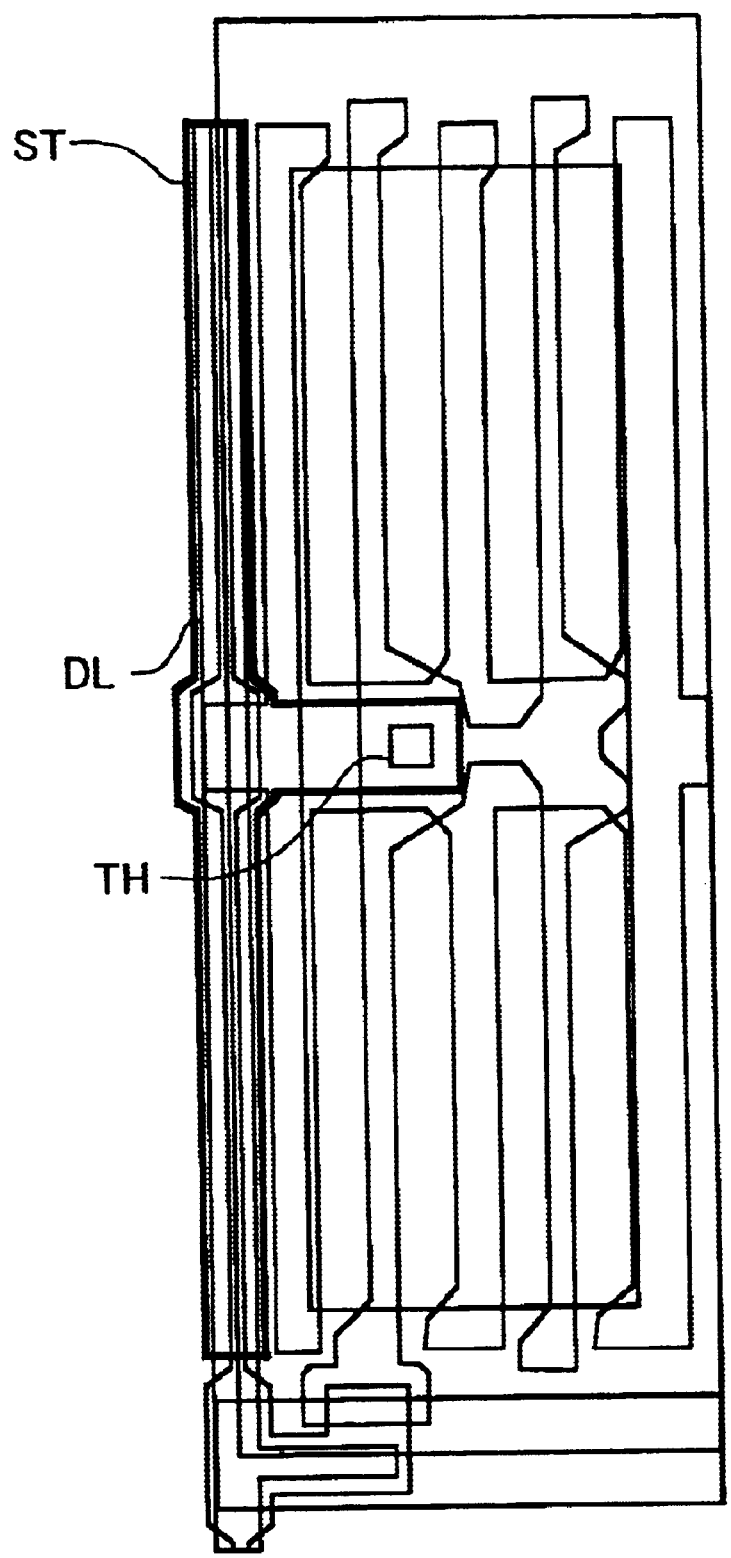
FIG. 35 is a plan view showing one pixel of a liquid crystal display part of an active matrix color liquid crystal display device according to one Embodiment of this invention.

FIG. 35 is a plan view showing one pixel of Embodiment 13. In Embodiment 13, the electrode ST is connected to a portion of a pixel electrode via a through-hole TH, and is formed to be superposed on a scanning signal line. Although in Embodiment 13 the electrode ST is superposed on the video signal line of one of the next (adjacent) columns, the electrode ST may also be superposed on the video signal line of the opposite one of the next columns.

Similarly to the electrode ST of Embodiment 1, the electrode ST of Embodiment 13 has the advantage of nearly completely solving contamination spots due to protective-film defects over pixel electrodes as well as contamination spots due to protective-film defects over counter electrodes and counter voltage signal lines, because the electrode ST is at the same potential as the pixel electrodes. In addition, even if foreign matter lies on the video signal lines DL and the protective film PSV1 have a defect, the electrode ST of Embodiment 13 has the advantage of preventing or restraining the occurrence of contamination spots.

Since the structure of Embodiment 13 is such that even if a protective-film defect lies on the gate line, plural electrodes ST surround the protective-film defect, almost all of the lines of electric force generated from the detective portion are converged to the electrodes ST and almost no charge current flows to the surrounding protective-film capacitances. In addition, the ions of the liquid crystal in the detective portion are plus charged up, but since the surrounding electrodes ST immediately discharge, the plus ions cannot easily diffuse into the surrounding pixels. Accordingly, it is possible to greatly reduce the size of a contamination spot and the strength. In addition, in Embodiment 13, since the scanning lines are covered with the electrodes connected to the pixel electrodes, even if a pixel electrode and a video signal line are short-circuited by foreign matter, the resultant defect is restricted to a dot defect, whereby no reduction in yield is incurred.

As described above, Embodiment 13 has, in addition to the advantage of Embodiment 1, the advantage of greatly reducing a contamination spot due to a protective-film defect on the video signal line (drain line) DL.

Embodiment 14

Embodiment 14 is the same as Embodiment 1 except for the following points.

Figure 36:
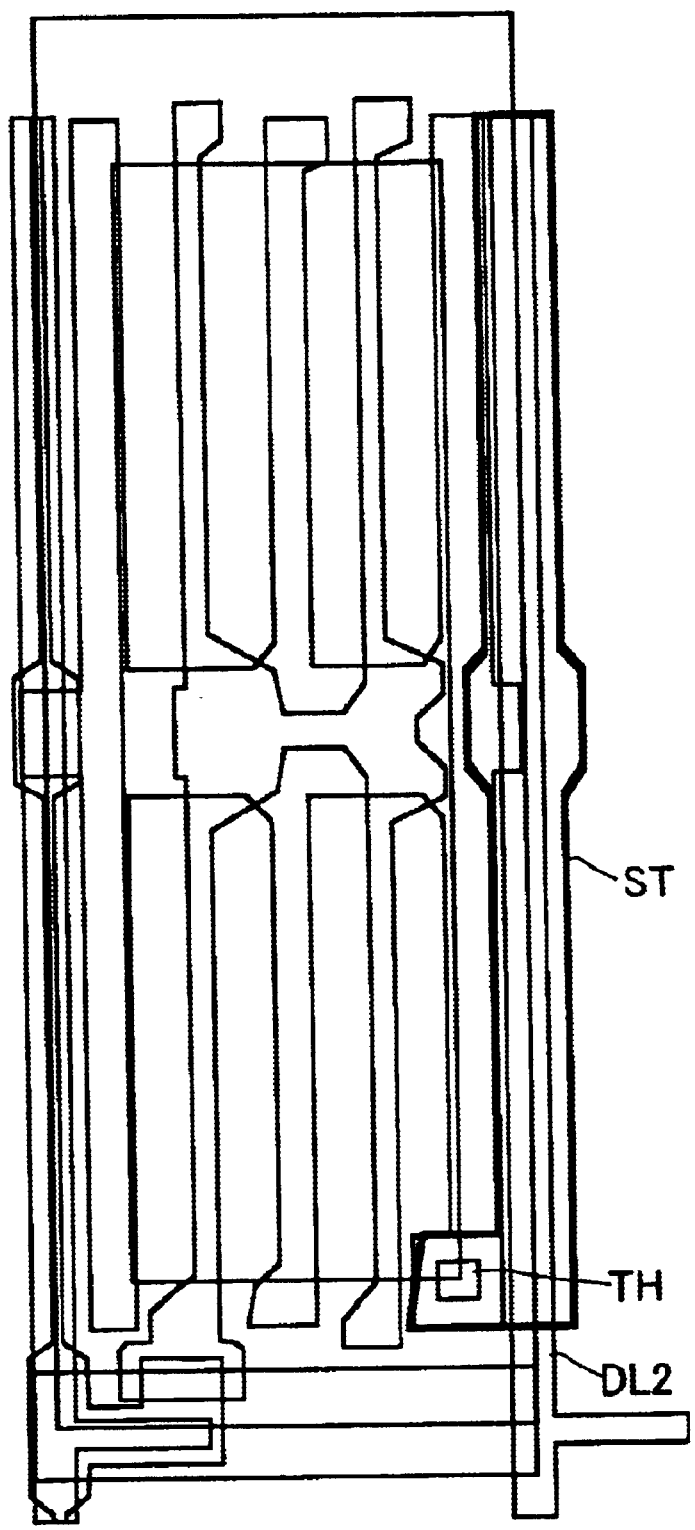
FIG. 36 is a plan view showing one pixel of a liquid crystal display part of an active matrix color liquid crystal display device according to one Embodiment of this invention.

FIG. 36 is a plan view showing one pixel of Embodiment 13. In Embodiment 13, the electrode ST is connected to a portion of a counter electrode via a through-hole TH, and is formed to be superposed on the adjacent video signal line. Although in Embodiment 14 the electrode ST is superposed on the video signal line of the adjacent (next column) video signal line, the electrode ST may also be superposed on the video signal line of its own column.

Similarly to the electrode ST of Embodiment 13, the electrode ST of Embodiment 14 has the advantage of nearly completely solving contamination spots due to protective-film defects over pixel electrodes as well as contamination spots due to protective-film defects over counter electrodes and counter voltage signal lines, because the electrode ST is at the same potential as the counter electrodes. In addition, even if foreign matter lies on the video signal lines DL and the protective film PSV1 has a defect, the electrode ST of Embodiment 14 has the advantage of preventing or restraining the occurrence of contamination spots.

Since in Embodiment 14 the drain lines (video signal lines) DL are covered with the counter electrodes, unnecessary electric fields from the video signal lines can be cut off, whereby it is possible to solve the phenomenon that vertical stripes appear due to the unnecessary electric fields (vertical smear, crosstalk).

As described above, Embodiment 14 has, in addition to the advantage of Embodiment 13, the advantage that it is possible to restrain defective display during an initial turn-on period and to solve vertical crosstalk.

Embodiment 15

Embodiment 15 is the same as Embodiment 1 except for the following points.

Figure 37:
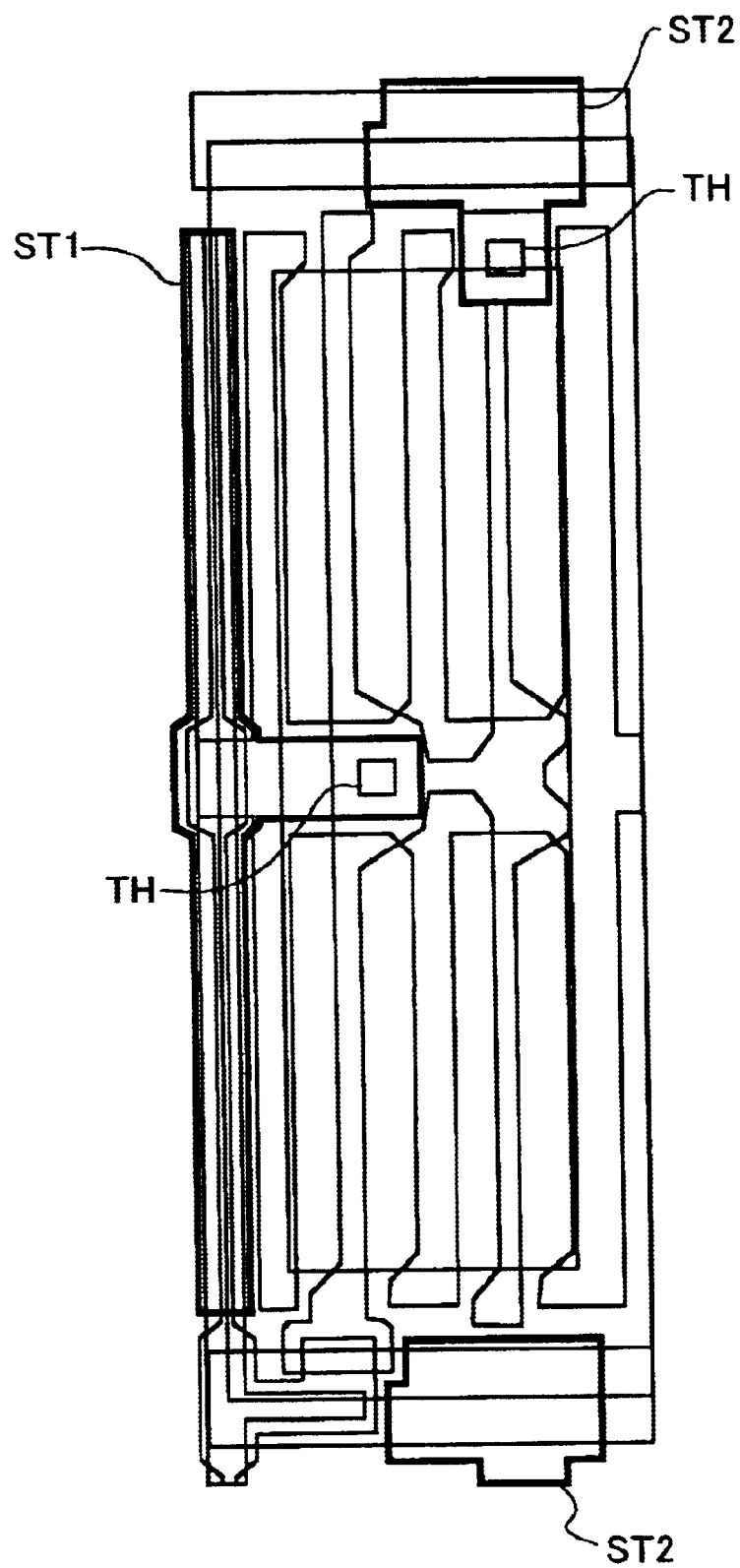
FIG. 37 is a plan view showing one pixel of a liquid crystal display part of an active matrix color liquid crystal display device according to one Embodiment of this invention.

FIG. 37 is a plan view showing one pixel of Embodiment 15. In Embodiment 15, an electrode ST1 is connected to a portion of a pixel electrode via a through-hole TH and is superposed on a video signal line of its own column, while an electrode ST2 is connected to another portion of the pixel electrode via another through-hole TH and is superposed on a scanning signal line. In Embodiment 15, the electrode ST1 is superposed on the video signal line of its own column, but it may also be superposed on the adjacent (next column) video signal line.

The electrodes ST1 and ST2 of Embodiment 15 have the advantage of nearly completely solving contamination spots due to protective-film defects over the pixel electrodes as well as contamination spots due to protective-film defects over the counter electrodes and the counter voltage signal lines, because the electrodes ST1 and ST2 are at the same potential as the pixel electrodes. In addition, even if foreign matter lies on the video signal lines DL and the scanning signal lines GL and the insulating film GI and the protective film PSV1 have defects, the electrodes ST1 and ST2 have the advantage of preventing or restraining the occurrence of contamination spots.

As described above, Embodiment 15 has the advantage of restraining contamination spots even if PAS defects (protective-film defects) lie on all the electrodes. Moreover, similarly to Embodiment 1, Embodiment 15 has the advantage that not only is it possible to restrain contamination spots, but it is also possible to restrain the flow of ionic impurities and hence the occurrence of indefinite black irregularities, by preventing new charge currents in protective-film capacitances. Similarly, owing to the same effect, it is possible to greatly reduce image retention (image persistence) which is the phenomenon that the edge of a fixed pattern becomes black when the fixed pattern is displayed for a long time. In addition, an unnecessary electric field is prevented from being applied to a display area from a scanning electrode, whereby it is possible to achieve the advantage of solving display defects, such as flickers and image retention, caused by a DC component due to an electric field from the scanning signal line.

Embodiment 16

Embodiment 16 is the same as Embodiment 1 except for the following points.

Figure 38:
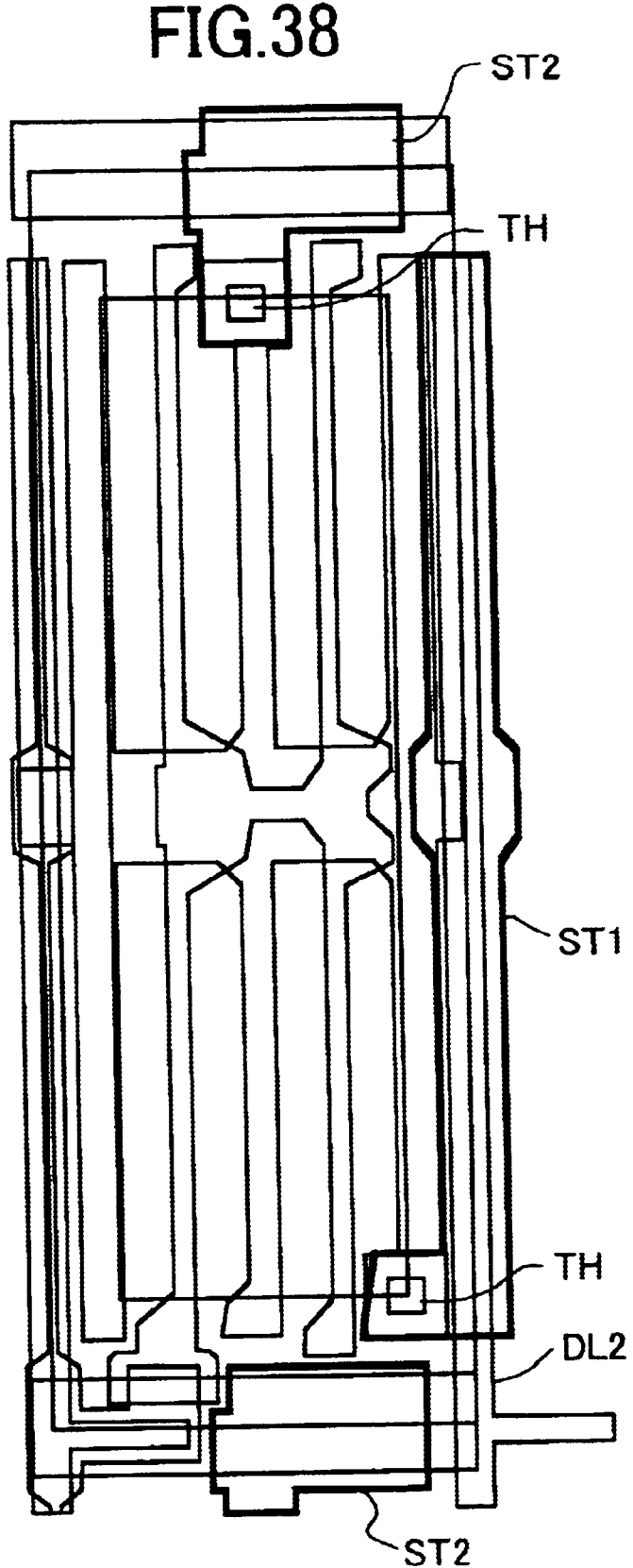
FIG. 38 is a plan view showing one pixel of a liquid crystal display part of an active matrix color liquid crystal display device according to one Embodiment of this invention.

FIG. 38 is a plan view showing one pixel of Embodiment 16. In Embodiment 16, an electrode ST1 is connected to a portion of a counter electrode via a through-hole TH and is superposed on a video signal line of its own, while an electrode ST2 is connected to another portion of the counter electrode via another through-hole TH and is superposed on a scanning signal line. In Embodiment 16, the electrode ST1 is superposed on the adjacent (next column) video signal line, but it may also be superposed on the video signal line of its own column. The electrodes ST1 and ST2 of Embodiment 16 have the advantage of nearly completely solving contamination spots due to protective-film defects over the pixel electrodes as well as contamination spots due to protective-film defects over the counter electrodes and the counter voltage signal lines, because the electrodes ST1 and ST2 are at the same potential as the counter electrodes. In addition, even if foreign matter lies on the video signal lines DL and the scanning signal lines GL and the insulating film GI and the protective film PSV1 have defects, the electrodes ST1 and ST2 have the advantage of preventing or restraining the occurrence of contamination spots.

Since in Embodiment 15 the drain lines (video signal lines) DL are covered with the counter electrodes, unnecessary electric fields from the video signal lines can be cut off, whereby it is possible to solve the phenomenon that vertical stripes appear due to the unnecessary electric fields (vertical smear, crosstalk).

As described above, Embodiment 16 has, in addition to the advantage of Embodiment 15, the advantage that it is possible to restrain defective display during an initial turn-on period and to solve vertical crosstalk, as in the case of Embodiment 2.

Embodiment 17

Embodiment 17 is the same as Embodiment 1 except for the following points.

Figure 39:
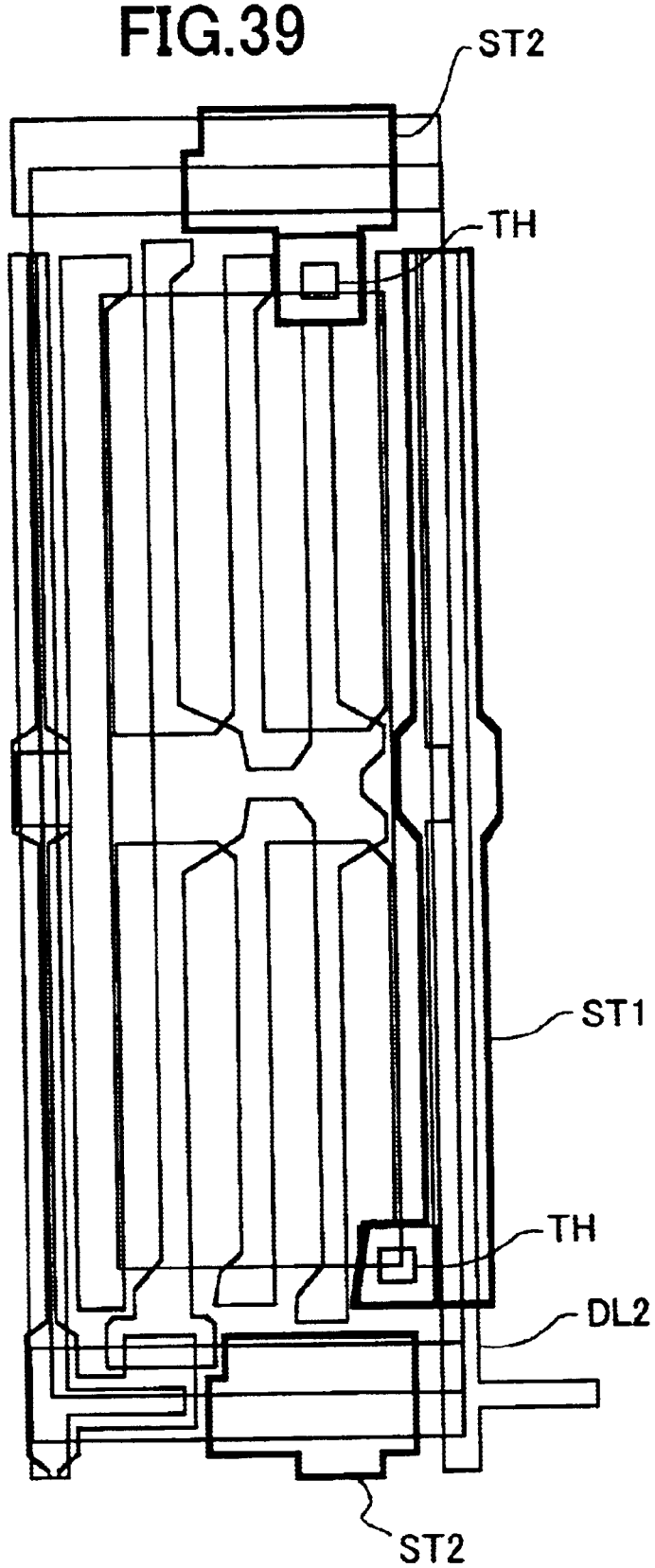
FIG. 39 is a plan view showing one pixel of a liquid crystal display part of an active matrix color liquid crystal display device according to one Embodiment of this invention.

FIG. 39 is a plan view showing one pixel of Embodiment 17. In Embodiment 17, an electrode ST1 is connected to a portion of a counter electrode via a through-hole TH and is superposed on the next-column (adjacent) video signal line, while an electrode ST2 is connected to a portion of a pixel electrode via another through-hole TH and is superposed on a scanning signal line. In Embodiment 17, the electrode ST1 is superposed on the adjacent (next column) video signal line, but it may also be superposed on the video signal line of its own column.

Otherwise, the electrode ST to be superposed on the scanning signal line may be superposed on the counter electrode, and the electrode ST to be superposed on the video signal line may be superposed on the video signal line. However, to restrain vertical smear, it is preferable that the electrode ST superposed on the video signal line be connected to the counter voltage signal line CL.

The electrodes ST1 and ST2 of Embodiment 17 have the advantage of nearly completely solving contamination spots due to protective-film defects over the pixel electrodes as well as contamination spots due to protective-film defects over the counter electrodes and the counter voltage signal lines, because the electrodes ST1 and ST2 are at the same potential as the pixel electrodes and the counter electrodes (the potential of the DC component of the pixel electrodes and that of the counter electrodes are approximately the same). In addition, even if foreign matter lies on the video signal lines DL and the scanning signal lines GL and the insulating film GI and the protective film PSV1 have defects, the electrodes ST1 and ST2 have the advantage of preventing or restraining the occurrence of contamination spots.

Since in Embodiment 17 the drain lines (video signal lines) DL are covered with the counter electrodes, unnecessary electric fields from the video signal lines can be cut off, whereby it is possible to solve the phenomenon that vertical stripes appear due to the unnecessary electric fields (vertical smear, crosstalk).

Embodiment 16 has the risk that a scanning electrode and a counter electrode are short-circuited by foreign matter and a line defect occurs, but in Embodiment 17, even if a scanning signal line and a counter electrode are short-circuited, the resultant defect is restricted to a dot defect, whereby yield can be improved.

As described above, Embodiment 17 has, in addition to the advantage of Embodiment 16, the advantage that it is possible to restrain defective display during an initial turn-on period and to solve vertical crosstalk, as in the case of Embodiment 2.

Embodiment 18

Embodiment 18 is the same as Embodiments 1 and 4 except for the following points.

Figure 40:
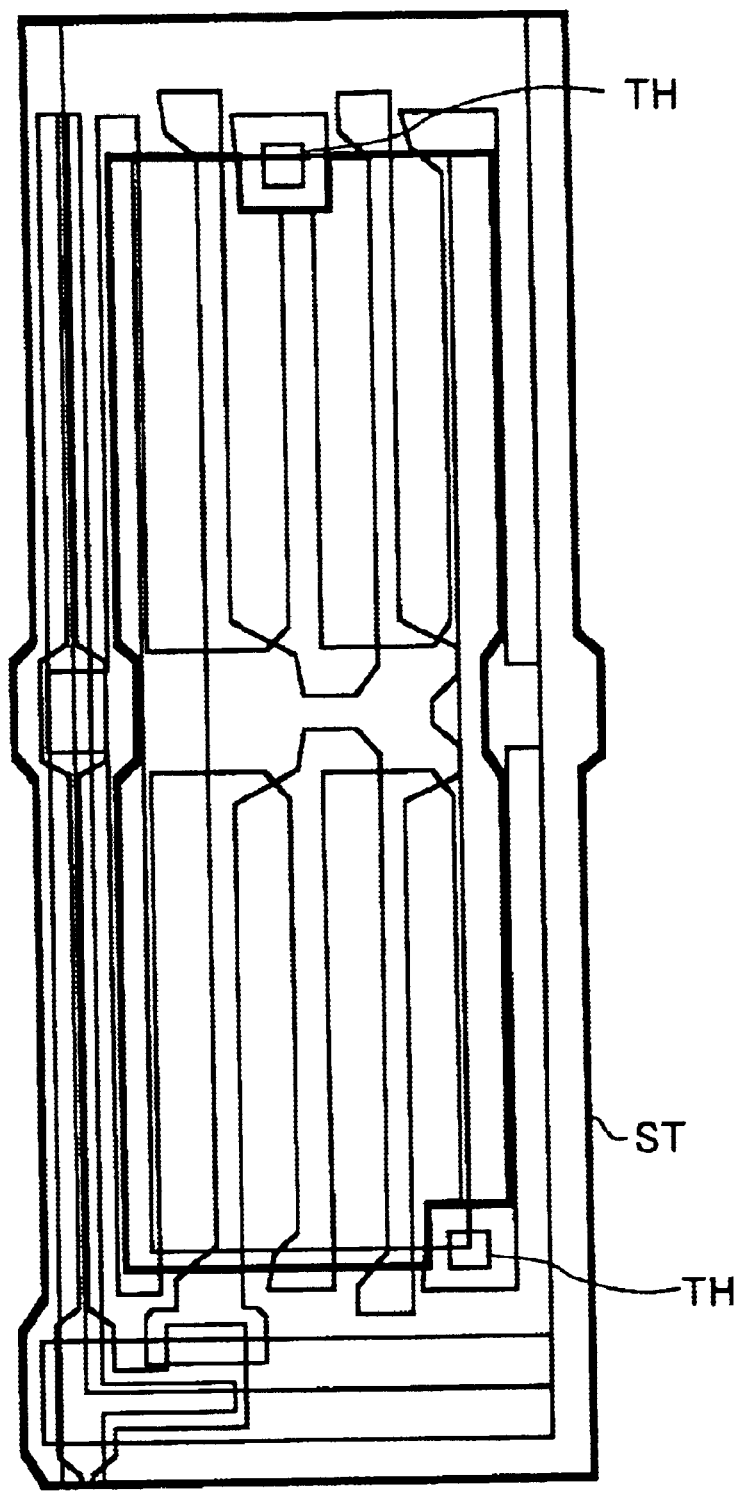
FIG. 40 is a plan view showing one pixel of a liquid crystal display part of an active matrix color liquid crystal display device according to one Embodiment of this invention.

FIG. 40 is a plan view showing one pixel of Embodiment 18. In Embodiment 18, an electrode ST is connected to a portion of a counter electrode via a through-hole TH and is superposed on a scanning signal line, a video signal line and a thin film transistor TFT, whereby the electrode ST is formed over all areas except for a display area which includes a pixel electrode and the counter electrode.

The electrode ST of Embodiment 18 has the advantage of nearly completely solving contamination spots due to protective-film defects over the pixel electrodes as well as contamination spots due to protective-film defects over the counter electrodes and the counter voltage signal lines, because the electrode ST is at the same potential as the counter electrodes. In addition, even if foreign matter lies on the thin film transistors TFT, the video signal lines DL and the scanning signal lines GL and the insulating film GI and the protective film PSV1 have defects, the electrode ST has the advantage of preventing or restraining the occurrence of contamination spots.

As described above, Embodiment 18 can obtain the advantage of Embodiment 16. In addition, it is preferable to use an organic protective film such as acrylic resin or polyimide to reduce the capacitance between each line and the electrode ST, because the degradation of the signal waveforms of a scanning signal and a video signal can be reduced.

Embodiment 19

Embodiment 19 is the same as Embodiments 1 and 4 except for the following points.

Figure 41:
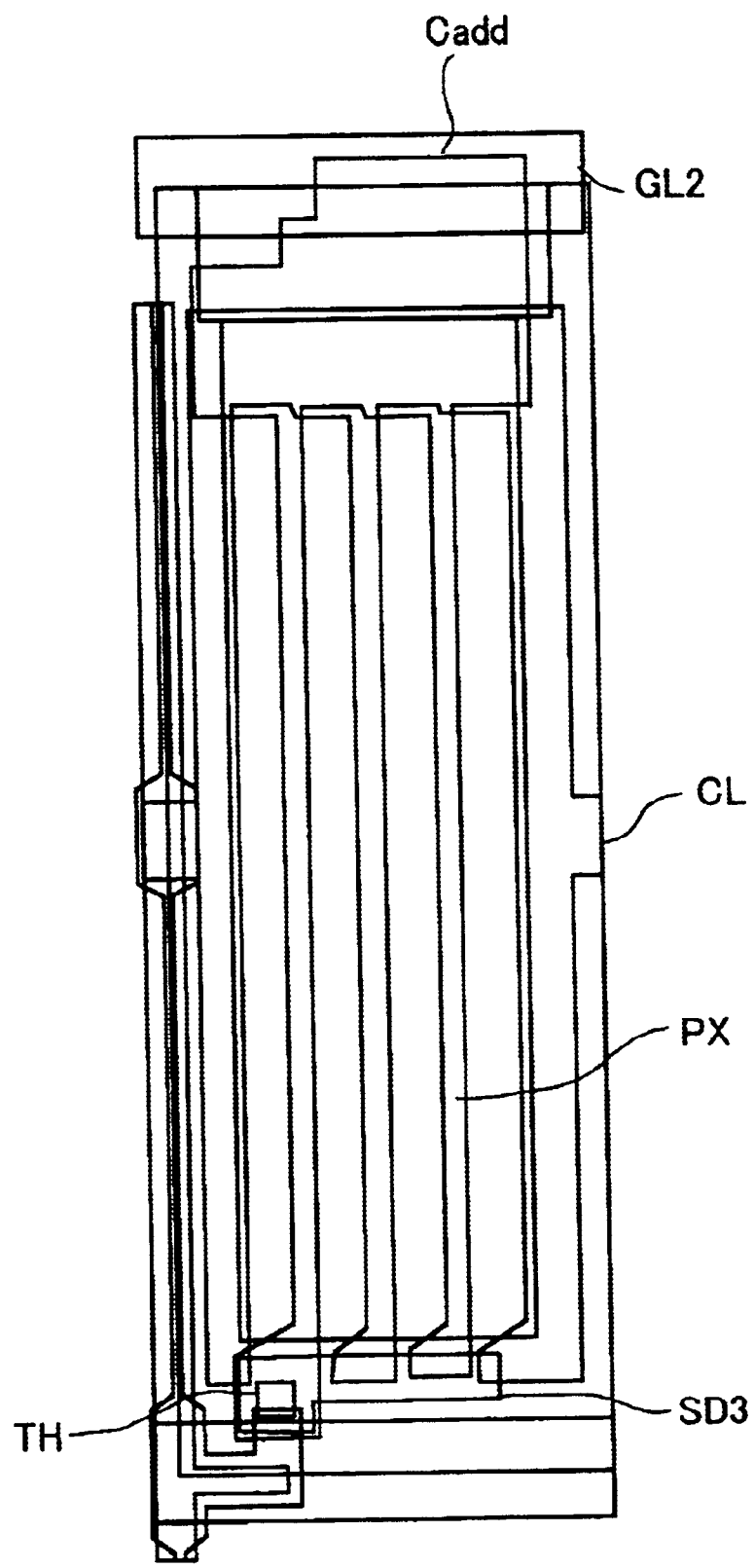
FIG. 41 is a plan view showing one pixel of a liquid crystal display part of an active matrix color liquid crystal display device according to one Embodiment of this invention.

FIG. 41 is a plan view showing one pixel of Embodiment 19. In Embodiment 19, an electrode ST is connected to a portion of a source electrode via a through-hole TH and is also used as a pixel electrode. In Embodiment 19, since the electrode ST is formed of a transparent conductive film ITO, the light transmitted through the electrode portion contributes to an improvement in optical transmissivity. In addition, since the liquid crystal in the display area is driven by the electrode ST lying in the uppermost layer, the amount of splitting of voltage in a protective film is small, whereby a maximum optical transmissivity can be obtained with a low voltage. In other words, the liquid crystal can be driven by a low voltage. The electrode ST of Embodiment 19 is at the same potential as the pixel electrode and therefore has the advantage of nearly completely solving contamination spots due to protective-film defects over the pixel electrodes as well as contamination spots due to protective-film defects over the counter electrodes and the counter voltage signal lines.

As described above, Embodiment 19 can obtain, in addition to the advantage of Embodiment 4, the advantages of an improvement in optical transmissivity and a lowering in voltage.

An electrode SD3 is a shield electrode for preventing the influence of an electric field from a scanning signal line from entering the display area, and the counter voltage signal line is disposed adjacent to the scanning signal line to prevent the influence of the electric field from the scanning signal line from entering the display area. According to this construction, it is possible to obtain the advantage of solving display defects, such as flickers and image retention, during an initial turn-on period.

However, unlike other embodiments, image retention worsens to a small extent because the phenomenon of a reduction in DC by a protective film becomes small.

Embodiment 20

Embodiment 20 is the same as Embodiments 1 and 5 for the following points.

In Embodiment 20, an electrode ST is connected to a portion of a counter voltage signal line CL via a through-hole TH and is also used as a counter electrode. In Embodiment 20, since the electrode ST is formed of a transparent conductive film ITO, the light transmitted through the electrode portion contributes to an improvement in optical transmissivity. In addition, since the liquid crystal in the display area is driven by the electrode ST lying in the uppermost layer, the amount of splitting of voltage in a protective film is small, whereby a maximum optical transmissivity can be obtained with a low voltage. In other words, the liquid crystal can be driven by a low voltage. The electrode ST of Embodiment 20 is at the same potential as the counter electrode and therefore has the advantage of nearly completely solving contamination spots due to protective-film defects over the pixel electrodes as well as contamination spots due to protective-film defects over the counter electrodes and the counter voltage signal lines.

As described above, Embodiment 20 can obtain, in addition to the advantage of Embodiment 5, the advantages of an improvement in optical transmissivity and a lowering in voltage.

However, unlike other embodiments, image retention worsens to a small extent because the phenomenon of a reduction in DC by a protective film becomes small.

Embodiment 21

Embodiment 21 is the same as Embodiments 1 and 20 for the following points.

In Embodiment 21, one electrode ST is connected to a portion of a counter voltage signal line CL via a through-hole TH and is also used as a counter electrode, while the other electrode ST is connected to a portion of a source electrode via another through-hole TH and is also used as a pixel electrode. In Embodiment 21, since each of the electrodes ST is formed of a transparent conductive film ITO, the light transmitted through the electrode portion contributes to an improvement in optical transmissivity. In addition, since the liquid crystal in the display area is driven by the electrode ST lying in the uppermost layer, the amount of splitting of voltage in a protective film is small, whereby a maximum optical transmissivity can be obtained with a low voltage. In other words, the liquid crystal can be driven by a low voltage.

The electrode ST of Embodiment 20 is at the same potential as the counter electrode and therefore has the advantage of nearly completely solving contamination spots due to protective-film defects over the pixel electrodes as well as contamination spots due to protective-film defects over the counter electrodes and the counter voltage signal lines.

As described above, Embodiment 21 can obtain, in addition to the advantage of Embodiment 20, the advantages of an improvement in optical transmissivity and a lowering in voltage. However, unlike other embodiments, image retention worsens to a great extent because there is no phenomenon of a reduction in DC by a protective film.

Embodiment 22

Embodiment 22 is the same as Embodiment 1 except for the following points.

Figure 42:
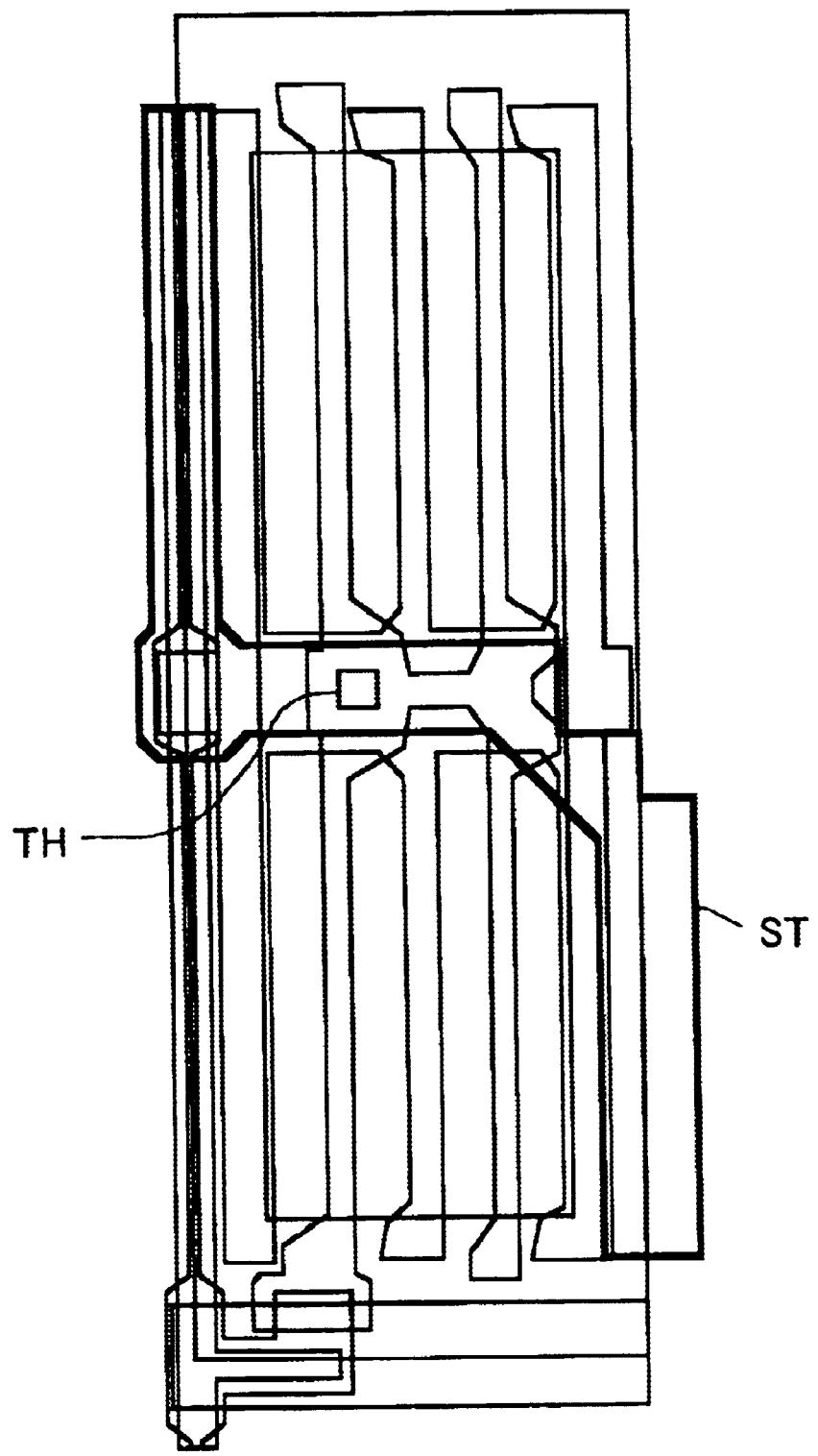
FIG. 42 is a plan view showing one pixel of a liquid crystal display part of an active matrix color liquid crystal display device according to one Embodiment of this invention.

FIG. 42 is a plan view showing one pixel of Embodiment 22. In Embodiment 22, an electrode ST is connected to a portion of a pixel electrode via a through-hole TH and is superposed in part on the video signal line of its own column and in part on the video signal line of the next (adjacent) column. Similarly to the electrode ST of Embodiment 1, the electrode ST of Embodiment 22 is at the same potential as the pixel electrode and therefore has the advantage of nearly completely solving contamination spots due to protective-film defects over the pixel electrodes as well as contamination spots due to protective-film defects over the counter electrodes and the counter voltage signal lines. In addition, even if foreign matter lies on the video signal line DL and the protective film PSV1 have defects, the electrode ST of Embodiment 42 has the advantage of preventing or restraining the occurrence of contamination spots.

In Embodiment 22, since the video signal lines are covered with the electrodes connected to the pixel electrodes, even if a pixel electrode and a video signal line are short-circuited by foreign matter, the resultant defect is restricted to a dot defect, whereby no reduction in yield is incurred.

In Embodiment 13, a vertical smear occurs due to a variation in electrode potential due to the capacitive coupling of the electrode ST and the video signal line. However, in Embodiment 22, the electrode ST is superposed on two adjacent video signal lines (video signal lines) DL in a zigzag manner, and if a driving method, such as column inversion driving or dot inversion driving, in which the polarity of a signal to be applied is inverted every column is used, a variation in electrode potential due to the capacitive coupling of the electrode ST and one of the video signal lines compensates for a variation in electrode potential due to the capacitive coupling of the electrode ST and the other, whereby the potential of the electrode ST hardly varies. Accordingly, it is possible to restrain the phenomenon that vertical stripes appear as the result of such a capacitive coupling (vertical smear, crosstalk).

Embodiment 16 has, in addition to the advantage of Embodiment 1, the advantage that it is possible to greatly reduce contamination spots due to protective-film defects on the scanning signal lines (drain lines) GL. In addition, Embodiment 16 has the advantage of solving vertical crosstalk.

Embodiment 23

Embodiment 23 is the same as Embodiment 1 except for the following points.

Figure 43:
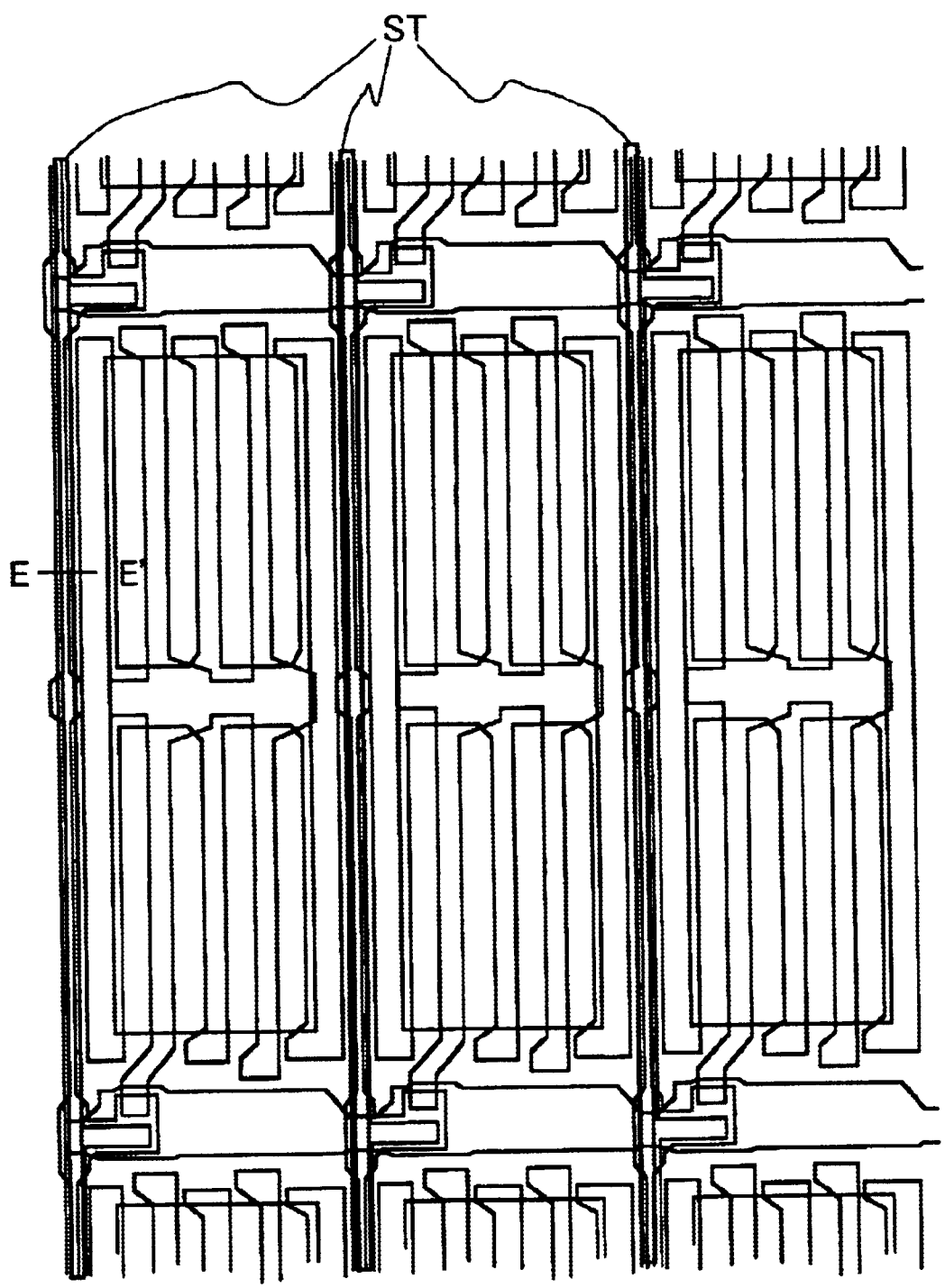
FIG. 43 is a plan view showing one pixel of a liquid crystal display part of an active matrix color liquid crystal display device according to one Embodiment of this invention.
Figure 44:
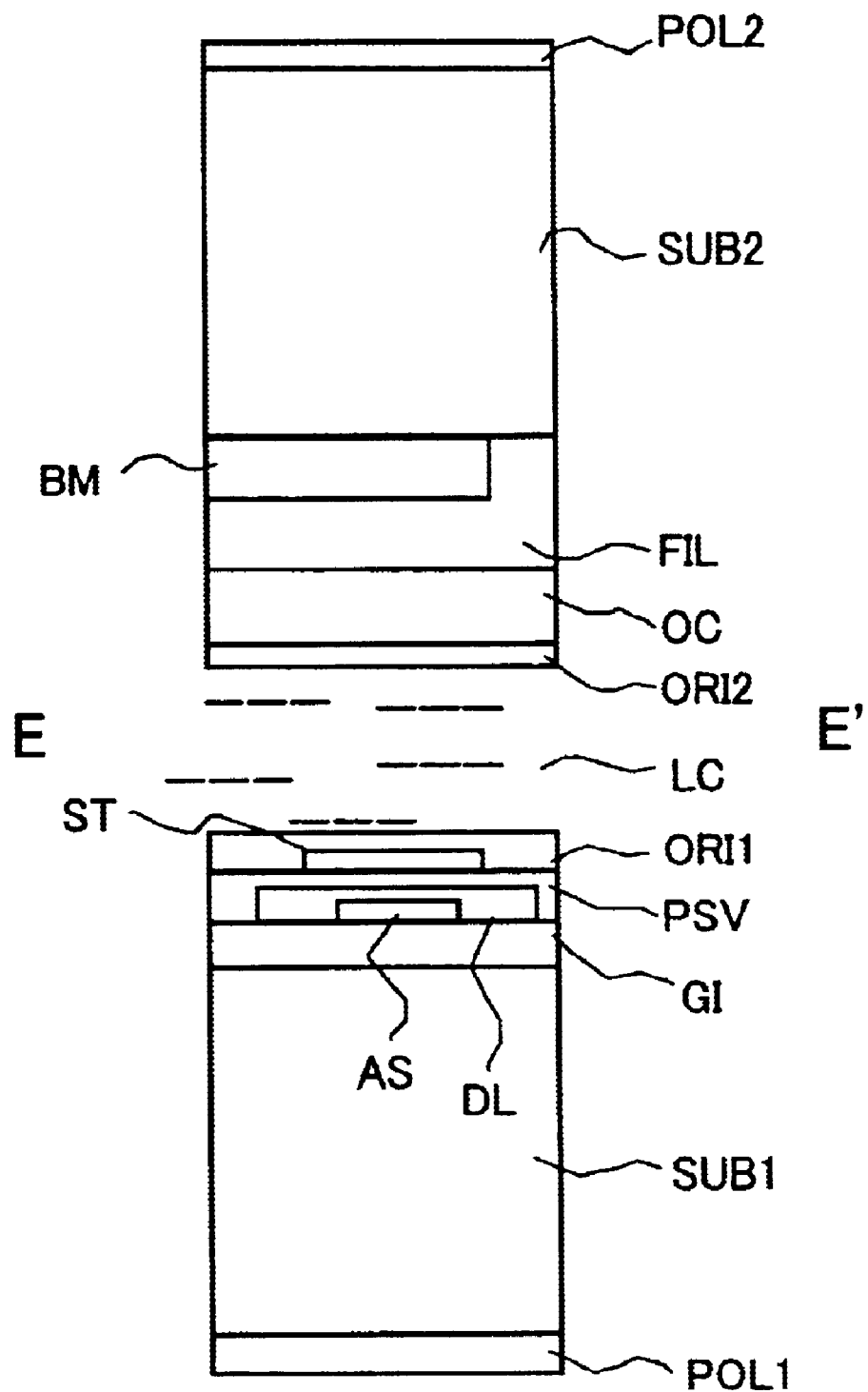
FIG. 44 is a cross-sectional view of an electrode ST portion taken along cutting line E–E' of FIG. 43.
Figure 45:
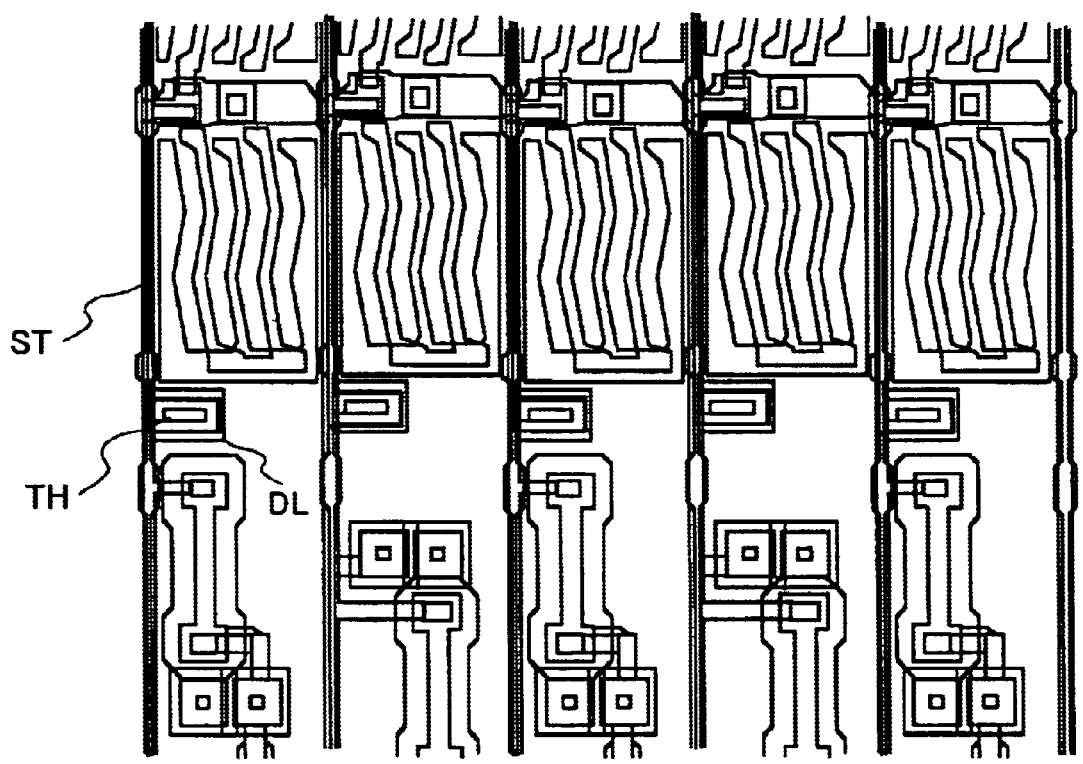
FIG. 45 is a plan view showing the portions of connections between electrodes ST and video signal lines DL that lie near the lower side of the liquid crystal display part (outside the effective display areas) of an active matrix color liquid crystal display device according to one Embodiment of this invention.

FIG. 43 is a plan view showing one pixel of Embodiment 23 and its surrounding portion, and FIG. 44 is a cross-sectional view taken along cutting line E–E' of FIG. 43. FIG. 45 shows the portion of connection between each electrode ST and the corresponding video signal line DL that lies near the lower side of FIG. 7 (outside the effective display areas). In Embodiment 23, each electrode ST is connected to a portion of the corresponding video signal line via a through-hole TH in a portion outside the effective display area, and as shown in FIGS. 43 and 44, the electrode ST is disposed over the video signal line in the form of a line which extends vertically along the video signal line. The connection portions shown in FIG. 45 are disposed along the video signal lines outside the effective display areas. Accordingly, even if the video signal lines DL is disconnected at one location, the disconnected video signal line is held in an electrically connected state by the corresponding one of the electrodes ST. In other words, Embodiment 23 serves as a redundant structure for disconnections of the video signal lines.

As in the case of Embodiment 3, the video signal lines have a highest potential in terms of a DC component, as compared with the other electrodes and lines. Therefore, an oxidation reaction on a positive side is completely restrained, and it is possible to prevent disconnection from occurring from the melting of an electrode due to the oxidation reaction. However, at an intersection of a scanning signal line and a counter voltage signal line, a disconnection occurs in either of the lines which climbs over the other, owing to a step of the intersection. Embodiment 23 also has an effect on this disconnection, and can nearly completely solve disconnections of the video signal lines.

As described above, Embodiment 23 has, in addition to the advantage of Embodiment 3, the advantage of improving yield.

Embodiment 24

Embodiment 24 is the same as Embodiment 1 except for the following points.

Figure 46:
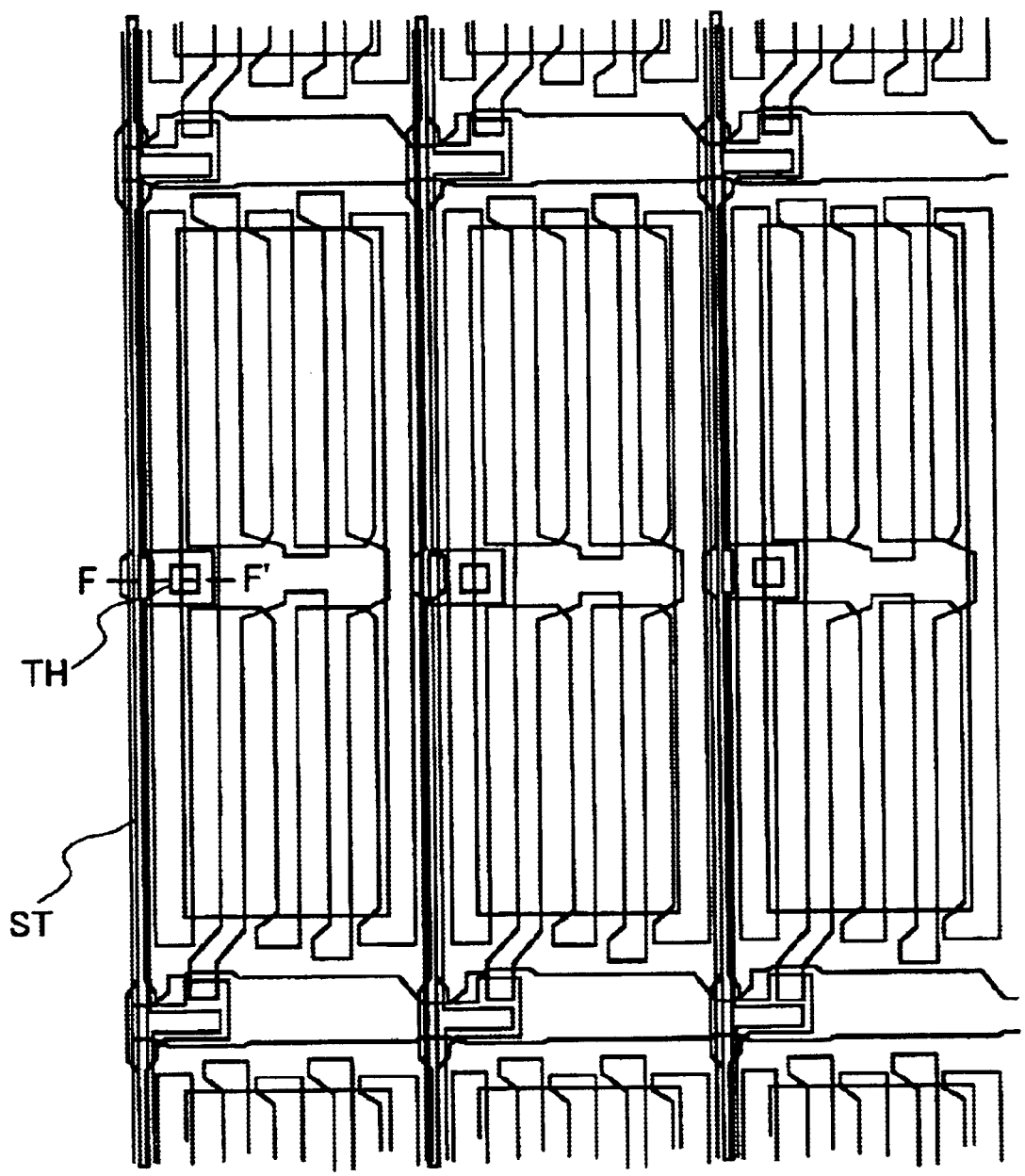
FIG. 46 is a plan view showing one pixel of a liquid crystal display part of an active matrix color liquid crystal display device according to one Embodiment of this invention.
Figure 47:
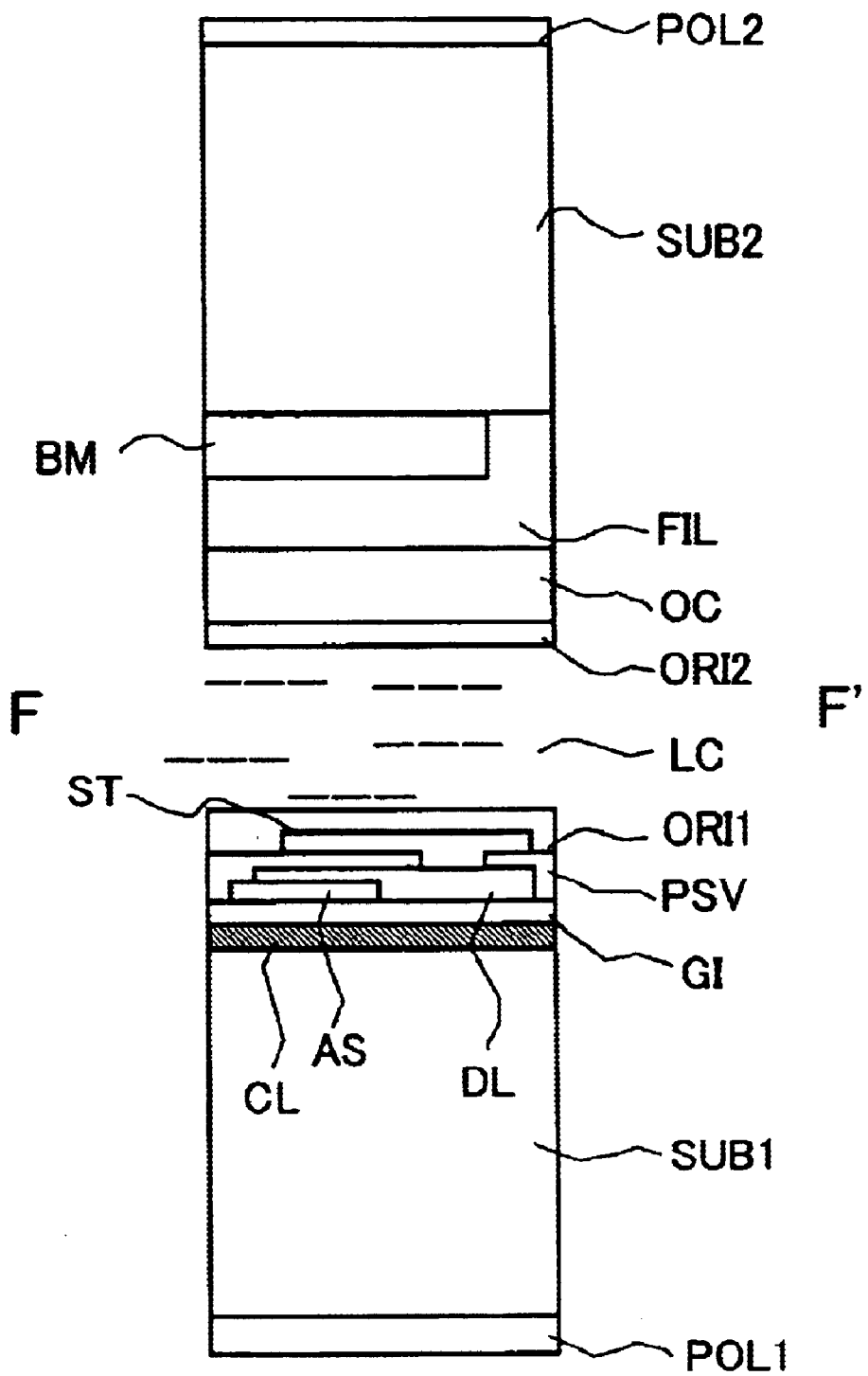
FIG. 47 is a cross-sectional view of an electrode ST portion taken along cutting line F–F' of FIG. 46.

FIG. 46 is a plan view showing one pixel of Embodiment 24 and its surrounding portion, and FIG. 47 is a cross-sectional view taken along cutting line F–F' of FIG. 46. In Embodiment 24, each electrode ST is connected to a portion of the corresponding video signal line via a through-hole TH in a portion inside the effective display area, and as shown in FIG. 46, the electrode ST is disposed over the video signal line in the form of a line which extends vertically along the video signal line. Owing to this construction, so long as a video signal line DL is not disconnected at two or more locations in one pixel, even if a video signal line is disconnected at plural locations, the disconnected video signal line is held in an electrically connected state by the corresponding one of the electrodes ST. In other words, Embodiment 24 serves as a redundant structure for disconnections of the video signal lines.

As in the case of Embodiment 3, the video signal lines have a highest potential in terms of a DC component, as compared with the other electrodes and lines. Therefore, an oxidation reaction on a positive side is completely restrained, and it is possible to prevent disconnection from occurring from the melting of an electrode due to the oxidation reaction. However, at an intersection of a scanning signal line and a counter voltage signal line, a disconnection occurs in either of the lines which climbs over the other, owing to a step of the intersection. Embodiment 24 also has an effect on this disconnection, and can nearly completely solve disconnections of the video signal lines.

As described above, Embodiment 24 has, in addition to the advantage of Embodiment 3, the advantage of improving yield.

Embodiment 25

Embodiment 25 is the same as Embodiment 1 except for the following points.

Figure 48:
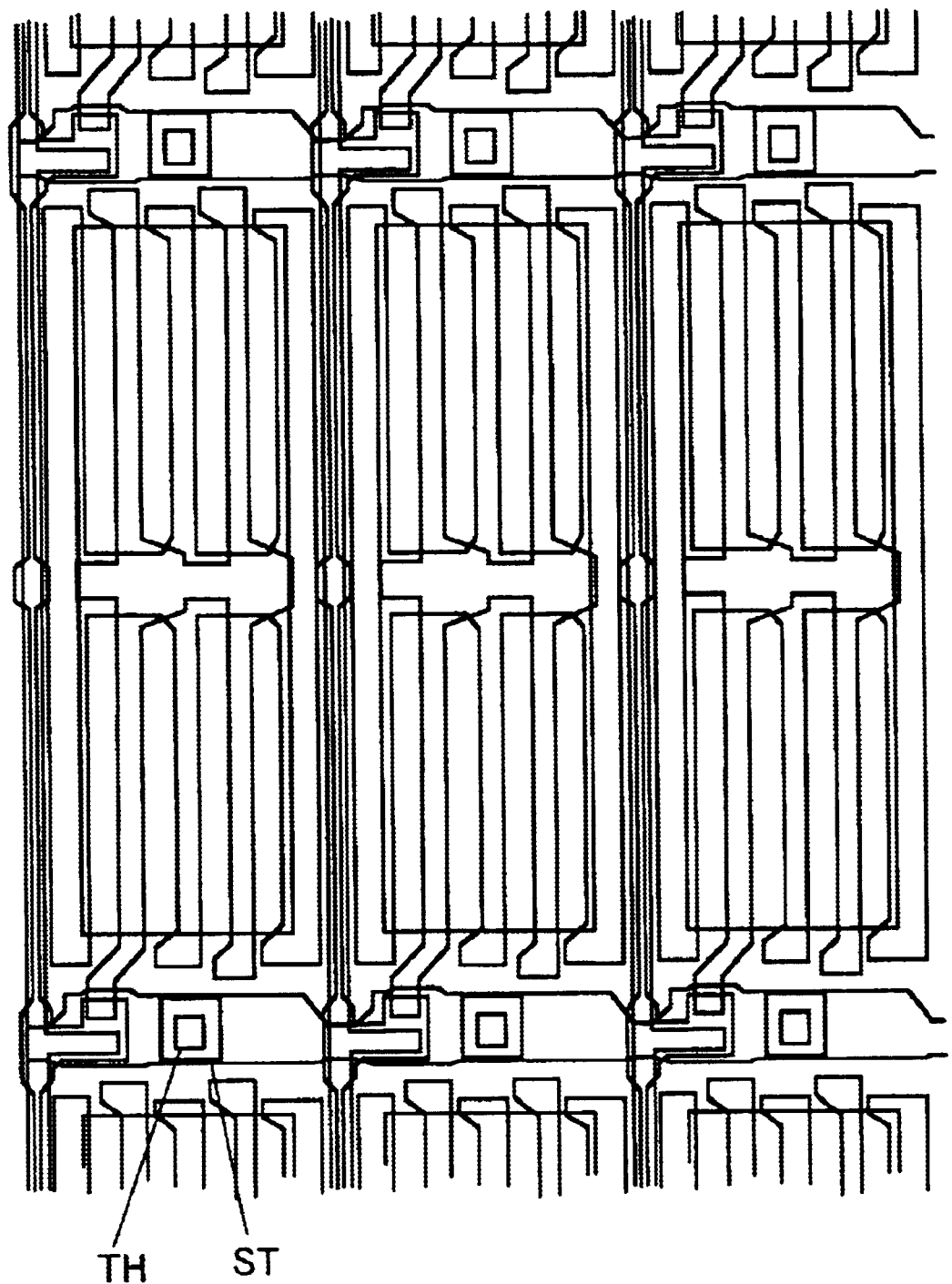
FIG. 48 is a plan view showing one pixel of a liquid crystal display part of an active matrix color liquid crystal display device according to one Embodiment of this invention.

FIG. 48 is a plan view showing one pixel of Embodiment 25. In Embodiment 25, each electrode ST is connected to a portion of the corresponding scanning signal line via a through-hole TH.

The scanning signal lines have a lowest potential in terms of a DC component, as compared with the other electrodes and lines. Therefore, an oxidation reaction on a negative side is completely restrained, and it is possible to solve decomposition of the liquid crystal due to the oxidation reaction.

As described above, in Embodiment 25, since the scanning signal lines are at approximately the same potential as the electrodes ST (in the case of AC voltages, at approximately the same potential in terms of their DC components), there is the advantage that contamination spots due to protective-film defects over the scanning signal lines GL can be approximately completely solved. Moreover, as in Embodiment 1, it is possible to restrain the flow of ionic impurities and hence the occurrence of indefinite black irregularities. Similarly, owing to the same effect, it is possible to greatly reduce image retention (image persistence) which is the phenomenon that the edge of a fixed pattern becomes black when the fixed pattern is displayed for a long time. In particular, unlike the pixel electrodes, the video signal lines are not supplied with voltages via switching elements and are consistently supplied with sufficient voltages from the outside, so that the charging of the protective-film capacitance of each pixel which causes a contamination spot becomes fully fast. Accordingly, it is possible to greatly reduce the duration of time of the state of defective display such as a reduced contrast ratio and the occurrence of flickers during an initial turn-on period or other periods during which charging from the electrode ST is in an insufficient state.

Embodiment 26

Embodiment 26 is the same as Embodiment 1 except for the following points.

Figure 49:
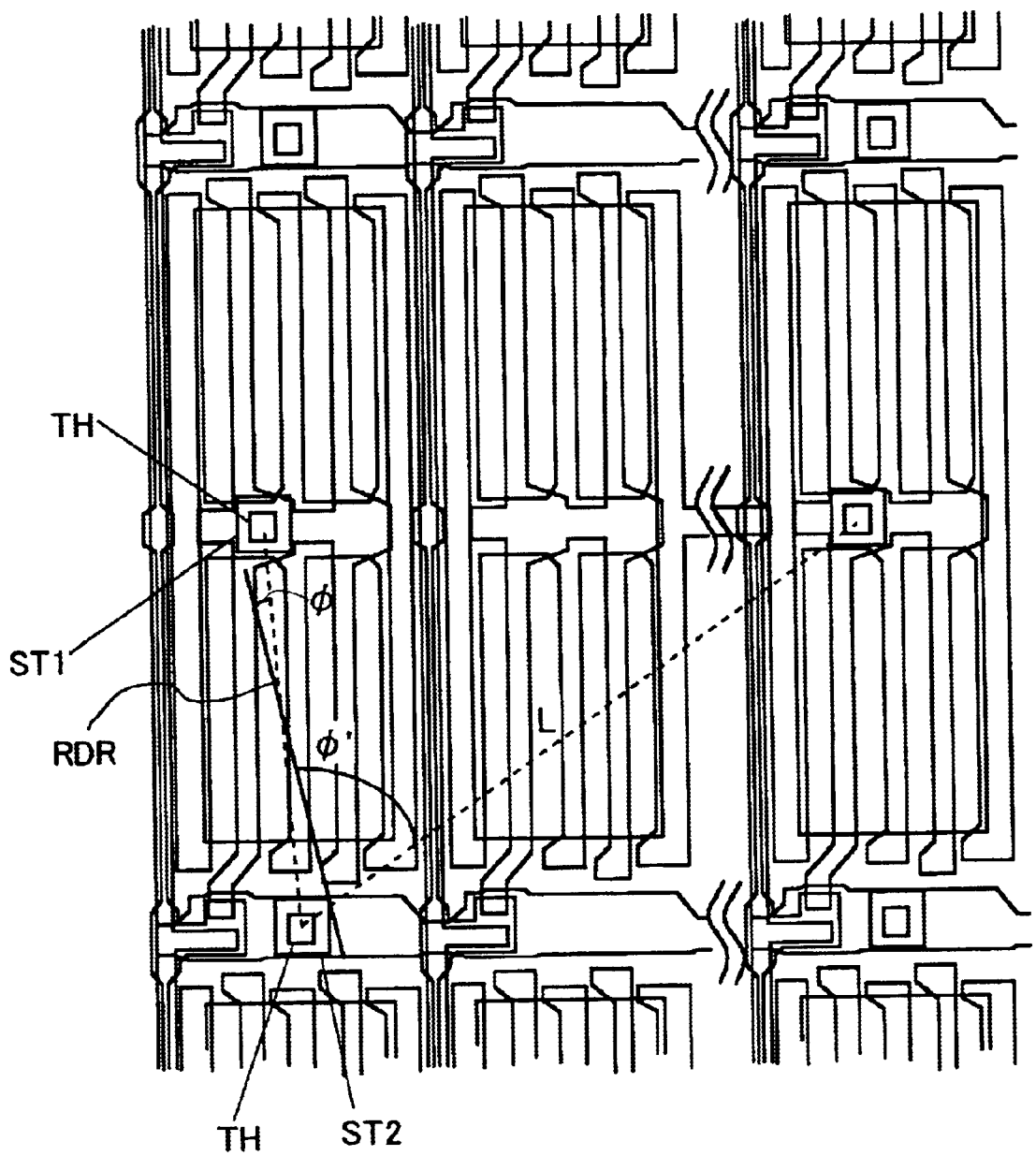
FIG. 49 is a plan view showing one pixel of a liquid crystal display part of an active matrix color liquid crystal display device according to one Embodiment of this invention.

FIG. 49 is a plan view showing one pixel of Embodiment 26. In Embodiment 26, an electrode ST1 is connected to a portion of a pixel electrode via a through-hole TH, and an electrode ST2 is connected to a portion of a scanning signal line via another through-hole TH. An electrode on a positive side and an electrode on a negative side are both formed over a protective film, whereby charging of voltage on the positive side and charging of voltage on the negative side are performed at the same time and even if an electrode is exposed in another portion owing to a protective-film defect, almost no charge current is generated from that portion. Accordingly, no electrode reaction occurs on the positive side nor the negative side, whereby no contamination spot occurs. However, in Embodiment 26, the potential of a DC component of a video signal line is higher than the potential of a DC component of the pixel electrode, and if a protective-film defect lies on the video signal line, an oxidation reaction on the positive side occurs and a contamination spot occurs. However, the difference between the potential of the DC component of the pixel electrode and the potential of the DC component of the video signal line can be nearly completely restrained by the method described previously in connection with Embodiment 10 or 12. Accordingly, even if a protective-film defect lies on any electrode, occurrence of a contamination spot can be prevented by combining Embodiment 26 with the method of Embodiment 10 or 12.

In this construction, it is necessary to pay attention to the arrangement of the electrode ST1 and electrode ST2. Both the electrode ST1 and the electrode ST2 lie over the protective film, and a DC voltage due to the potential of a DC component of the pixel electrode and a non-selection voltage of a scanning signal is nearly consistently applied to the electrode ST1 and the electrode ST2. Accordingly, the liquid crystal is driven by this DC voltage, so that light leak occurs and black display becomes insufficient, i.e., a lowering in contrast ratio occurs.

In Embodiment 26, a straight line which connects the center of the electrode ST1 and the center of the electrode ST2 is made approximately coincident with a rubbing direction RDR. Specifically, an angle $\phi$ made by a rubbing angle and the straight line which connects the center of the electrode ST1 and the center of the electrode ST2 is set to be within ±20°, accurately ±20.5°. The rotational angle of the liquid crystal which is driven between the electrode ST1 and the electrode ST2 is set to be within ±10°, accurately ±10.5°, in order to hold a contrast ratio of 30 or more, and if the angle made by an electric field and the longer axes of the liquid crystal molecules becomes 10° or more, the liquid crystal rotates to a greater extent and needs excessively large energy, and does not rotate with a DC current of 20 V or less. Accordingly, the angle $\phi$ is selected to be equivalent to the sum of the values of these angles. However, it is preferable to set the angle $\phi$ to be within ±15°, accurately ±15.7° so that a contrast ratio of 100 can be held. In addition, the angle $\phi$ made by the rubbing angle and the straight line which connects the electrode ST2 and the electrode ST1 and an angle $\phi'$ made by the rubbing angle and another electrode ST1 other than the electrode ST1 closest to the electrode ST2 are not within the above-described range, a distance L is set to be fully longer than the distance between the pixel electrode and the counter electrode. Specifically, an electric field due to a DC component between the electrode ST1 and the electrode ST2 is set to be smaller than or equal to the optical threshold electric field of the liquid crystal driven by a voltage between the pixel electrode and the counter electrode.

Incidentally, in Embodiment 26, the angles made by the rubbing direction and the straight lines which connect the centers of the electrodes ST are defined, but if the shape of each of the electrodes ST is elongated or round or not quadrangular, the above construction may also be applied to the angle made by the rubbing direction and a straight line which connects the edges of the electrodes ST.

As described above, in Embodiment 26, the electrode ST1 connected to the scanning signal line and the electrode ST2 connected to the pixel electrode are both formed on the protective film, whereby it is possible to obtain the advantage of nearly completely solving contamination spots due to protective-film defects over the pixel electrodes PX, PX2 and PX3 and the source electrodes SD1, contamination spots due to protective-film defects over the counter electrodes CT and CT2 and the counter voltage signal lines CL, and contamination spots due to protective-film defects over the scanning signal lines GL, because all the electrodes and lines are at approximately the same potential as the electrodes ST1 and ST2 (in the case of AC voltages, at approximately the same potential in terms of their DC components). In addition, by combining Embodiment 26 with either or both of Embodiments 10 or 12, it is possible to completely solve contamination spots over the video signal lines DL.

Embodiment 27

Embodiment 27 is the same as Embodiments 1 and 26 except for the following points.

Figure 50:
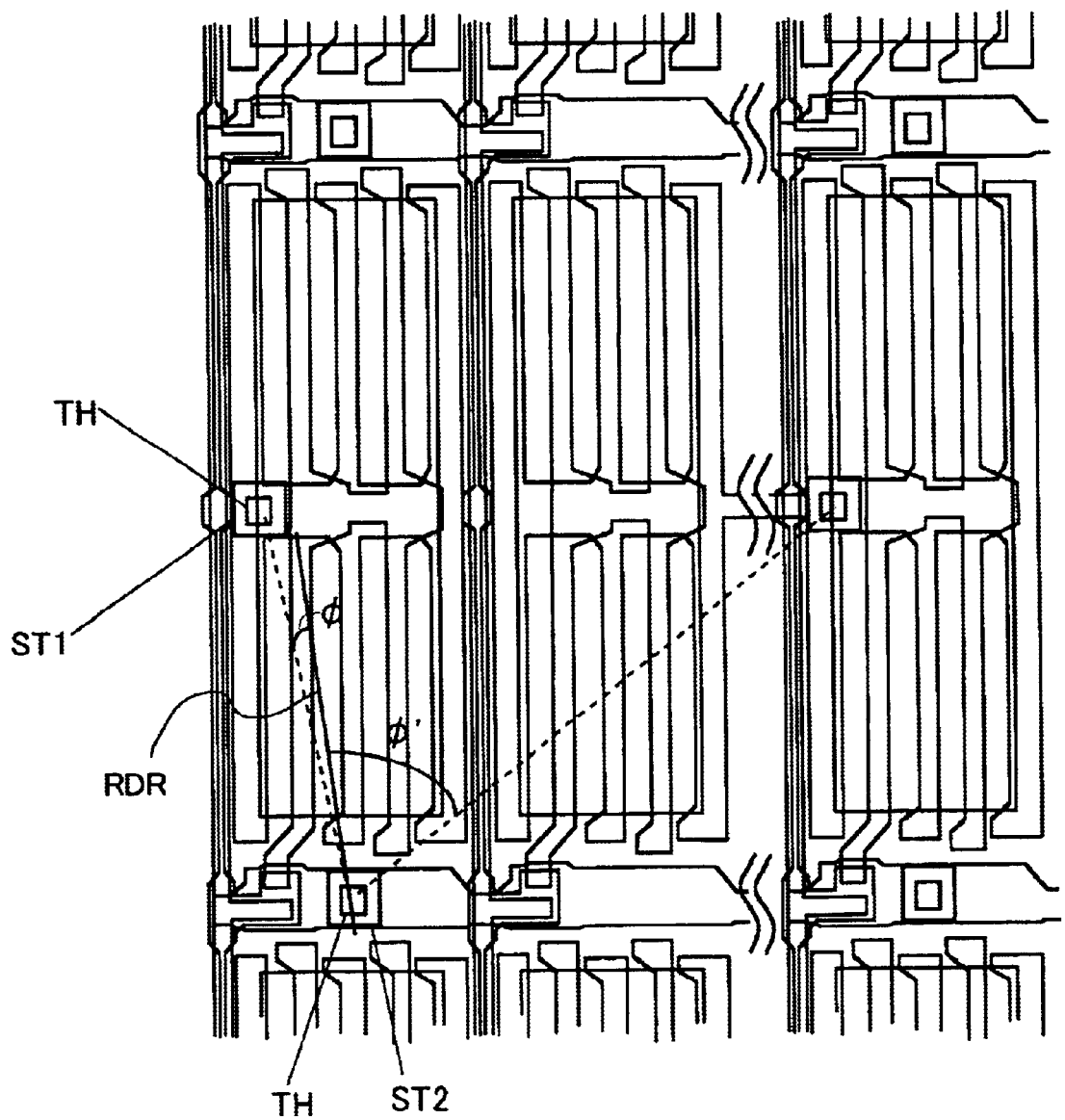
FIG. 50 is a plan view showing one pixel of a liquid crystal display part of an active matrix color liquid crystal display device according to one Embodiment of this invention.

FIG. 50 is a plan view showing one pixel of Embodiment 27. In Embodiment 27, an electrode ST1 is connected to a portion of a counter voltage signal line via a through-hole TH, and an electrode ST2 is connected to a portion of a scanning signal line via another through-hole TH.

In Embodiment 27, the electrode ST1 connected to the counter voltage signal line CL and the electrode ST2 connected to the scanning signal line are both formed on the protective film, whereby it is possible to obtain the advantage of nearly completely solving contamination spots due to protective-film defects over the pixel electrodes PX, PX2 and PX3 and the source electrodes SD1, contamination spots due to protective-film defects over the counter electrodes CT and CT2 and the counter voltage signal lines CL, and contamination spots due to protective-film defects over the scanning signal lines GL, because all the electrodes and lines are at approximately the same potential as the electrodes ST1 and ST2 (in the case of AC voltages, at approximately the same potential in terms of their DC components). In addition, by combining Embodiment 27 with either or both of Embodiments 10 or 12, it is possible to completely solve contamination spots over the video signal lines DL.

Embodiment 28

Embodiment 28 is the same as Embodiments 1 and 26 except for the following points.

Figure 51:
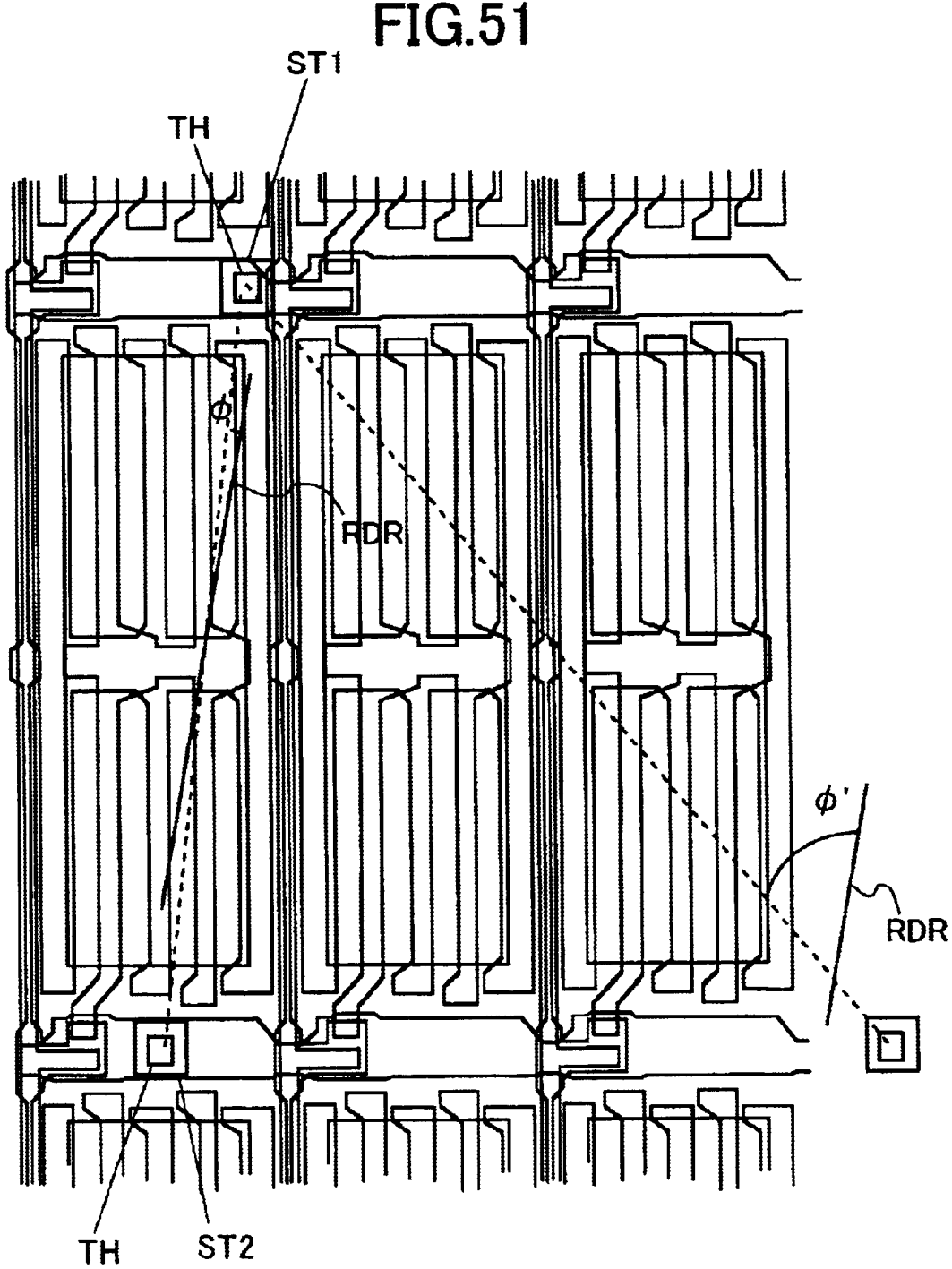
FIG. 51 is a plan view showing one pixel of a liquid crystal display part of an active matrix color liquid crystal display device according to one Embodiment of this invention.

FIG. 51 is a plan view showing one pixel of Embodiment 28. In Embodiment 28, an electrode ST1 is connected to a portion of a video electrode signal line via a through-hole TH, and an electrode ST2 is connected to a portion of a scanning signal line via another through-hole TH.

In Embodiment 28, the electrode ST1 on a negative side is connected to the scanning signal line GL which is at the lowest potential, and the electrode ST2 on a positive side is connected to the video signal line DL which is at the highest potential, whereby all the electrodes and lines are charged with positive or negative potentials, and almost no charge current occurs in an electrode having an intermediate potential. Accordingly, even if protective-film defects lie over all the electrodes and lines, no contamination spots occur.

As described above, in Embodiment 28, since the electrode ST1 connected to the scanning signal line and the electrode ST2 connected to the video signal electrode line are both formed on the protective film, even if Embodiment 28 is not combined with either of Embodiments 10 or 12, it is possible to completely solve contamination spots due to protective-film defects over the pixel electrodes PX, PX2 and PX3 and the source electrodes SD1, the counter electrodes CT and CT2, the counter electrode signal lines CL, the scanning signal lines GL, and the video signal lines DL, because some of the electrodes and lines are at approximately the same potential as the electrodes ST1 and ST2 (in the case of AC voltages, at approximately the same potential in terms of their DC components) and the others are at an intermediate potential between those of the electrodes ST1 and ST2.

Embodiment 29

Embodiment 29 is the same as Embodiment 1 except for the following points.

Figure 52:
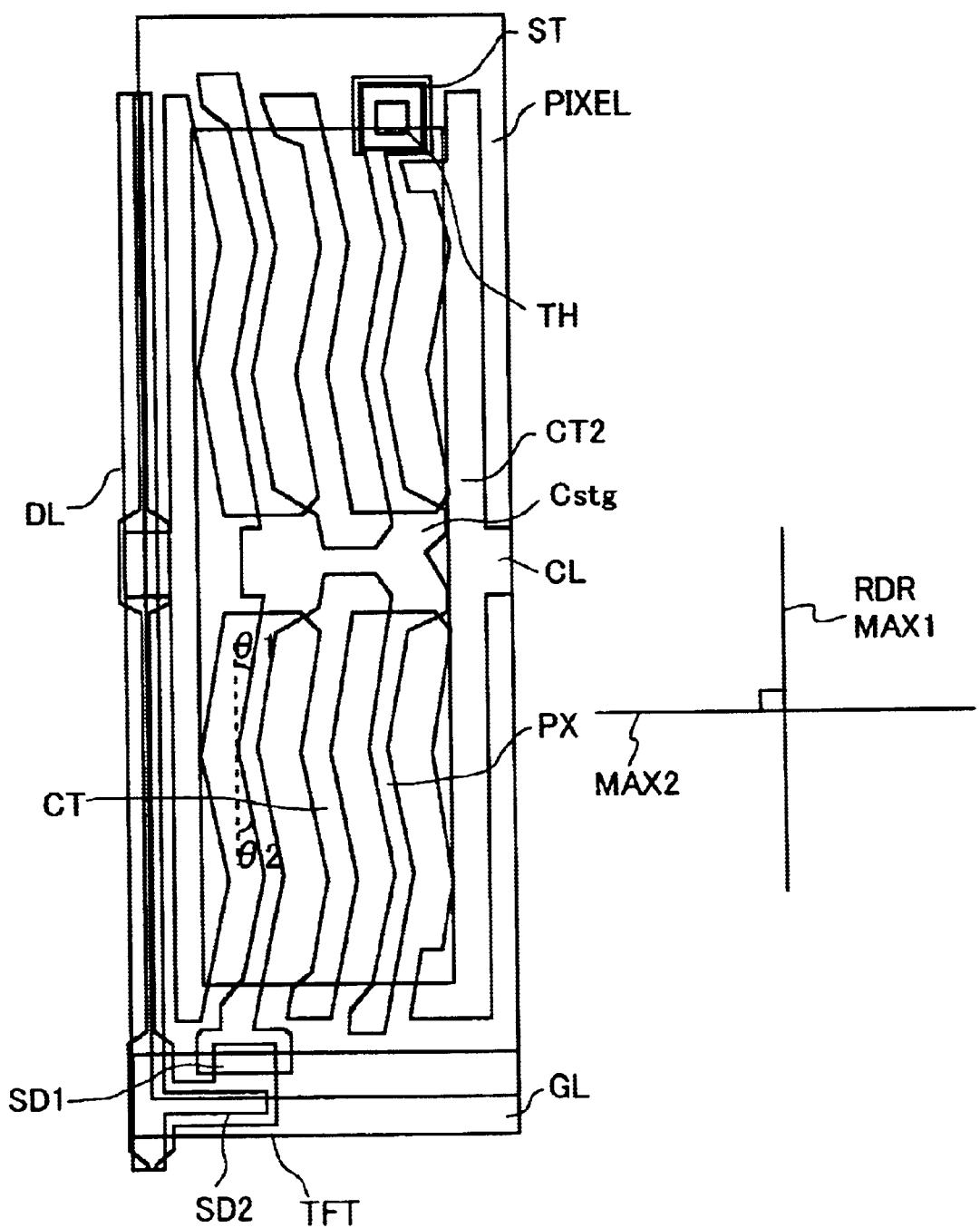
FIG. 52 is a plan view showing one pixel of a liquid crystal display part of an active matrix color liquid crystal display device according to one Embodiment of this invention.

FIG. 52 is a plan view showing one pixel of Embodiment 29. In Embodiment 29, each of the pixel electrodes PX and the counter electrodes CT and CT2 is formed in a chevron-like shape. According to this construction, liquid crystal molecules have two different rotational directions and the optical characteristics of different regions having the two different rotational directions of liquid crystal molecules compensate for each other, whereby a far wider viewing angle can be obtained. The reason for this is as follows. Owing to the difference between variations in retardation in the long-axis and short-axis directions of the liquid crystal molecules with an elevation angle being inclined, if the number of the rotational directions is only one, the retardation in one direction becomes small and the color of display becomes bluish, whereas the retardation in a direction perpendicular to the one direction becomes large and the color of display becomes yellowish. However, since Embodiment 29 has regions in each of which liquid crystal molecules rotate in the opposite direction to the rotational direction of liquid crystal molecules in an adjacent region, it is possible to solve coloring by using the complementary-color relationship between blue and yellow. At the same time, it is also possible to restrain gray-scale inversion at low gray scale levels.

In Embodiment 29, angles θ1 and θ2 of the chevron shape with respect to the rubbing direction are preferably the same, but may not be the same. The number of bends in the chevron shape is merely one example.

Embodiment 29 can obtain a far wider viewing angle in addition to the advantage of Embodiment 1.

Embodiment 30

Figure 53:
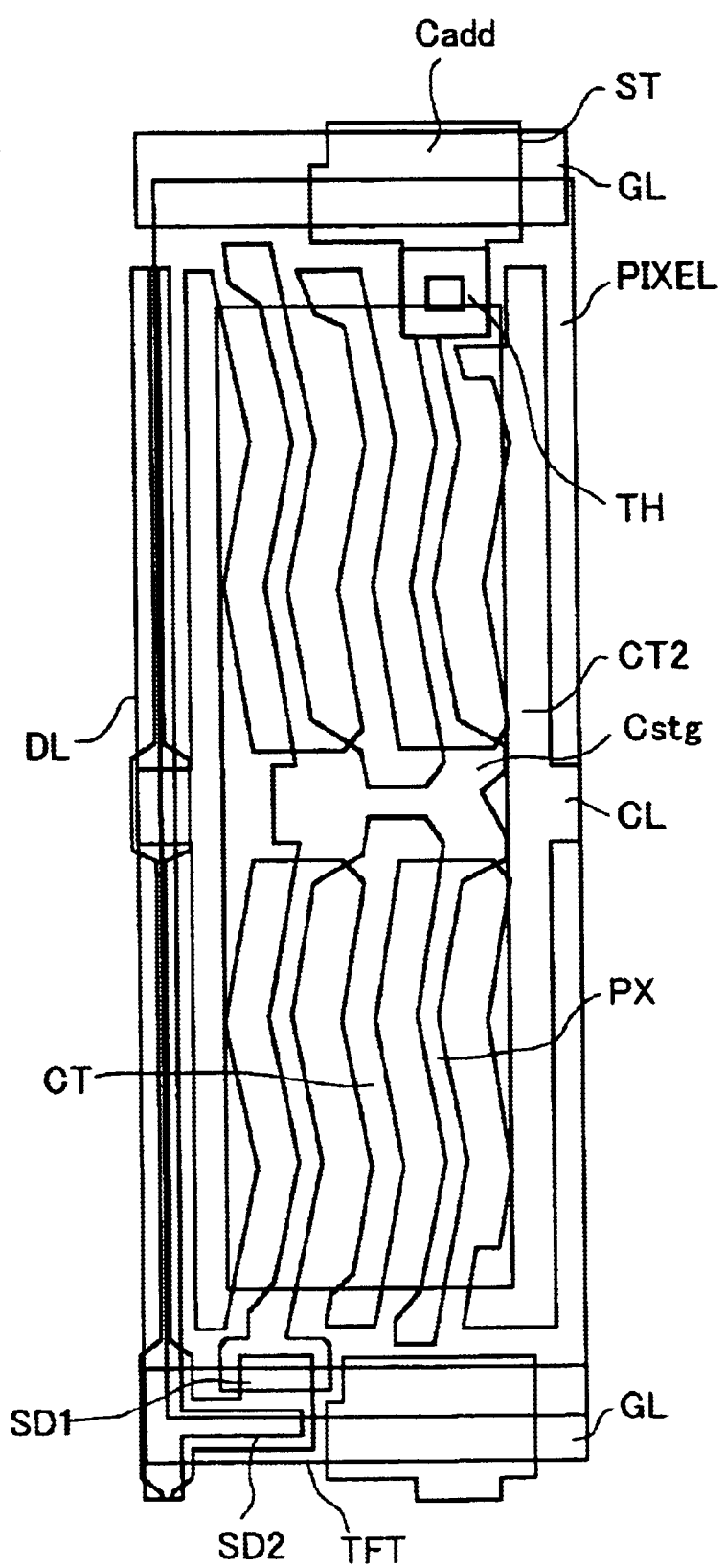
FIG. 53 is a plan view showing one pixel of a liquid crystal display part of an active matrix color liquid crystal display device according to one Embodiment of this invention.

Embodiment 30 is the same as Embodiment 4 except for the following points. FIG. 53 is a plan view showing one pixel of Embodiment 30. Embodiment 30, is a combination of Embodiment 4 and Embodiment 29.

Embodiment 31

Figure 54:
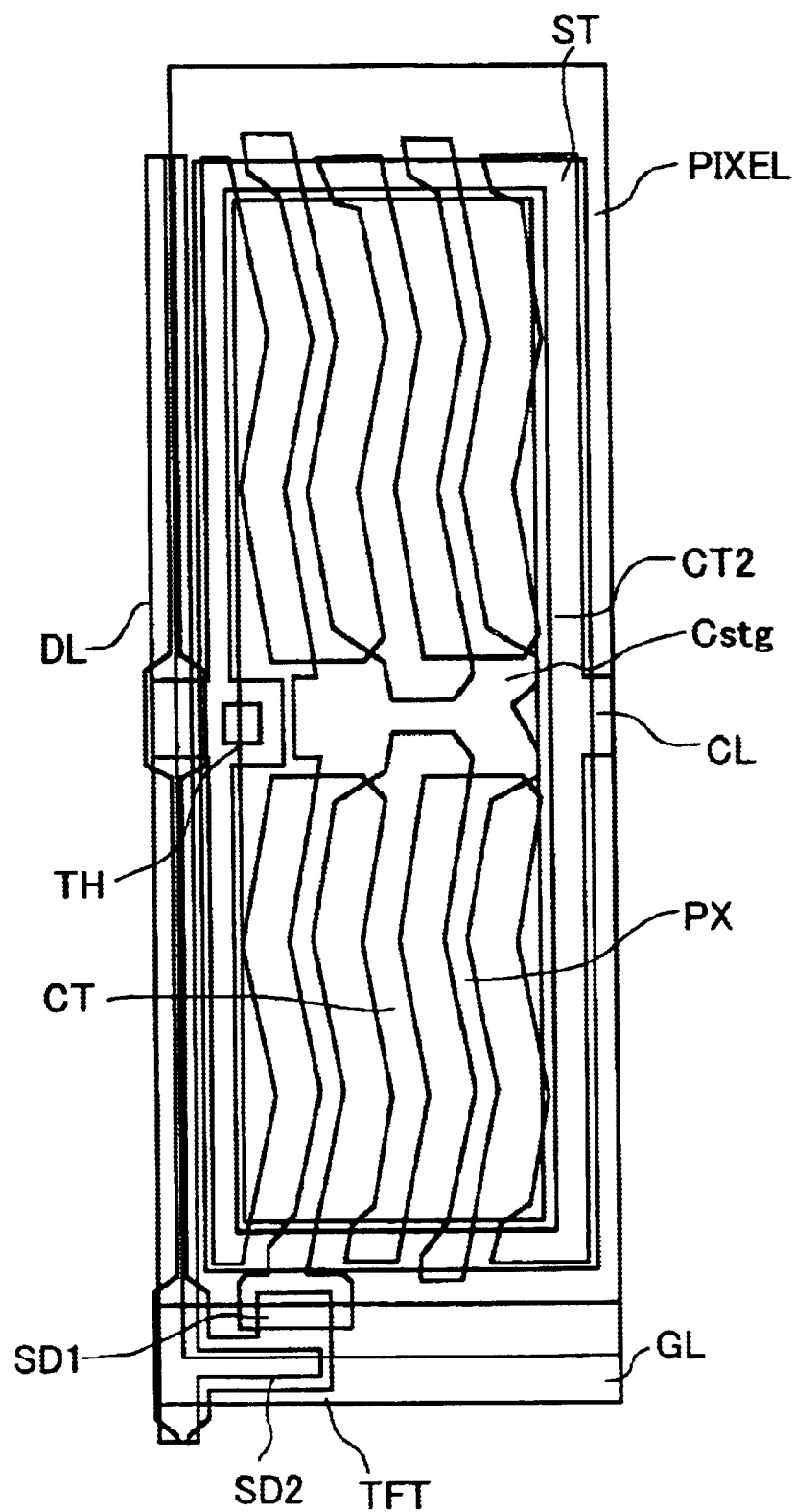
FIG. 54 is a plan view showing one pixel of a liquid crystal display part of an active matrix color liquid crystal display device according to one Embodiment of this invention.

Embodiment 31 is the same as Embodiment 18 except for the following points. FIG. 54 is a plan view showing one pixel of Embodiment 31. Embodiment 31 is a combination of Embodiment 18 and Embodiment 29.

Embodiment 32

Figure 55:
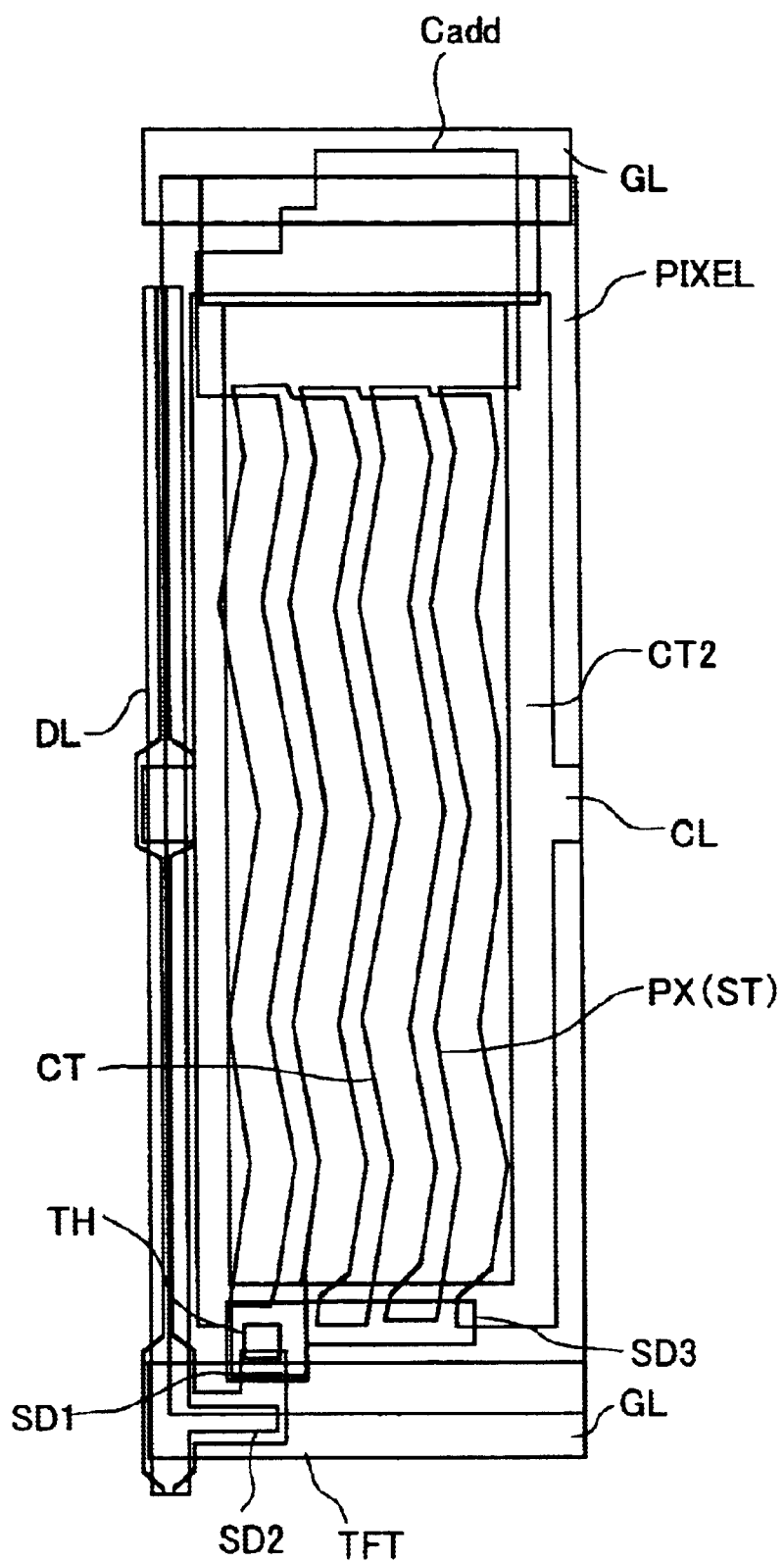
FIG. 55 is a plan view showing one pixel of a liquid crystal display part of an active matrix color liquid crystal display device according to one Embodiment of this invention.

Embodiment 32 is the same as Embodiment 19 except for the following points. FIG. 55 is a plan view showing one pixel of Embodiment 32. Embodiment 32 is a combination of Embodiment 19 and Embodiment 29.

Embodiment 33

Figure 56:
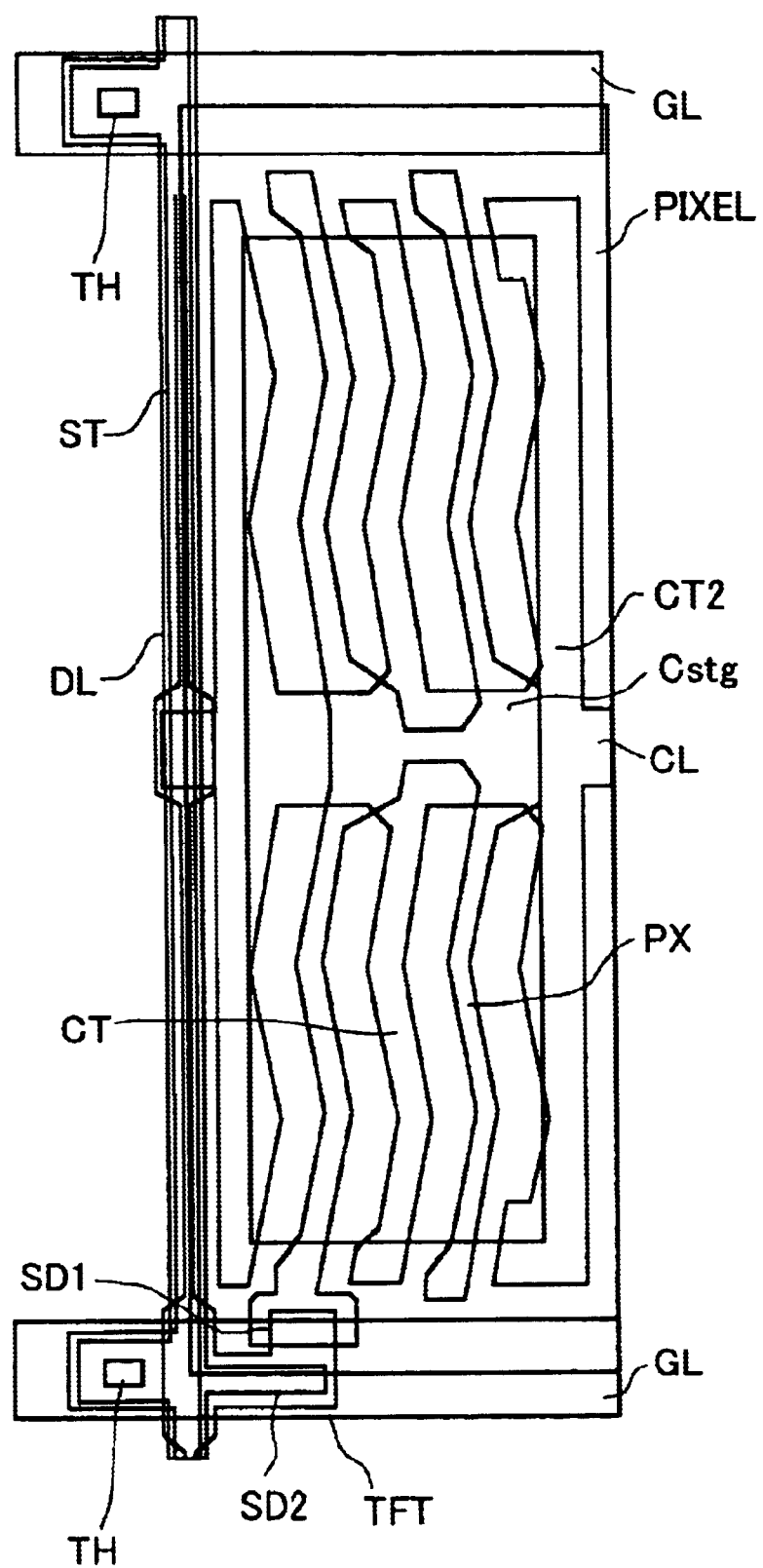
FIG. 56 is a plan view showing one pixel of a liquid crystal display part of an active matrix color liquid crystal display device according to one Embodiment of this invention.

Embodiment 33 is the same as Embodiment 24 except for the following points. FIG. 56 is a plan view showing one pixel of Embodiment 33. Embodiment 33 is a combination of Embodiment 24 and Embodiment 29.

Embodiment 34

Figure 57:
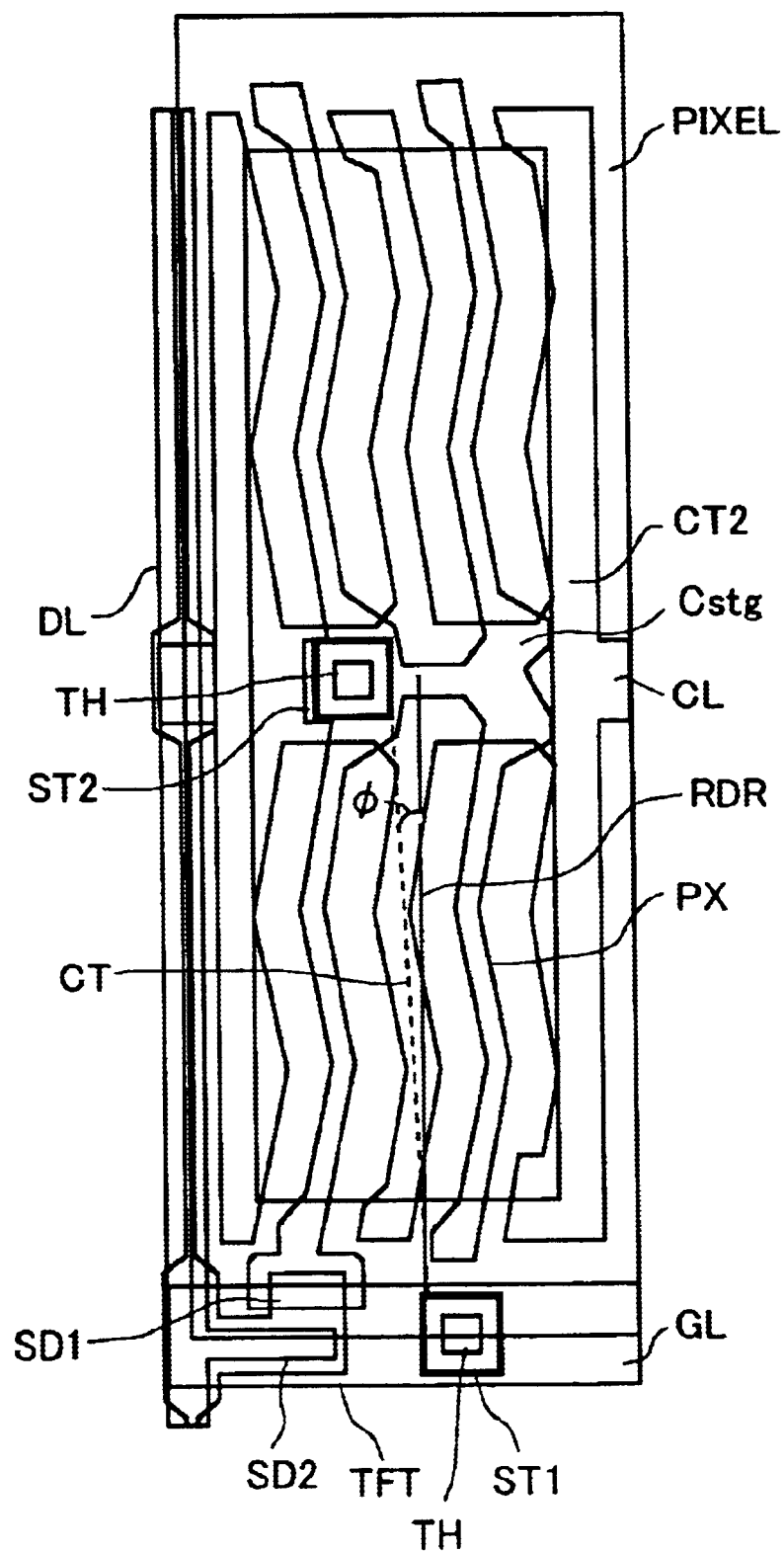
FIG. 57 is a plan view showing one pixel of a liquid crystal display part of an active matrix color liquid crystal display device according to one Embodiment of this invention.

Embodiment 34 is the same as Embodiment 26 except for the following points. FIG. 57 is a plan view showing one pixel of Embodiment 34. Embodiment 34 is a combination of Embodiment 26 and Embodiment 29.

Embodiment 35

Figure 58:
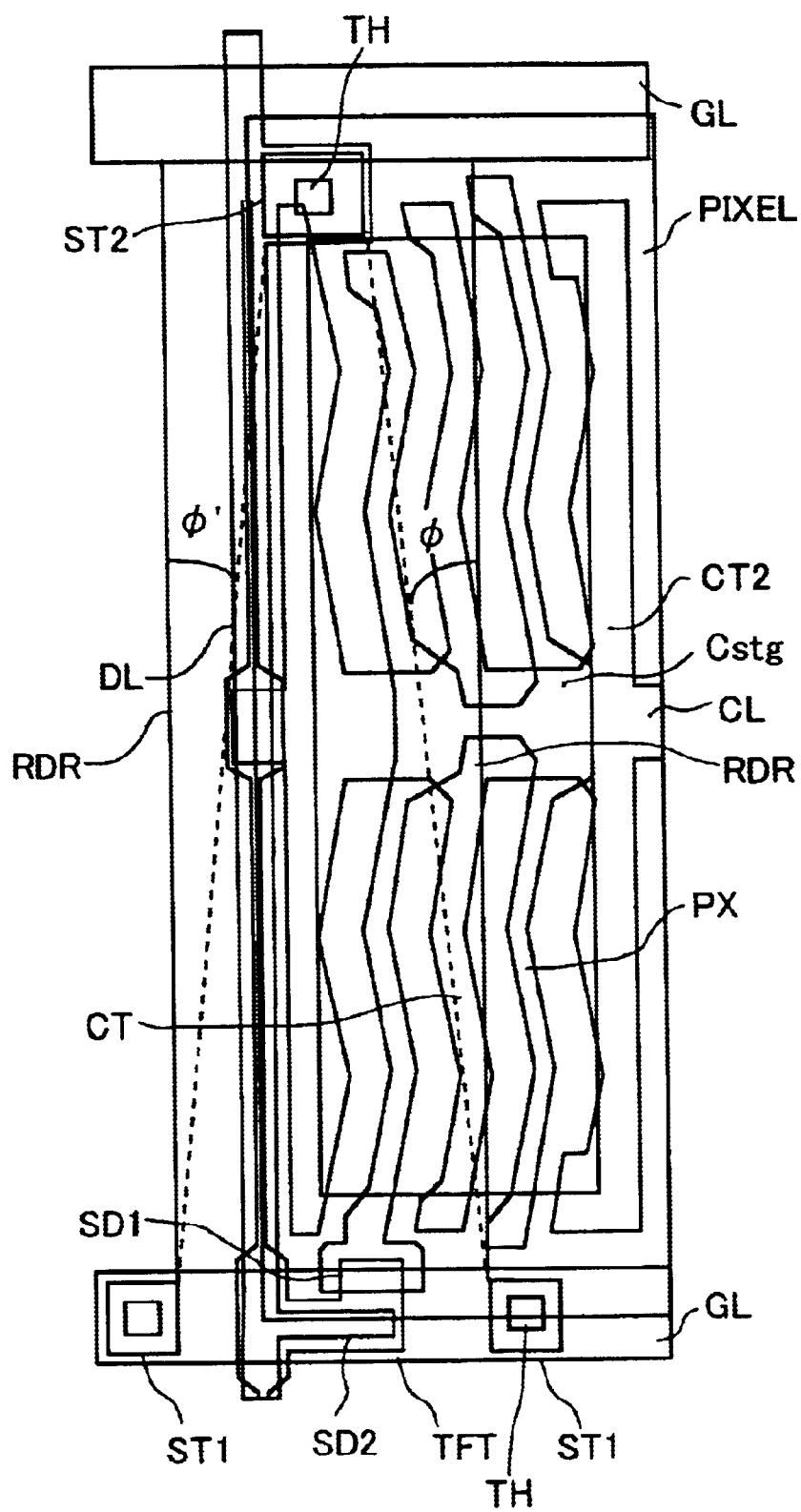
FIG. 58 is a plan view showing one pixel of a liquid crystal display part of an active matrix color liquid crystal display device according to one Embodiment of this invention.

Embodiment 35 is the same as Embodiment 28 except for the following points. FIG. 58 is a plan view showing one pixel of Embodiment 35. Embodiment 35 is a combination of Embodiment 28 and Embodiment 29.

Embodiment 36

Figure 59:
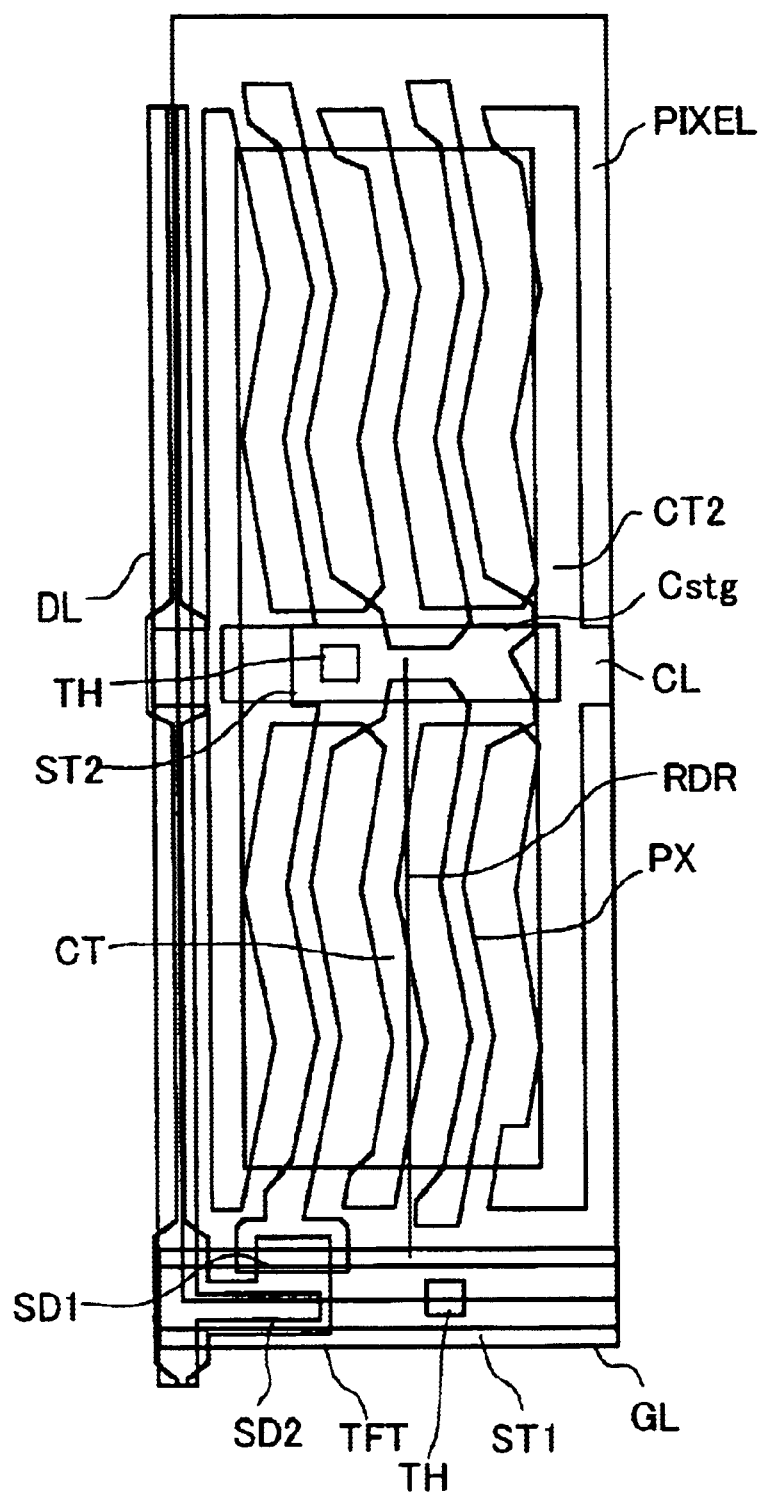
FIG. 59 is a plan view showing one pixel of a liquid crystal display part of an active matrix color liquid crystal display device according to one Embodiment of this invention.

Embodiment 36 is the same as Embodiment 34 except for the following points. FIG. 59 is a plan view showing one pixel of Embodiment 36. In Embodiment 36, an electrode ST1 is formed over a scanning signal line in a linear shape parallel thereto, while an electrode ST2 is connected to a pixel electrode and is formed into an shape which is elongated in the direction parallel to the electrode ST1.

According to this construction, since the electric fields between the electrode ST1 and the electrode ST2 have the same field direction in almost all portions of the pixel, the angles made by the rubbing direction RDR and the field directions can be made coincident in almost all portions. Accordingly, since the liquid crystal is not driven by such a electric field, it is possible to obtain an extremely high contrast ratio. In addition, since scanning signal lines are connected over plural pixels by the electrodes ST1, Embodiment 36 serves as a redundant structure, whereby disconnections of the scanning signal lines can be reduced.

As described above, Embodiment 36 has, in addition to the advantage of Embodiment 34, the advantage of providing a high contrast ratio and improving yield. Otherwise, the electrode ST2 may be connected to a counter electrode signal line and be formed in a linear shape parallel to the counter electrode signal line. In this case, it is also possible to restrain disconnection of the counter electrode signal line.

Embodiment 37

Figure 60:
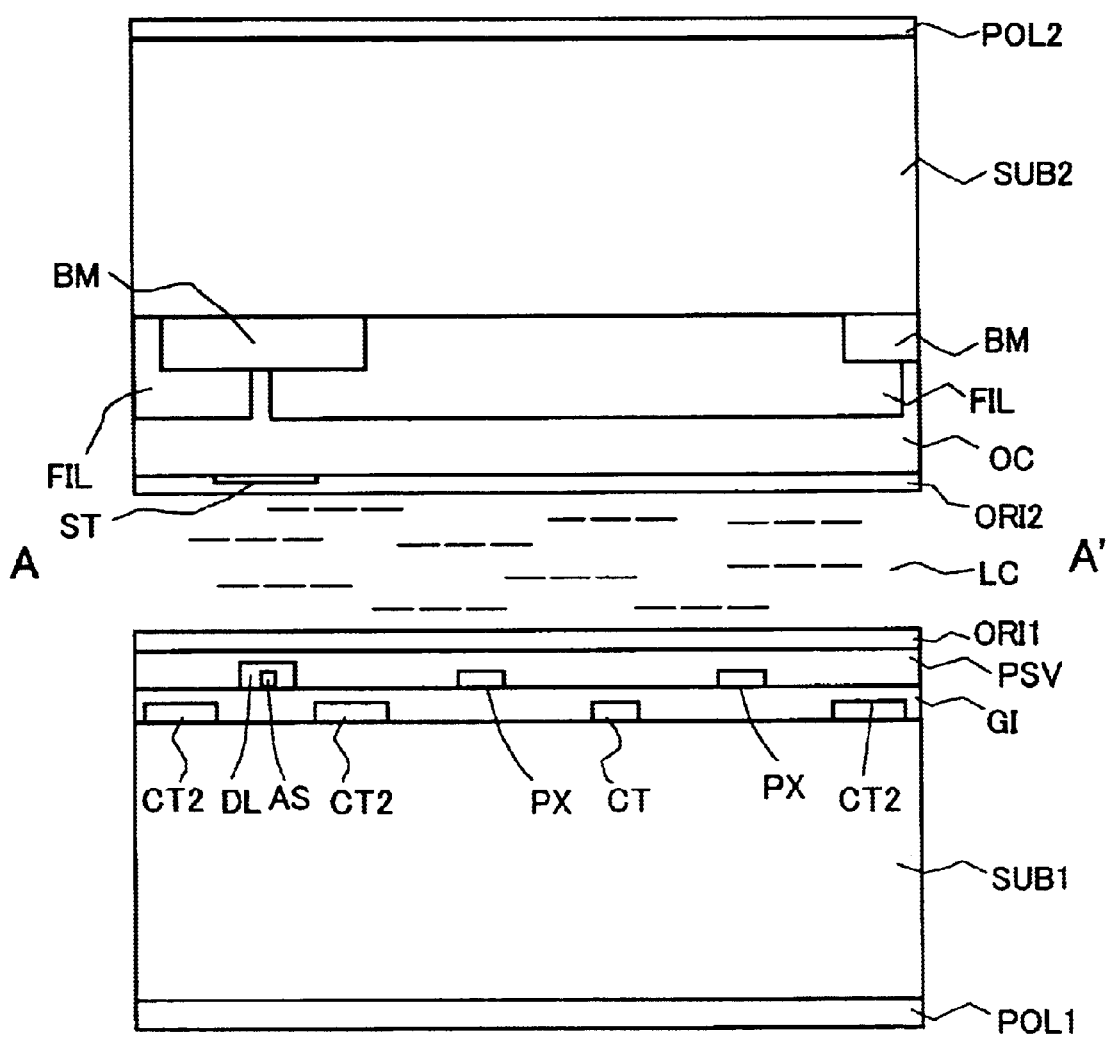
FIG. 60 is a plan view showing one pixel of a liquid crystal display part of an active matrix color liquid crystal display device according to one Embodiment of this invention.

Embodiment 37 is the same as Embodiment 1 except for the following points. FIG. 60 is a cross-sectional view showing one pixel of Embodiment 37. In Embodiment 37, the electrode ST is disposed directly below a leveling film OC formed over the upper transparent glass substrate SUB2 on the color-filter side. In plan view, the electrode ST is superposed on the video signal line and the scanning signal line.

In Embodiment 37, the electrode ST is supplied with a counter voltage from the outside surrounding portion of the effective display area. In Embodiment 37, the construction of the TFT-side substrate SUB1 is the same as those of prior arts.

In an IPS type of TFT-LCD, an ITO layer must be formed over the entire reverse side of its color-filter-side substrate to prevent display defects due to static electricity. However, in Embodiment 37, since the electrode ST serves that role, this reverse-side TFT layer is unnecessary. As described above, Embodiment 37 has, in addition to the advantage of Embodiment 2, the advantage of simplifying the step of forming the color-filter-side substrate. Incidentally, in Embodiment 37, the electrode ST is formed on the leveling film, but if no leveling film is used, the electrode ST may be formed on the color filter FIL directly below the alignment film.

Embodiment 38

Embodiment 38 is the same as Embodiment 1 and Embodiment 26 except for the following points.

Figure 61:
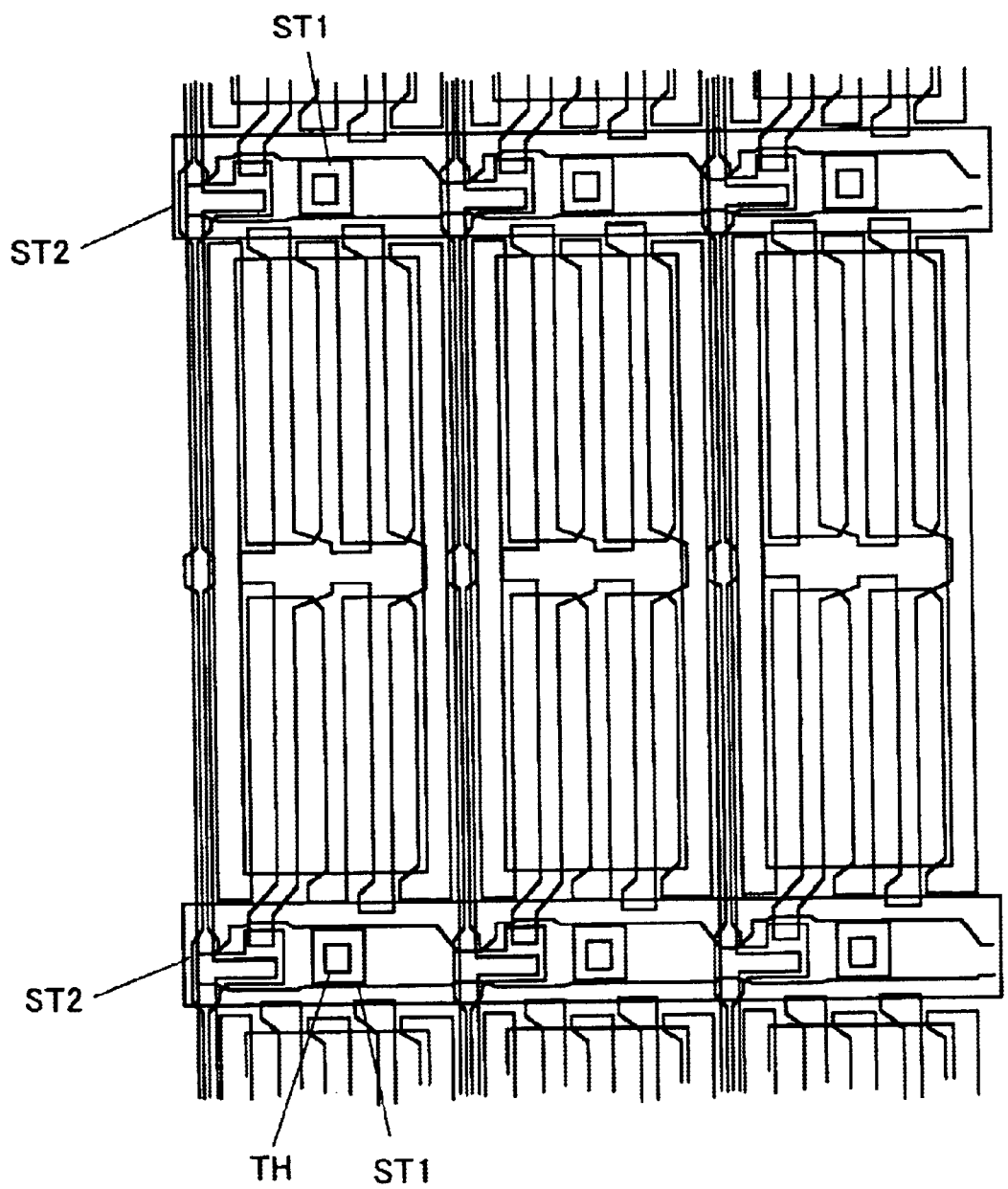
FIG. 61 is a plan view showing one pixel of a liquid crystal display part of an active matrix color liquid crystal display device according to one Embodiment of this invention.

FIG. 61 is a plan view showing one pixel of Embodiment 38. In Embodiment 38, each electrode ST1 is connected to a portion of a pixel electrode via a through-hole TH, while each electrode ST2 is disposed directly below a leveling film OC formed over the upper transparent glass substrate SUB2 on the color-filter side. As shown in FIG. 61 in plan view, each of the electrodes ST is formed in a linear shape to be superposed on a scanning signal line, but may be superposed on a video signal line so as to constitute a matrix arrangement. In Embodiment 38, each of the electrodes ST is supplied with a counter voltage from the outside surrounding portion of the corresponding effective display area.

In Embodiment 38, since the electrode ST1 and the electrode ST2 are respectively formed over different substrates, short-circuiting due to defective etching or the like in an electrode forming step necessarily does not occur. In addition, since the electrode ST1 and the electrode ST2 can be formed in a superposed state in plan view, almost no electric fields parallel to the substrate surfaces are generated, whereby the liquid crystal between the pixel electrode and the counter electrode is not driven. Accordingly, it is possible to obtain a high contrast ratio. As described above, in Embodiment 38, both the electrode ST1 connected to the scanning signal line and the electrode ST2 connected to the counter electrode can obtain, in addition to the advantage of Embodiment 27, the advantage of restraining short-circuiting between the electrode ST1 and the electrode ST2. In addition, Embodiment 38 has the advantage of obtaining a far higher contrast ratio.

As is apparent from the foregoing, in the invention, electrodes ST are newly formed over a protective film, a leveling film or a color filter; that is to say, the electrodes ST are formed below an alignment film. Accordingly, in an IPS mode of TFT-LCD, it is possible to restrain spotted black irregularities (contamination spots) from occurring when protective-film defects exist in electrodes and lines.

Moreover, in the invention, not only is it possible to restrain contamination spots, but it is also possible to restrain the flow of ionic impurities and hence the occurrence of indefinite black irregularities, by preventing new charge currents in protective-film capacitances. Similarly, owing to the same effect, it is possible to greatly reduce image retention (image persistence) which is the phenomenon that the edge of a fixed pattern becomes black when the fixed pattern is displayed for a long time.

In addition, since video signal lines, scanning signal lines and counter voltage signal lines can be given redundant structures by the electrodes ST, it is possible to improve yield against disconnections and hence the mass-productivity of in-plane switching mode liquid crystal display devices.

What is claimed is:

1. A liquid crystal display device comprising:
   a pair of substrates each having a side covered with an alignment film;
   a liquid crystal layer interposed between sides of a pair of substrates on which the alignment films are respectively formed;
   protective films formed under the respective alignment films;
   plural scanning signal lines formed between one of the pair of substrates and the protective film formed over the one of the pair of substrates;
   plural video signal lines formed between the one of the pair of substrates and the protective film in such a manner as to intersect the scanning signal lines in matrix form; and
   plural pixels formed in areas surrounded by the plural scanning signal lines and the plural video signal lines, the plural pixels having at least one pair of a pixel electrode and a counter electrode,
   each of the plural pixels having a metal-atom-containing layer formed between the alignment film and the protective film,
   at least one of the scanning signal lines and the video signal lines being connected to the metal-atom-containing layer via electrical connection means.

2. A liquid crystal display device according to claim 1, wherein the scanning signal lines are connected to the metal-atom-containing layer via the electrical connection means.

3. A liquid crystal display device according to claim 1, wherein counter electrodes or counter voltage signal lines connected to the counter electrodes and operative to apply counter voltages to the counter electrodes are connected to the metal-atom-containing layer via the electrical connection means.

4. A liquid crystal display device according to claim 1, wherein the pixel electrodes are connected to the metal-atom-containing layer via the electrical connection means.

5. A liquid crystal display device according to claim 1, wherein part or the whole of the metal-atom-containing layer overlaps the scanning signal lines, the pixel electrodes, the counter electrodes or counter voltage signal lines with the protective film being interposed therebetween.

6. A liquid crystal display device according to claim 1, wherein the electrical connection means is made of a part formed in a depth direction of the substrate and a part formed in a plane direction of the substrate.

7. A liquid crystal display device according to claim 1, wherein the protective films are made of an inorganic material containing either of SiNx and SiOx.

8. A liquid crystal display device according to claim 1 wherein the protective films are made of an organic material containing any of acrylic resin, epoxy and polyimide.

9. A liquid crystal display device according to claim 1, wherein at least one metal-atom-containing layer is formed for each of the plural pixels.

10. A liquid crystal display device according to claim 1, wherein plural metal-atom-containing layers are formed for each of the plural pixels.

11. A liquid crystal display device according to claim 1, wherein a difference between potentials of DC components of voltages of the pixel electrodes and the video signal lines is 1 V or less when the pixel electrodes is in a state of holding information.

12. A liquid crystal display device according to claim 1, wherein a difference between potentials of DC components of voltages of the pixel electrodes and the video signal lines is 0.5 V or less when the pixel electrodes is in a state of holding information.

13. A liquid crystal display device according to claim 1, wherein the video signal lines are connected to the metal-atom-containing layer via the electrical connection means.

14. A liquid crystal display device according to claim 1, wherein the metal-atom-containing layer is one of ITO and IZO.

* * * * *